United States Patent
Muceus et al.

(10) Patent No.: US 11,981,460 B2
(45) Date of Patent: May 14, 2024

(54) MISSION-ADAPTABLE AERIAL VEHICLE AND METHODS FOR IN-FIELD ASSEMBLY AND USE

(71) Applicant: Firestorm Labs, Inc., San Diego, CA (US)

(72) Inventors: Ian Muceus, San Diego, CA (US); Daniel Magy, San Diego, CA (US)

(73) Assignee: FIRESTORM LABS, INC., San Diego, CA (US)

( * ) Notice: Subject to any disclaimer, the term of this patent is extended or adjusted under 35 U.S.C. 154(b) by 0 days.

(21) Appl. No.: 18/510,592

(22) Filed: Nov. 15, 2023

(65) Prior Publication Data
US 2024/0092510 A1    Mar. 21, 2024

Related U.S. Application Data

(63) Continuation-in-part of application No. PCT/US2023/022151, filed on May 12, 2023.
(Continued)

(51) Int. Cl.
*B64U 10/70* (2023.01)
*B64U 20/75* (2023.01)
*B64U 20/87* (2023.01)

(52) U.S. Cl.
CPC ............ *B64U 10/70* (2023.01); *B64U 20/75* (2023.01); *B64U 20/87* (2023.01); *B64U 2201/104* (2023.01)

(58) Field of Classification Search
CPC ........ B64U 10/70; B64U 20/75; B64U 20/87; B64U 2201/104; F16B 5/121; B64F 5/00; B64F 5/10; G06F 1/00; G09B 9/00
See application file for complete search history.

(56) References Cited

U.S. PATENT DOCUMENTS 2,019,652 A * 11/1935 Fries ................. F41A 19/58
40/213
6,065,720 A * 5/2000 Ash .................... B64F 5/10
244/120
(Continued)

FOREIGN PATENT DOCUMENTS

CN    102923296 A    2/2013
CN    105771269 A    7/2016
(Continued)

OTHER PUBLICATIONS

Eric Tegler, "UAS Startup Firestorm's Ambition To Crank Out Combat Drones Fast, Cheap And En Masse Is A Lesson For DoD", article, Apr. 27, 2023, 6 pages, US.
(Continued)

*Primary Examiner* — Medhat Badawi
(74) *Attorney, Agent, or Firm* — Perkins Coie LLP

(57) ABSTRACT

Disclosed are devices, systems and methods for mission-adaptable aerial vehicle. In some aspects, a mission-adaptable aerial vehicle includes a configuration having swappable, manipulatable, and interchangeable sections and components connectable by a connection and fastening system able to be modified by an end-user in the field. In some embodiments, a mission-adaptable aerial vehicle can be configured to include a main center body extending along a longitudinal direction, a wing with a lateral cross-sectional airfoil shape, and/or stabilizer and control surface structures with corresponding cross-sectional airfoil shapes.

18 Claims, 21 Drawing Sheets

Related U.S. Application Data

(60) Provisional application No. 63/429,506, filed on Dec. 1, 2022, provisional application No. 63/366,119, filed on Jun. 9, 2022, provisional application No. 63/341,647, filed on May 13, 2022.

(56) References Cited

U.S. PATENT DOCUMENTS

| | | | |
|---|---|---|---|
| 9,555,873 B1* | 1/2017 | Alley | B64C 5/16 |
| 10,767,624 B2* | 9/2020 | Monreal Lesmes | F03D 1/0633 |
| 11,187,203 B2* | 11/2021 | Badger | F03D 1/0675 |
| 11,358,700 B1* | 6/2022 | Poe | B64F 5/10 |
| 11,597,490 B1* | 3/2023 | Gundlach | B64C 1/068 |
| 2008/0149758 A1* | 6/2008 | Colgren | B64C 9/02 244/45 R |
| 2014/0234116 A1* | 8/2014 | Cussac | F03D 1/0675 29/889.71 |
| 2015/0003991 A1* | 1/2015 | Bagepalli | F03D 1/0675 29/889.1 |
| 2015/0292477 A1* | 10/2015 | Kratmann | F03D 1/0675 416/232 |
| 2016/0121992 A1 | 5/2016 | Saroka et al. | |
| 2016/0129984 A1* | 5/2016 | Tiryaki | B64C 1/064 244/119 |
| 2017/0008611 A1* | 1/2017 | Murta | B64C 3/185 |
| 2017/0152014 A1* | 6/2017 | Gould | B64U 20/65 |
| 2017/0253316 A1* | 9/2017 | Benthien | B64F 5/10 |
| 2017/0349281 A1* | 12/2017 | Quinlan | B64D 5/00 |
| 2018/0067476 A1* | 3/2018 | Engelbart | G06F 30/17 |
| 2018/0104863 A1* | 4/2018 | Cottrell | B29C 33/40 |
| 2018/0162540 A1* | 6/2018 | Iliopoulos | B64F 5/10 |
| 2018/0273158 A1 | 9/2018 | Courtin | |
| 2018/0312252 A1* | 11/2018 | Yates | B64U 80/70 |
| 2018/0355842 A1* | 12/2018 | Badger | B33Y 80/00 |
| 2019/0077098 A1* | 3/2019 | Riley | B29C 70/545 |
| 2019/0077496 A1* | 3/2019 | Livieratos | B64C 39/10 |
| 2019/0106192 A1* | 4/2019 | Woodworth | B64U 20/80 |
| 2019/0106195 A1* | 4/2019 | Wilkerson | F16B 37/044 |
| 2019/0135403 A1* | 5/2019 | Perry | B64C 1/061 |
| 2019/0143596 A1* | 5/2019 | Fiechter | B29C 64/00 73/760 |
| 2019/0193829 A1* | 6/2019 | Schlueter | B22F 7/062 |
| 2019/0224909 A1* | 7/2019 | Riha | B33Y 30/00 |
| 2019/0255777 A1* | 8/2019 | Fiechter | B23Q 17/2233 |
| 2019/0322032 A1* | 10/2019 | Riha | B29C 64/106 |
| 2019/0322047 A1* | 10/2019 | Riha | B33Y 30/00 |
| 2019/0374868 A1* | 12/2019 | Russell | A63H 33/12 |
| 2019/0381530 A1* | 12/2019 | Beaudoin | B65H 45/04 |
| 2019/0389555 A1* | 12/2019 | Guering | B64C 1/061 |
| 2020/0032665 A1* | 1/2020 | Propheter-Hinckley | F02C 3/04 |
| 2020/0047867 A1* | 2/2020 | Griess | B64C 1/068 |
| 2020/0180760 A1* | 6/2020 | Richardson | B64F 5/00 |
| 2020/0247561 A1* | 8/2020 | Rivera | B22F 3/1115 |
| 2020/0407039 A1* | 12/2020 | Sanders | B64F 5/00 |
| 2021/0031912 A1 | 2/2021 | Yates | |
| 2021/0046694 A1* | 2/2021 | Rowe | B33Y 80/00 |
| 2021/0070419 A1* | 3/2021 | Decker | B64C 3/18 |
| 2021/0331789 A1* | 10/2021 | Wardlaw | B64F 5/10 |
| 2021/0347462 A1* | 11/2021 | Haack | B64C 1/069 |
| 2021/0372366 A1* | 12/2021 | Merzhaeuser | F03D 1/0675 |
| 2021/0403143 A1 | 12/2021 | Alley et al. | |
| 2022/0017204 A1* | 1/2022 | Helou, Jr. | B64C 1/06 |
| 2022/0111956 A1* | 4/2022 | Jordan | B64C 27/473 |
| 2022/0152758 A1* | 5/2022 | Jones | B64C 1/068 |
| 2022/0153452 A1* | 5/2022 | Smith | B64F 5/10 |
| 2023/0192267 A1 | 6/2023 | Gundlach et al. | |

FOREIGN PATENT DOCUMENTS

| | | | |
|---|---|---|---|
| CN | 106671402 A | | 5/2017 |
| CN | 112061372 A | | 12/2020 |
| CN | 112158323 A | | 1/2021 |
| EP | 3525259 A1 | | 8/2019 |
| FR | 3025491 A1 | | 9/2014 |
| FR | 3109369 A1 | | 4/2020 |
| IN | 201941005768 | | 2/2019 |
| WO | 2019-125159 A1 | | 6/2019 |
| WO | 2019212553 A1 | | 11/2019 |
| WO | 2020264115 A1 | | 12/2020 |

OTHER PUBLICATIONS

Scott Sevcik, "Where's the real value in additive?—An AM Perspective (Part 2)", Linkedin Article, Dec. 5, 2022, 5 pages, US.

De Vivo Nicoloso and Luca Gabriele, "Data driven systems engineering for bioinspired integrative design" peer reviewed thesis/dissertation, 2021, 240 pages, San Diego, CA, US.

Troy McMillan, "How to build Exlipson Model V—RC 3D Printed Airplane" YouTube Video, Feb. 25, 2021, 7 pages.

Robert M. Taylor, Nicholas Lira, Gavin Sabine, Joakim Lea, Craig Conklin, Bijan Niakan, and Sangram Advirkar, "Design Optimization, Fabrication, and Testing of a 3D Printed Aircraft Structure Using Fused Deposition Modeling", AIAA SciTech Forum, Jan. 10, 2020, 16 pages, American Institute of Aeronautics and Astronautics, Inc., Arlington, TX, US.

Aaron Pearson, "World's first jet-powered, 3D printed UAV tops 150 mph with lightweight Stratasys materials" blog, Mar. 24, 2020, 3 pages, Stratasys.com.

Akhilesh Kulkarni, "Static Response Calibration of 3D Printed Thin Walled Structures Using Fused Deposition Modelling" Thesis/Dissertation, Dec. 2019, 63 page(s), Arlington, TX, US.

Luca De Vivo, Danny Tran, and Falko Kuester, "Towards Design of a 3D Printable Prandtl Box-Wing Unmanned Aerial Vehicle", 2018, 17 pages, CISA3 DroneLab Jacobs School of Engineering.

Kelsey Muller, "Flying from Protoypring to Mainstream: 3D Printed Aircrafts Top Out at Speeds of 150mph", Technology and Operation Management MBA Student Perspectives Assignments, Nov. 12, 2018, 2 pages.

Henry Tucher, "How U.S. Marine Rhet McNeal Designed a 3D Printable Drone to Cost 200X Less at Autodesk's Pier 9" Autodesk News Article, Aug. 22, 2017, 5 pages.

Daniel O'Connor, "Game of Drones", TCT Magazine, Feb. 29, 2016, 8 pages.

G.D. Goh, S. Agarwala, G.L. Goh, V. Dikshit, S.L. Sing, and W.Y. Yeong, "Additive manufacturing in unmanned aerial vehicles (UAVs): Challenges and potential", Aerospace Science and Technology Forum, Aug. 25, 2016, 12 pages.

Robert P. Dahlgren, Juan J. Alonso, and Matthew M. Fladeland, "Progress on Modular Unmanned Aircraft Technology", ASPRS 3rd UAS Symposium, Sep. 12-14, 2016, 25 pages.

Chris Banfield, James Kidd, and Jamey Jacob, "Design and Development of a 3D Printed UAV", Aerospace Science and Technology Forum, Jan. 4-8, 2016, 19 pages.

NEWCO, "Local Motors: Driving Innovation with Micro-Manufacturing", Medium Magazine Article, Oct. 12, 2016, 21 pages.

Aurora Flight Sciences, "Aurora Successfully Flies Subscale X-Plane Aircraft" YouTube Video, Apr. 18, 2016, 1 page.

University of Virgina, "The Razor: UVA's 3D-printed U.A.V.", YouTube Video, Aug. 29, 2014, 1 page.

Press, "Aurora Flight Sciences 3D printed wing", sUAS News the business of drones Article, Nov. 9, 2015, 4 pages.

Pedro Santos, Joaquim Sousa, and Pedro Gamboa, "Variable-span wing development for improved flight performance" Journal of Intelligent Material Systems and Structures, 2015, 18 pages.

S. Palanivel, H. Sidhar, and R.S. Mishra, "Friction Stir Additive Manufacturing: Route to High Structural Performance", Article in JOM: the journal of the Minerals, Metals & Materials Society, Jan. 13, 2015, 7 pages, vol. 67, No. 3.

Michael Molitch-Hou, "Feasibility of Hovering Aircraft Demonstrated with 3D Printing", web article, May 4, 2016, 4 pages.

Businesswire a Berkshire Hathhaway Company, "Aurora Flight Sciences and Stratasys Deliver World's First Jet-Powered, 3D Printed UAV in Record Time", Nov. 9, 2015, 3 pages.

Carl Muldal, Edward Kolb, Graham Robertson, Aaron Parkinson, Osvaldo M. Querin, Robert W. Hewson and Vassili V. Toropov,

(56) References Cited

OTHER PUBLICATIONS

"The use of MDO and Advanced Manufacturing to Demonstrate Rapid, Agile Construction of a Mission Optimized UAV", Apr. 2013, 22 pages, American Institute of Aeronautics and Astronautics.
Steven Easter, Jonathan Turman, David Sheffler, Michael Balazs, and Jonathan Rotner, "Using Advanced Manufacturing to Produce Unmanned Aerial Vehicles: A Feasibility Study", May 22, 2013, 17 pages.
N.A. Ahmed and J.R. Page, "Manufacture of an Unmanned Aerial Vehicle (UAV) for Advanced Project Design using 3D Printing technology", 2013, 11 pages, vols. 397-400, pp. 970-980, Applied Mechanics and Materials.
UVAToday, "Student Engineers Design, Build, Fly 'Printed' Airplane", Web Article, Oct. 5, 2012, 4 pages.
International Application No. PCT/US2023/022151 International Search Report and Written Opinion mailed Dec. 27, 2023, pp. 1-17.

\* cited by examiner

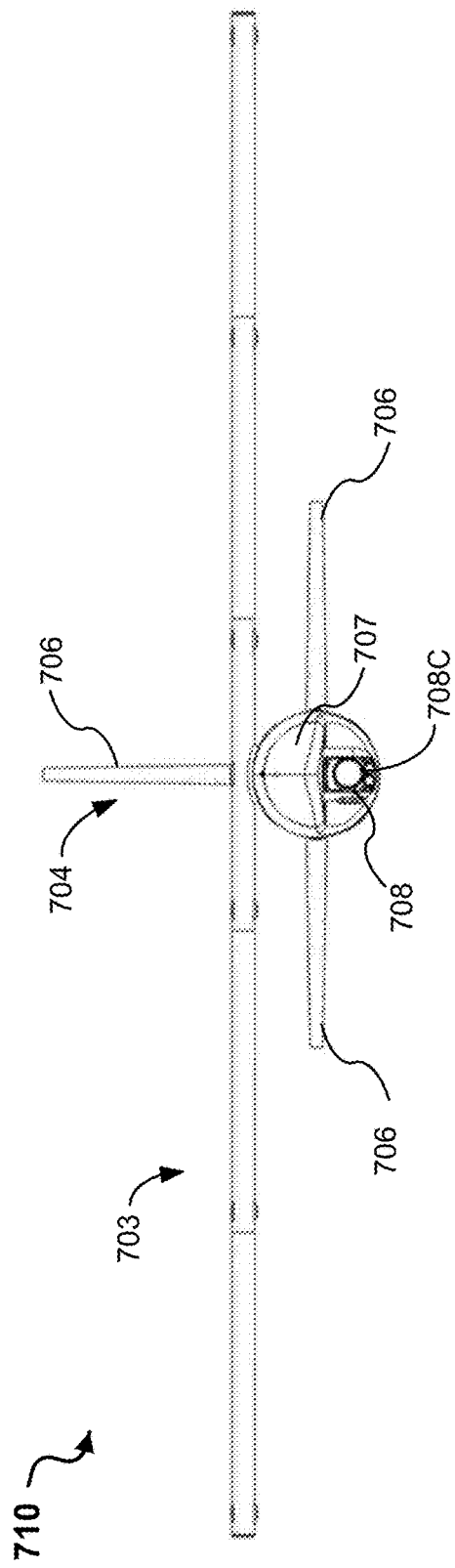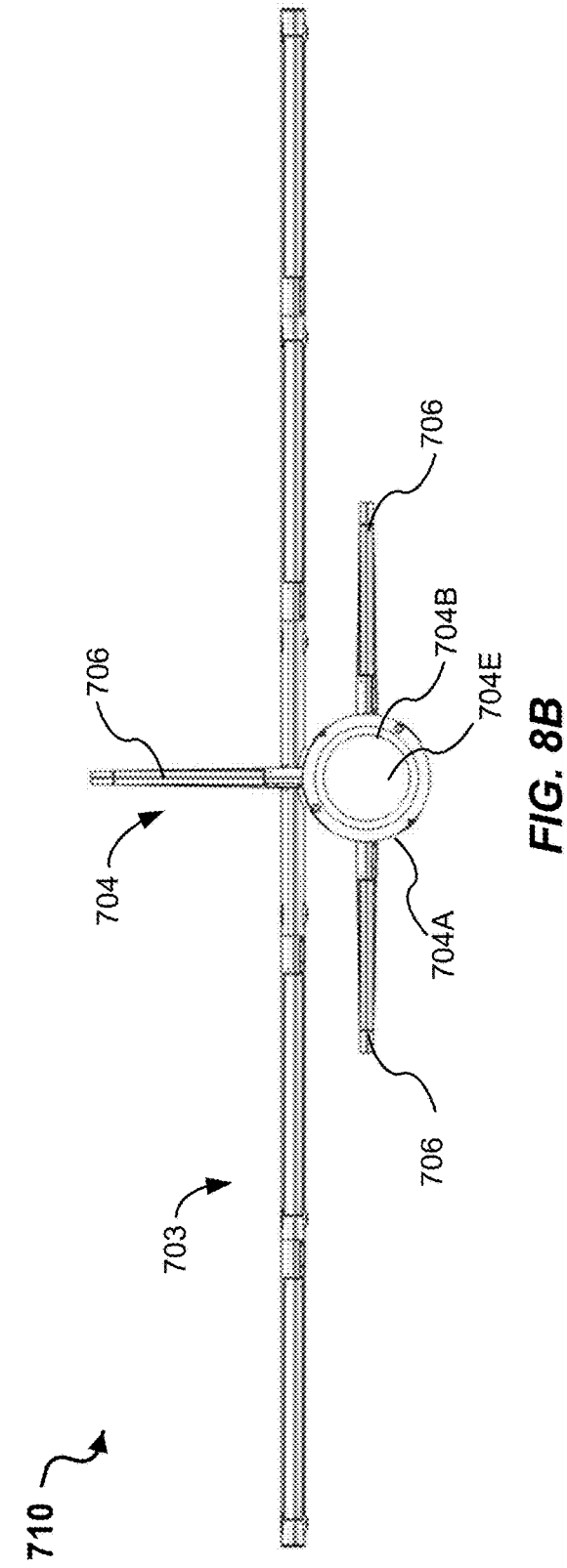

MISSION-ADAPTABLE AERIAL VEHICLE AND METHODS FOR IN-FIELD ASSEMBLY AND USE

CROSS-REFERENCE TO RELATED APPLICATIONS

This application is a continuation-in-part of International Patent Application No. PCT/US2023/022151, titled "MISSION-ADAPTABLE AERIAL VEHICLE AND METHODS FOR IN-FIELD ASSEMBLY AND USE" and filed May 12, 2023, which claims priority to and the benefits of U.S. Provisional Patent Application No. 63/341,647, titled "MISSION-ADAPTABLE AERIAL VEHICLE" and filed May 13, 2022, and U.S. Provisional Patent Application No. 63/366,119, titled "MISSION-ADAPTABLE AERIAL VEHICLE AND METHODS OF IN-FIELD ASSEMBLY AND USE THEREOF" and filed Jun. 9, 2022. This application also claims priority to and the benefits of U.S. Provisional Patent Application No. 63/429,506, titled "VARIABLE-SWEEP, TELESCOPING WING ASSEMBLY FOR A MISSION-ADAPTABLE TUBE-LAUNCHABLE UNMANNED AERIAL SYSTEM" and filed Dec. 1, 2022. The entire contents of the aforementioned patent applications are incorporated herein by reference in its entirety.

TECHNICAL FIELD

This patent document relates to aerial vehicles, and more particularly to unmanned aerial vehicles with in-field configurable components for mission-adaptable applications.

BACKGROUND

An aerial vehicle is a system of multiple subsystems launched into the air under its own power or by way of interaction with a launching apparatus. The aerial vehicle is generally produced to carry a specific payload or payloads, including inanimate or animate cargo or human passengers, over a given range or for a predetermined amount of time. Aerial vehicles may be directly controlled by a pilot, remotely operated, or autonomously operated. The thrust for launch and during flight of an aerial vehicle can be provided from a range of power sources (powerplants), including but not limited to: rockets, electrically-driven propellers, and turbojet or turbofan engines. The type of the aerial vehicle's powerplant determines which type of fuel or energy storage mechanism is needed to be carried onboard in order to power the powerplant and thereby provide the thrust for the aerial vehicle.

Aerial vehicles may take on a wide range of shapes, sizes, and form factors dependent upon their mission requirements. Typically, an aerial vehicle designer takes into account available components and materials, mission requirements, environmental factors, and other constraints, and then crafts the end product around all of these variables. The result is that many different designs—whether subtle or substantial—could potentially satisfy the same mission set requirements; however, there is often a "best" design.

Presently, there are several problems associated with existing aerial vehicles, typically rooted in their design. For example, one problem with past and current aerial vehicle designs is that requirements, both mission-related and payload-related, often change rapidly. For instance, a requirement for the endurance or loitering time of an intelligence, surveillance, and reconnaissance (ISR) aerial vehicle could change dramatically if the theater changed from a mostly terrestrial area with nearby targets to a highly maritime theater with distant targets. Additionally, the aerial vehicle design process can be very lengthy, where in some cases the design process takes multiple years or even decades to arrive at the "best" design because of the strict design constraints on a single aerial vehicle. Even further, technological advancement in certain areas of aerial vehicle components, subsystems, software, energy storage, and the like can also exceed that of the development of aerial vehicles. An example of this includes an electrically-powered aerial vehicle that is designed around a specific type of battery with a given energy density, which could later see battery technology advance to the point where a new battery's energy density makes the aerial vehicle's design no longer performant or competitive against other designs. With an expensive development process, a large outlay of human resources to accomplish successful products, lengthy development and testing timelines, rapidly-changing mission requirements, and technological advancement arcs (oftentimes disrupting development and production processes), it is easy to see that problems plague the status quo in aerial vehicle development. While past and current design, development, and production methods had their time and place, there is a true need for a more flexible and lower-cost solution for the end-user and customer.

SUMMARY

To address the aforementioned and other problems with aerial vehicles, a rapidly-adaptable, end-user-modifiable aerial vehicle is described that can advance beyond the status quo.

Disclosed herein are devices, systems, and methods for mission-adaptable aerial vehicles.

In some example aspects, a mission-adaptable aerial vehicle includes a fuselage assembly comprising one or more fuselage sections; a wing assembly reversibly attachable to the fuselage assembly, the wing assembly including at least one wing section; a nose cone assembly reversibly attachable to the fuselage assembly; a tail assembly reversibly attachable to the fuselage assembly; a propulsion unit at least partially contained in at least one of the tail assembly or the fuselage assembly and configured to drive flight of the aerial vehicle; and an electronics unit comprising a wireless transceiver device.

In some aspects, a mission-adaptable aerial vehicle system includes a mission-adaptable aerial vehicle; and a data processing system, comprising one or more server computer devices, one or more databases, and/or one or more client computer devices, in data communication with each other, the data processing system configured to store and/or process data files associated with a library of specifications and data corresponding to one or more airframe sections and/or subsystems of the mission-adaptable aerial vehicle.

In some aspects, an airframe device for a mission-adaptable aerial vehicle includes a body of a fuselage section or a tail section; and a multi-inlet duct comprising two or more air intake passage structures (e.g., a quad inlet duct comprising four air intake passage structures), where each air intake passage structure is equally spaced along a frame or wall of the body with respect to another of the air intake passage structures.

In some aspects, a method for facilitating in-field assembly of a mission-adaptable aerial vehicle includes: providing a user interface via a software application on a mobile device associated with a user, wherein the user interface includes a display screen presenting details of an aircraft type and a list of available sections and/or components associated with the aircraft type of the mission-adaptable aerial vehicle; receiving an input from the user interface associated with a selection of at least some of the available sections and/or components to include in an assembly of the mission-adaptable aerial vehicle; producing one or more assembly protocols including instructions to assemble the mission-adaptable aerial vehicle for an in-field assembly procedure; and generating, in real-time of the in-field assembly procedure, a modification scheme to cause a change in the instructions based on a determined change in one or more of flight dynamics, flight stability, or flight control of the mission-adaptable aerial vehicle.

In some aspects, a method for customizing a mission-adaptable aerial vehicle includes: receiving, at a data processing system, an input to obtain or access a library of data files associated with one or more mission-adaptable aerial vehicles; processing, at the data processing system, the input to identify the library of data files associated with the one or more mission-adaptable aerial vehicles; providing, by the data processing system, the identified library of data files associated with the one or more mission-adaptable aerial vehicles to an entity associated with the received input; facilitating, at the data processing system, a modification and/or addition of the library of data files based on data provided by the entity that provided the input, wherein the facilitating the modification and/or addition of one or more data files of the library includes verifying a technical feasibility of a proposed change to an airframe component of one or more the mission-adaptable aerial vehicle; simulating, at the data processing system, a performance of the mission-adaptable aerial vehicle having the airframe component with the proposed change incorporated to evaluate the proposed change to the mission-adaptable aerial vehicle's flight performance; and producing, at the data processing system, a new or an updated library of data files based on the modification and/or addition of the one or more data files of the library of data files associated with the one or more mission-adaptable aerial vehicles.

In some aspects, a mission-adaptable aerial vehicle includes a fuselage assembly comprising one or more fuselage sections; a wing assembly reversibly attachable to the fuselage assembly, the wing assembly including one or more wing sections; a nose cone assembly reversibly attachable to the fuselage assembly, the nose cone assembly including at least one nose cone section; a tail assembly reversibly attachable to the fuselage assembly, the tail assembly including at least one tail section, wherein at least one wing section of the wing assembly and at least one fuselage section of the fuselage assembly are reversibly attachable to each other by an integral fastening system comprising (i) one or more protrusion structures integrally part of and spanning from a sidewall of one of the at least one wing section or the at least one fuselage section, and (ii) one or more slots disposed in a portion of the other one of the at least one wing section or the at least one fuselage section, wherein the one or more protrusion structures is formed of the same structure as the one of the at least one wing section or the at least one fuselage section, and wherein the portion having the one or more slots is formed of the same structure as the other one of the at least one wing section or the at least one fuselage section; a propulsion unit at least partially contained in at least one of the tail assembly or the fuselage assembly and configured to drive flight of the aerial vehicle; and an electronics unit comprising a wireless transceiver device.

In some aspects, a method for facilitating in-field assembly of a mission-adaptable aerial vehicle includes providing a user interface via a software application on a mobile device associated with a user, wherein the user interface includes a display screen presenting details of an aircraft type and a list of available components associated with the aircraft type of the mission-adaptable aerial vehicle; receiving an input from the user interface associated with a selection of at least some of the available components to include in an assembly of the mission-adaptable aerial vehicle; producing one or more assembly protocols including instructions to assemble the mission-adaptable aerial vehicle for an in-field assembly procedure; and generating, in real-time of the in-field assembly procedure, a modification scheme to cause a change in the instructions based on a determined change in one or more of flight dynamics, flight stability, or flight control of the mission-adaptable aerial vehicle.

In some aspects, a method for facilitating in-field assembly of a mission-adaptable aerial vehicle includes providing a user interface via a software application on a mobile device associated with a user, wherein the user interface includes a display screen presenting details of an aircraft type and a list of available components associated with the aircraft type of the mission-adaptable aerial vehicle; receiving an input from the user interface associated with a selection of at least some of the available components to include in an assembly of the mission-adaptable aerial vehicle; producing one or more assembly protocols including instructions to assemble the mission-adaptable aerial vehicle for an in-field assembly procedure; and generating, in real-time of the in-field assembly procedure, a modification scheme to cause a change in the instructions based on a determined change in one or more of flight dynamics, flight stability, or flight control of the mission-adaptable aerial vehicle.

The details of one or more embodiments are set forth in the description below. The features illustrated or described in connection with one example embodiment may be combined with the features of other embodiments. Thus, any of the various embodiments described herein can be combined to provide further embodiments. Other features, objects, and advantages will be apparent from the description, the drawings, and the claims.

The subject matter described in this patent document can be implemented in specific ways that provide one or more of the following features.

BRIEF DESCRIPTION OF THE DRAWINGS

FIGS. 8A and 8B show diagrams illustrating a front view and a rear view, respectively, of the example embodiment of the mission-adaptable aerial vehicle shown in FIG. 7.

DETAILED DESCRIPTION

Figure 1A:
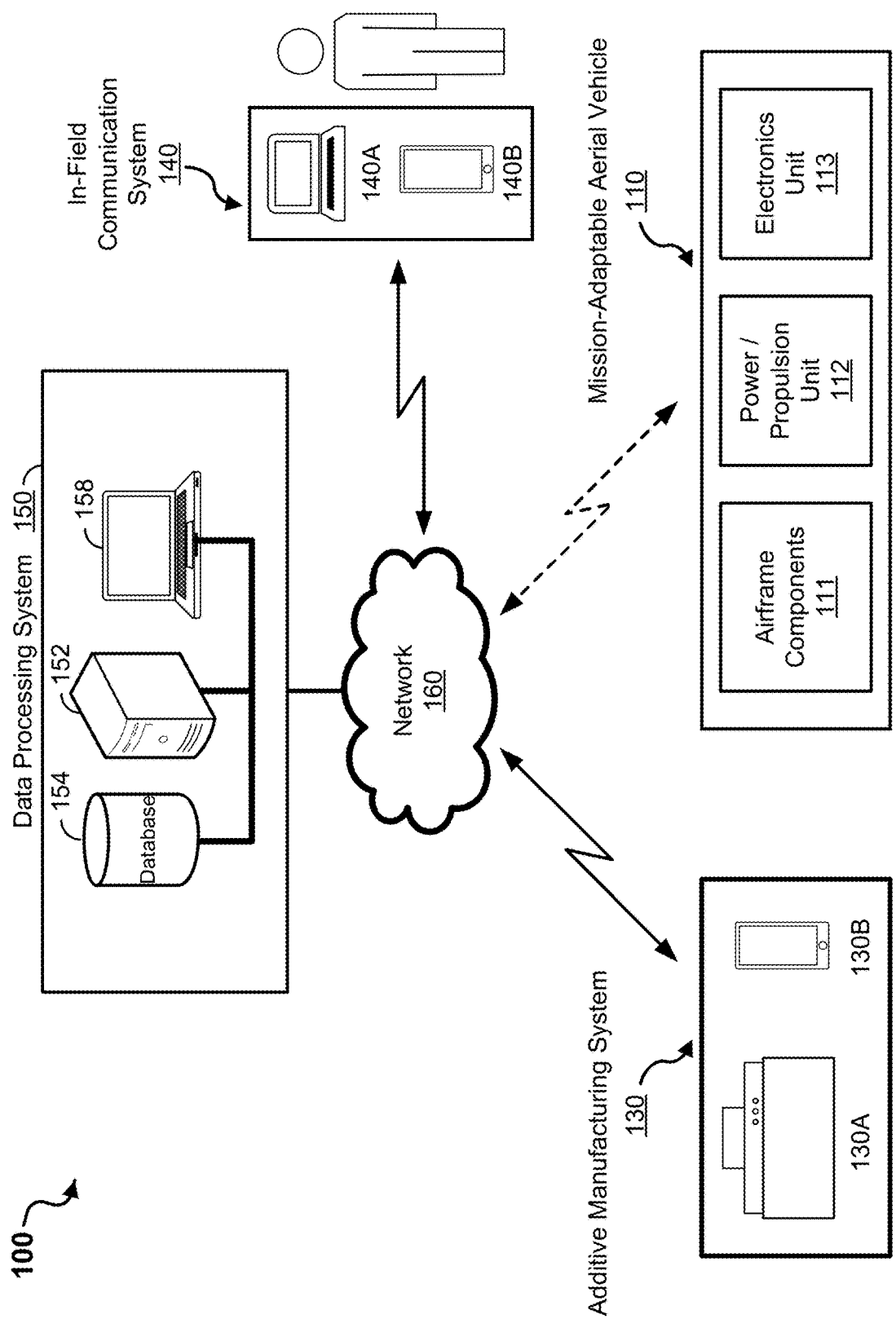
FIG. 1A shows a diagram of a mission-adaptable aerial vehicle system, in accordance with the present technology.

Cost and time-to-market are large drivers of any product's eventual success or failure; aerial vehicles are no exception. Development costs are also generally passed on to the customer. So long, costly development cycles are problematic not only to the product maker but also to the customer.

Given that an aerial vehicle is generally developed for and/or capable of a single mission or limited range of missions, e.g., such as conventional ISR aerial vehicles, an end-user or customer may need to obtain multiple aerial vehicles to accomplish their goals. And, not only may a single aerial vehicle be expensive, but an end-user may need to purchase several expensive systems to meet their actual needs.

The disclosed mission-adaptable aerial vehicle articles, devices, systems, and methods are envisioned to alleviate such problems, e.g., offering the capability of an end-user to easily customize an aerial vehicle to a particular mission or multiple particular missions at the point of deployment. Moreover, using the disclosed mission-adaptable aerial vehicle technology, the point of development can be in or near the field of deployment and use where the aerial vehicle mission is to take place. In contrast with conventional aerial vehicles and their present design, the disclosed aerial vehicles and techniques for fabricating and using such provide tremendous flexibility and versatility in the aerial vehicle's design, cost, and performance to accommodate the integration and use of virtually any type of equipment into the aerial vehicle, e.g., such as various powerplants, wing assembly types, tail assembly types, add-on components like cameras, trackers, etc., and/or payloads.

Example embodiments of the disclosed mission-adaptable aerial vehicle articles, devices, systems, and methods for fabrication, transport, assembly, and/or use are described below in further detail.

In some embodiments in accordance with the present technology, a mission-adaptable aerial vehicle includes a main center body that extends along a longitudinal direction for the aerial vehicle; a wing assembly with a lateral cross-sectional airfoil shape that is connectable in any one of a plurality of configurations to the main center body of the aerial vehicle; and one or more stabilizers and/or control surface structures with corresponding cross-sectional airfoil shapes that are connectable in any one of a plurality of configurations to the main center body of the aerial vehicle. The customizable or modularized components or assemblies of the mission-adaptable aerial vehicle may also be referred to as sections or segments.

In some embodiments, for example, a mission-adaptable aerial vehicle in accordance with the present technology includes a plurality of design-adaptable airframe components that can be produced via additive manufacturing (e.g., three-dimensional (3D) printing) and can be assembled in any location, such as the desired field of deployment of the aerial vehicle. The disclosed methods of manufacturing of such mission-adaptable aerial vehicles can be implemented to produce a core architecture (i.e., core components of an aerial vehicle design), where the design can be expanded upon or modified to make the mission-adaptable aerial vehicle suitable for a variety of different missions on demand. In various embodiments, the airframe components can include one or multiple nose cone sections, one or multiple fuselage sections, one or multiple wing sections, one or multiple powerplant or nacelle sections, and/or one or multiple tail or empennage sections. Within this design-adaptable airframe structure can be contained the requisite subsystems, e.g., flight computers, control systems, electronics, avionics, electrical systems, energy storage facilities, fuel systems, navigation systems, communications systems, targeting systems, as well as others. The airframe components can be designed to accommodate a certain mission set. For example, alternate library or completely customized sections can be substituted into or added to the system (mission-adaptable aerial vehicle), including sections designed and developed by the end-user themselves or third parties.

For example, in some implementations in accordance with the present technology, the mission-adaptable aerial vehicle can be composed of airframe sections containing different subsystems powered by a common or shared control system. In some implementations and applications of the present technology, for example, multiple base models (e.g., default designs, core architectures, and/or standard configurations) for one or more particular aerial vehicle designs can be created by a developer (e.g., an aerospace designer and/or additive manufacturer), and the base models can be expanded upon and customized by an end-user, e.g., such as where a base model of an aerial vehicle can thereafter be easily modified by the end-user to meet different needs. For example, each section of the aerial vehicle may be chosen by the end-user, to provide the mission needs of the end-user's aerial vehicle, from a library of sections produced by the developer. Custom sections may also be quickly developed and fielded using the design, test, simulation, and production technologies, in order to offer flexibility with rapidly-evolving technologies and changes to customer needs. For instance, if a customer requires that a special payload be carried by the aerial vehicle, the developer can quickly digitally design and additively manufacture (e.g., using 3D printing) the customized fuselage or wing section to secure the payload at a relatively low cost, enabling the customer to engage in a new mission without having to procure an entirely new aerial vehicle.

In some embodiments of an aerial vehicle in accordance with the present technology, the aerial vehicle can be configured with a tube-and-wing design that underlies the basic design of the aerial vehicle system. An example of a tube-and-wing design includes a design similar to current passenger aircraft, where the fuselage section(s) can generally be described as a tube with a wing attached to it. This type of tube-and-wing design has been the predominant design in passenger aircraft for nearly a century due to numerous factors, including but not limited to ease of production and cabin pressurization. In examples employing a tube-and-wing design, some embodiments of the mission-adaptable aerial vehicles can have wingspans (i.e., the distance from wingtip to wingtip) varying from less than 1 foot to potentially over 100 feet with aircraft gross weights varying from less than 1 pound to in excess of 20,000 pounds.

In some embodiments, certain airframe sections of an aerial vehicle can encase core systems, meaning that they are integral to the airframe and cannot be removed or replaced. In other embodiments, these core systems can be moved between airframe sections, enabling even further customization.

The mission-adaptable aerial vehicle can include a flight control computer that controls some or all subsystems for flight of the aerial vehicle. The flight computer can be configured to process sensor inputs and send signals to the control systems and other systems of the aerial vehicle to control the aerial vehicle's flight dynamics in real-time. The flight control computer can be configured to be seamlessly adapted for the particular design of the aerial vehicle, e.g., as airframe sections and payloads change, as well as the connection, fixturing, and fastening system that allows different airframe sections to connect to one another in an easy-to-assemble and structurally sound manner. The flight control system, in data communication with a user interface of a software application ("application" or "app") operable on a remote computing device (such as a desktop or laptop computer, smartphone, smart wearable (e.g. smartwatch, smart glasses, etc.), or other stationary or mobile computer), can be used to guide the user on how to manipulate airframe elements (e.g., during design and/or assembly or during the flight) of the aerial vehicle in order to produce a performant, controllable aerial vehicle. For example, the app can be implemented to guide the user through a reconfiguration and assembly, e.g., where a user interface of the app could display that since the user selected section X, the user should next move the wing section Y to the M position in order to have the static margin needed for desired performant flight/stability per inputted or stored performance parameters associated with a mission.

In some embodiments, vast amounts of simulation and real-world testing data can be inputted into the system in order to confidently have the end-user modify the airframe without creating an uncontrollable aircraft. For example, given that there is a library of aerial vehicle airframe sections and subsystems with an immense amount of simulation and test data behind them, as a user selects and incorporates different elements from said library using the digital user interface, the application responds and provides feedback to the user on how shifts in weights and balances necessitate airframe modifications. For example, if the end-user desires to add loitering time or range to the aerial vehicle's mission capabilities, they can be instructed to add additional in-wing, in-fuselage, in-wing pod/external tank, or otherwise fuel sections, while also potentially adding wing sections onto what was previously the tip chord area of the prior wing, swapping the entire wing/wing sections, or even changing the powerplant section. The user interface, application, and onboard flight control computer communicate with one another, and instructions are shared that enable the aerial vehicle to fly safely and performantly in the newly created state. To the end-user, this process is made to be straightforward, relatively quick, and non-burdensome; however, without such a system, a conventional developer would have to undergo enormous numbers of calculations, simulations, and tests. As such, the example flight control system can facilitate and enable this simplified flight design and/or flight control process(es) for the end-user.

In some embodiments and with customized airframe sections or payloads, the end-user is guided through a process by which they inform the application, e.g., through digital text input fields, sliders, drop-downs, wheels, knobs, or otherwise, about the weights, sizes, centers of gravity, positions, etc. of the customized sections. The application can then guide the user on how to manipulate the layout and positioning of the airframe sections to provide for the best performance and controllability.

The flight control computer can be configured to make corrections to its software, firmware, and/or control mechanisms. For example, if it is found—by way of instrumentation data and feedback loops—during flight that either the user or the computer has made an input or calculation error, for instance with stability derivatives or gains, the flight computer can include code for implementing methods to change these settings on the fly, adapting, correcting for errors, and ensuring a successful flight.

Disclosed herein are devices, systems, and methods for mission-adaptable aerial vehicles.

I. Mission-Adaptable Aerial Vehicle Architecture

Unmanned aerial vehicles (UAVs), also called drones, and piloted aircraft of all sorts have been built for a single mission or several closely-related missions. This presents issues with requirements on the ground, in the field, and/or under duress changing regularly, which could mean that equipment painstakingly packed into position by human operators or delivered via expensive means (such as air-dropping) becomes relatively useless given the changes to present mission needs.

With a mission-adaptable airframe system, which can include additively manufactured components that provide interconnecting sections and a special fastening system, e.g., produced as part of the airframe sections, an end-user in the field could add, remove, or move entire sections of the airframe, thereby tailoring the aerial vehicle to the mission in the field and on-the-fly, e.g., on demand and in real-time. For instance, in a conventional ISR mission, operators often find that the range to their target has increased drastically or that they need to loiter over the target for much longer than previously planned, i.e., mission constraints have undergone a change that suddenly impacts the suitability of the intended unmanned aerial vehicle. Example embodiments of the mission-adaptable system described herein aim to solve these and other problems.

As an example solution to the previous scenario, an end-user (operator) could add a fuselage section with an additional fuel tank just prior to launch in order to fly the aerial vehicle further or loiter longer as needed for the ISR mission. The end-user could move the wing section or assembly to improve flight performance as they modify other parts of the airframe, thus changing the center of gravity (CG) of the aircraft. An operator may find that they need to increase the size or span of the wing to improve aspect ratio, wing loading, or other performance factors. The operator may find that they need to change from a tail section with a microturbine powerplant to an electrically driven propeller powerplant. These changes are capable on demand due to the mission-adaptable aerial vehicle architecture.

As another example, if the mission of the mission-adaptable aerial vehicle is a one-way, attriable, or expendable mission, less expensive components can be swapped into the system to reduce the cost burden to the user or customer. If the mission changes from day to night or if inclement weather becomes an issue, ISR payloads in the nose cone or fuselage sections can be swapped, replaced, and/or reconfigured to accommodate different sensor or processor arrays.

The ability to adapt the airframe based on the desired command and control of the airframe is a key differentiator over all conventional aerial vehicle designs and systems. Designing a conventional aerial vehicle requires intense data collection by the developer for all possible permutations in order to build out the system controls for flight and mission automation while ensuring that the operation of the aircraft is simple for the user. This can require immense upfront engineering resources to effectively program all possible flight configurations. However, the knowledge gleaned from simulations and testing and built into the flight computer ensures that the aircraft is extremely useful to the operator. The mission-adaptable airframe and complimentary component library described here can allow an end-user extreme flexibility in available mission sets, which in turn improves their ability to perform their job.

FIG. 1A shows a diagram of a mission-adaptable aerial vehicle system, labeled 100, in accordance with the present technology. The mission-adaptable aerial vehicle system 100 (also referred to as system 100) includes a data processing system 150 and one or more mission-adaptable aerial vehicle(s) 110. In some embodiments, the mission-adaptable aerial vehicle system 100 can include an additive manufacturing system 130. In some embodiments, the mission-adaptable aerial vehicle system 100 can include an in-field communication and/or computing system 140. In some embodiments, computing devices of the mission-adaptable aerial vehicle system 100 are in communication via a communications network 160.

In some embodiments, for example, the data processing system 150 can include one or more server computer devices 152, one or more databases 154, and/or one or more client computer devices 158, in data communication with each other (collectively referred to as "computing devices 152, 154, and/or 158"). In some implementations, for example, the computing devices 152, 154, and/or 158 can be configured to be in communication with each other through a closed or restricted network; whereas in some implementations, for example, at least some of the devices of the computing devices 152, 154, and/or 158 can be configured to be in communication with each other through a public network, such as the Internet. In some implementations, for example, the computing devices 152, 154, and/or 158 can be configured to be in communication with other computing devices of the system 100 external to the data processing system 150, such as computing devices of the additive manufacturing system 130, computing devices of the in-field communication and/or computing system 140, and/or mission-adaptable aerial vehicle(s) 110, via the network 160. In some implementations, for example, the computing devices 152, 154, and/or 158 can be configured to be in communication with other external devices (i.e., devices not part of the mission-adaptable aerial vehicle system 100) via the network 160 or other external network.

In some embodiments, for example, the additive manufacturing system 130 can include a 3D printer 130A and a client computer device 130B in data communication with the 3D printer 130A. The 3D printer 130A can include a fused deposition modeling (FDM) printer operable to render a printed article comprising one or more of a polymer material, a composite material, a metal, and/or a ceramic based on instructions from one or more computer files, such as a computer-aided design (CAD) file or package. In some embodiments, the 3D printer 130A of the additive manufacturing system 130 can be embodied as a 3D rendering device for a 3D printing or additive manufacturing method, including but not limited to laser powder bed fusion (LPBF), direct metal laser sintering (DMLS), selective laser sintering (SLS), selective laser melting (SLM), digital light processing (DLP), binder jetting (BJ), jetting (e.g., PolyJet printing), volumetric 3D printing, direct laser metal sintering, liquid crystal display (LCD), fused filament fabrication (FFF), automated continuous fiber placement, and/or other additive manufacturing processes.

Non-toolpath-style 3D printing processes can reach production scale at affordable costs and with respectable lead times. Print processes like FFF, FDM, and SLS, while having several benefits, cannot match the print speeds and throughput of BJ, DLP, and LCD print processes, and therefore, may not be optimal manufacturing choices for certain applications with moderate-to-high volume, low cost, 3D-printed part production requirements. For many example embodiments of the mission-adaptable aerial vehicle(s) 110, binder jetting can provide the benefit of not requiring support structures, as the powder in the build supports parts. This means that a broader array of geometries can be printed by binder jetting without requiring additional post-processing to remove said support structures, thereby reducing end-to-end processing costs for production of mission-adaptable aerial vehicles.

In some embodiments, the materials in the 3D-rendered component of the mission-adaptable aerial vehicle(s) 110 by the additive manufacturing system 130 can include, but not limited to, PA-12 (polyamide-12, a nylon-like material), acrylonitrile butadiene styrene (ABS), polylactic acid (PLA), acrylonitrile styrene acrylate (ASA), polyethene terephthalate (PET), polyethylene terephthalate glycol (PETG), polycarbonate (PC), polypropylene (PP), polyether ether ketones (PEEK), polyether ketone ketones (PEKK), ULTEM™, other nylons, thermoplastic polyurethane (TPU), and/or thermoplastic elastomer (TPE), or a combination of any of the aforementioned or subsequent-mentioned thereof, which can be in the form of powder, resin, and/or filament or other form; and/or composites that can be in the form of glass or other material beads added to the powder, resin, or filament materials, and/or likewise chopped fibers infused in the same feedstock. The client computer device 130B can be embodied as a personal computer (e.g., desktop computer or laptop computer) and/or a mobile communication device, including but not limited to a smartphone, a smart wearable (like a smartwatch, smart glasses, etc.), a tablet, a personal digital assistant (PDA), etc., or other computer device.

In some embodiments of the mission-adaptable aerial vehicle(s) 110 that are additively manufactured, e.g., 3D-printed, the airframe structures of the mission-adaptable aerial vehicle(s) 110 can be produced using PA-12 or other polyamides and/or other high-strength, high-impact strength materials with higher elongation-at-break properties, e.g. which can be selected based on the type and/or parameters of a mission for the mission-adaptable aerial vehicle(s) 110 (such as the propulsion system type, geometrical design of the airframe components, and/or flight applications like flight distance, speed, propulsion and loiter paths, payload(s) to be carried and/or deployed, etc.). While PA-12, other polyamides, and other high-strength, high-impact strength materials with higher elongation-at-break properties are not generally considered for aircraft structures because such materials are not high-modulus of elasticity or stiff, these materials (such as PA-12) are prevalent around the world, low-cost, and can be adapted for use in 3D printing the disclosed mission-adaptable aerial vehicle structures due to the ability of allowing designers to program trade-offs between airframe component weight and airframe cost and ease of manufacture. When paired with modern topology optimization, parametric design, and generative design, the designer/engineer can improve an airframe's overall structural properties using such materials, e.g., PA-12, which is counterintuitive for conventional, classic aerospace materials.

Moreover, PA-12 and materials of high-strength, high-impact strength materials with higher elongation-at-break properties can be effective in the additive manufacturing (e.g., 3D-printing) of certain structures with non-uniform curvatures, transitions, voids, protrusions, and other features for an airframe component that may be optimal to the design of a particular mission-adaptable aerial vehicle. Also, PA-12 and other additive manufactured materials like it may produce airframe structures that may have rougher outer surfaces (e.g., Ra value around 8 $\mu$m to 12 $\mu$m), at least initially as printed, but which, if needed based on the desired use of the mission-adaptable aerial vehicle, can be post-processed (e.g., media or bead blasted, chemical vapor smoothed, painted, etc.) to achieve very smooth, low-drag aerodynamic surfaces. As such, PA-12 and other additive manufactured materials like it can be advantageous for production of mission-adaptable aerial vehicle airframe structures for a variety of applications.

In some embodiments of the system 100, for example, at least some of the client computer device(s) 130B can include a software application ("app") that is resident on the respective device to control various data processing, storage, and communication functionalities for the additive manufacturing system 130. In some implementations, for example, an end-user can utilize the app to communicate with the data processing system 150 to access a library of specifications and data associated with airframe sections and subsystems for the mission-adaptable aerial vehicle(s) 110, e.g., which can be stored in the one or more databases 154 of the data processing system 150. For example, the library can include part files in CAD or mesh file formats, allowing for a user to print specific airframe elements for initial vehicle creation, spare parts, or replacement parts. The user would also be able to receive new part files (e.g., new library items, custom items) from the data processing system 150 and/or a client thereof, such as a decentralized computer network (e.g., via network 160). The library of the disclosed technology can be an ever-changing, ever-expanding resource of airframe and aircraft components printable on the various print processes in accordance with the additive manufacturing system 130.

In some embodiments, for example, the in-field communication and/or computing system 140 can include a computer device operable by an in-field user, where the computer device 140 can be embodied as a transportable personal computer 140A (e.g., laptop computer) and/or a mobile communication device 140B, including but not limited to a smartphone, a smart wearable (like a smartwatch, smart glasses, etc.), a tablet, a PDA, etc.; or other computer device. In some embodiments of the system 100, for example, the computer device 140 can include a software application ("in-field app") that is resident on the computer device 140 to control various data processing, storage, and communication functionalities for the in-field assembly and/or use (e.g., launch, flight programming and/or flight control, landing, re-charging and/or re-fueling, payload loading, or other tasking procedure) by the in-field user. For example, the in-field app can be used to provide in-the-field instructions to assemble at least some individual components of the mission-adaptable aerial vehicle(s) 110 that the in-field user may be storing and/or transporting on foot in the field (e.g., via a backpack, case, etc.) or by a land or sea vehicle (e.g., via a case, trunk, storage unit, etc.). In some implementations, for example, the in-field user can utilize the in-field app to communicate with the data processing system 150 to access data associated with a mission of the aerial vehicle. In some implementations, the computer device 140 can be used to interface with an electronics unit of the mission-adaptable aerial vehicle(s) 110 via a wired or wireless communication interface.

The mission-adaptable aerial vehicle(s) 110 can include any of an unmanned aerial drone operable to travel by its designed drive or propulsion systems based on navigation technology that can be programmable and fully-autonomous or semi-autonomous. The mission-adaptable aerial vehicle(s) 110 can include a plurality of modularized, mission-adaptable airframe components 111. For example, in some implementations, the airframe components 111 can be distributed into multiple (relatively) lightweight sections of the overall aerial vehicle(s) 110 (e.g., 25 lbs. to 250 lbs.) that are packable (e.g., in backpacks and hard cases) for transport into various locations in various ways, such as by an end-user on foot or by vehicle. In some embodiments, for example, the mission-adaptable aerial vehicle(s) 110 may include a power and/or propulsion unit 112. For example, in such embodiments, the power and/or propulsion unit 112 can include one or more batteries, one or more fuel cells, one or more engines, or other embodiments of a powerplant for the mission-adaptable aerial vehicle(s) 110. Examples of powerplant(s) for the mission-adaptable aerial vehicle(s) 110 include, but are not limited to, a rocket, an electric motor-driven propeller, an electric ducted fan (EDF), an internal combustion engine-driven propeller, a hydrogen fuel cell powered propulsion system, a turbojet engine, a turbofan engine, an unducted/propfan engine, or a hybrid propulsion system (e.g., a hybrid internal combustion engine powering a generator that charges a battery to drive an electric motor-driven propeller, or a hybrid hydrogen fuel cell-internal combustion engine). In some embodiments, for example, the mission-adaptable aerial vehicle(s) 110 may include an electronics unit 113. For example, in such embodiments, the electronics unit 113 can include a wireless communications unit (e.g., such as a wireless transceiver) and/or a location tracking unit, e.g., including a Global Positioning System (GPS), cellular communication device for cellular triangulation tracking, or other. Additionally or alternatively, in such embodiments, the electronics unit 113 may include a data processing unit (comprising a processor, memory, and input/output interface) that is in data communication with the location tracking unit and the wireless communications unit.

In some embodiments of the system 100, the mission-adaptable aerial vehicle(s) 110 are in communication with the client computer device 130B and/or in-field computer device 140 via the network 160 and/or in direct communication, such as through a wireless interface or wired interface, with the client computer device 130B and/or in-field computer device 140. In some embodiments, for example, the network 160 is a public network, such as the Internet (e.g., where the network of computers in communication with each other is also referred to as "the cloud"). In some embodiments, for example, the network 160 is a private network, where the computers in communication with each other are highly secure and restricted from use by unauthorized users and devices, e.g., a military network such as the Advanced Research Projects Agency Network (ARPANET) or portions thereof such as the MILNET, SIPRNet, NIPRNet, or other.

Figure 1B:
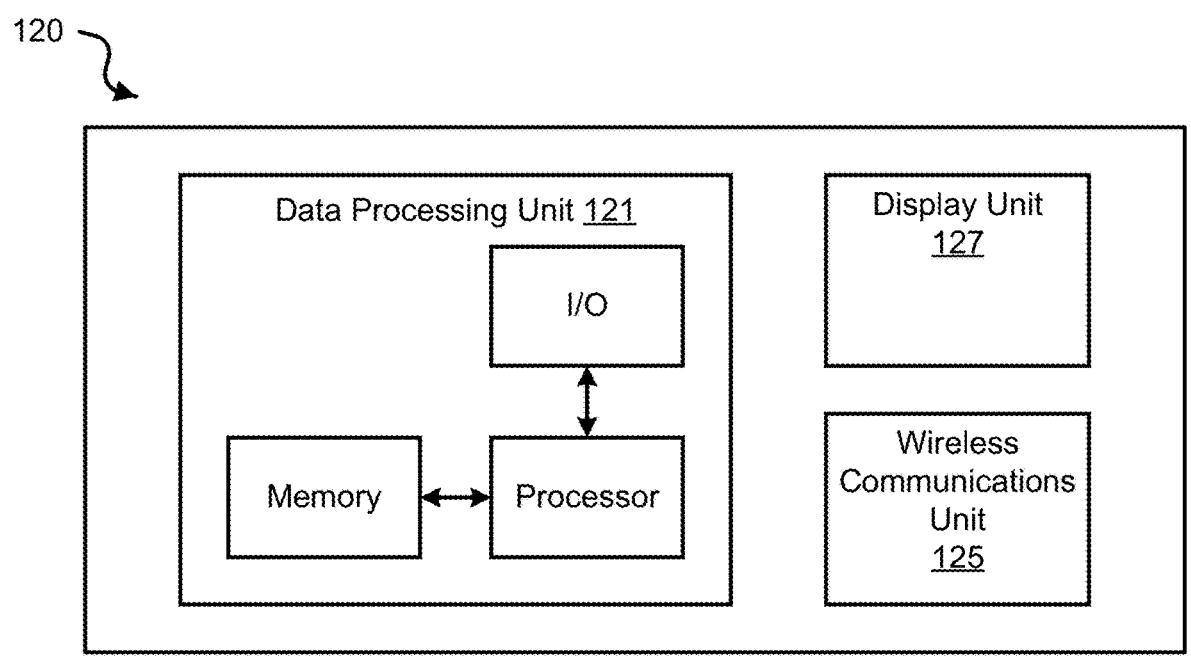
FIG. 1B shows a block diagram of an example embodiment of a data processing device for a computing unit, module, or device in accordance with the present technology.

FIG. 1B shows a block diagram of an example embodiment of a data processing device, labeled 120, for a computing unit, module, or device described in the present disclosure. The data processing device 120 may be embodied by a computer or computing device of the data processing system 150, the client computer device 130B of the additive manufacturing system 130, the in-field computer device 140 of the in-field communication and/or computer system 140, and/or the (optional) wireless communications unit and/or electronics unit of the mission-adaptable aerial vehicle(s) 110. The data processing device 120 can include a data processing unit 121, which comprises one or more processor(s) to process data, one or more memory unit(s) in communication with the processor(s) to store data, and an input/output unit (I/O) to interface the processor(s) and/or memory unit(s) to other modules, units, or devices of the data processing device 120 or external devices. For example, the processor(s) can include a central processing unit (CPU), a microcontroller unit (MCU), a graphics processing unit (GPU), or other. For example, the memory unit(s) can include and store processor-executable code, which, when executed by the processor(s), configures the data processing unit 121 to perform various operations, e.g., such as receiving information, commands, and/or data, processing information and data, and transmitting or providing information/data to another device. In some implementations, the data processing unit 121 can transmit raw or processed data to a computer system or communication network accessible via the Internet ("the cloud") that includes one or more remote computational processing devices (e.g., servers in the cloud). To support various functions of the data processing unit 121, the memory unit(s) can store information and data, such as instructions, software, values, images, and other data processed or referenced by the processor(s). For example, various types of Random Access Memory (RAM) devices, Read Only Memory (ROM) devices, Flash Memory devices, and other suitable storage media can be used to implement storage functions of the memory unit(s).

In some embodiments, the data processing device 120 can include a wireless communications unit 125. For example, in some implementations, the I/O of the data processing unit 121 can interface the data processing unit 121 with the wireless communications unit 125 to utilize various types of wired or wireless interfaces compatible with typical data communication standards, for example, which can be used in communications of the data processing unit 121 with other devices, via a wireless transmitter/receiver (Tx/Rx) unit, e.g., including, but not limited to, Bluetooth, Bluetooth low energy (BLE), Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE cellular communication methods, NFC (Near Field Communication), and parallel interfaces.

The I/O of the data processing unit 121 can also interface with other external interfaces, sources of data storage, and/or visual or audio display devices, etc. to retrieve and transfer data and information that can be processed by the processor(s), stored in the memory unit(s), or exhibited on an output unit of the data processing device 120 or an external device. For example, in some embodiments, the data processing device 120 can optionally include a display unit 127 configured to be in data communication with the data processing unit 121, e.g., via the I/O, to provide a visual display, an audio display, and/or other sensory display that produces a user interface of a software application in accordance with the mission-adaptable aerial vehicle system 100. In some examples, the display unit 127 can include various types of screen displays, speakers, or printing interfaces, e.g., including, but not limited to, light emitting diode (LED) or liquid crystal display (LCD) monitor or screen; cathode ray tube (CRT) as a visual display; audio signal transducer apparatuses as an audio display; and/or toner, liquid inkjet, solid ink, dye sublimation, inkless (e.g., such as thermal or UV) printing apparatuses, etc.

Figure 1C:
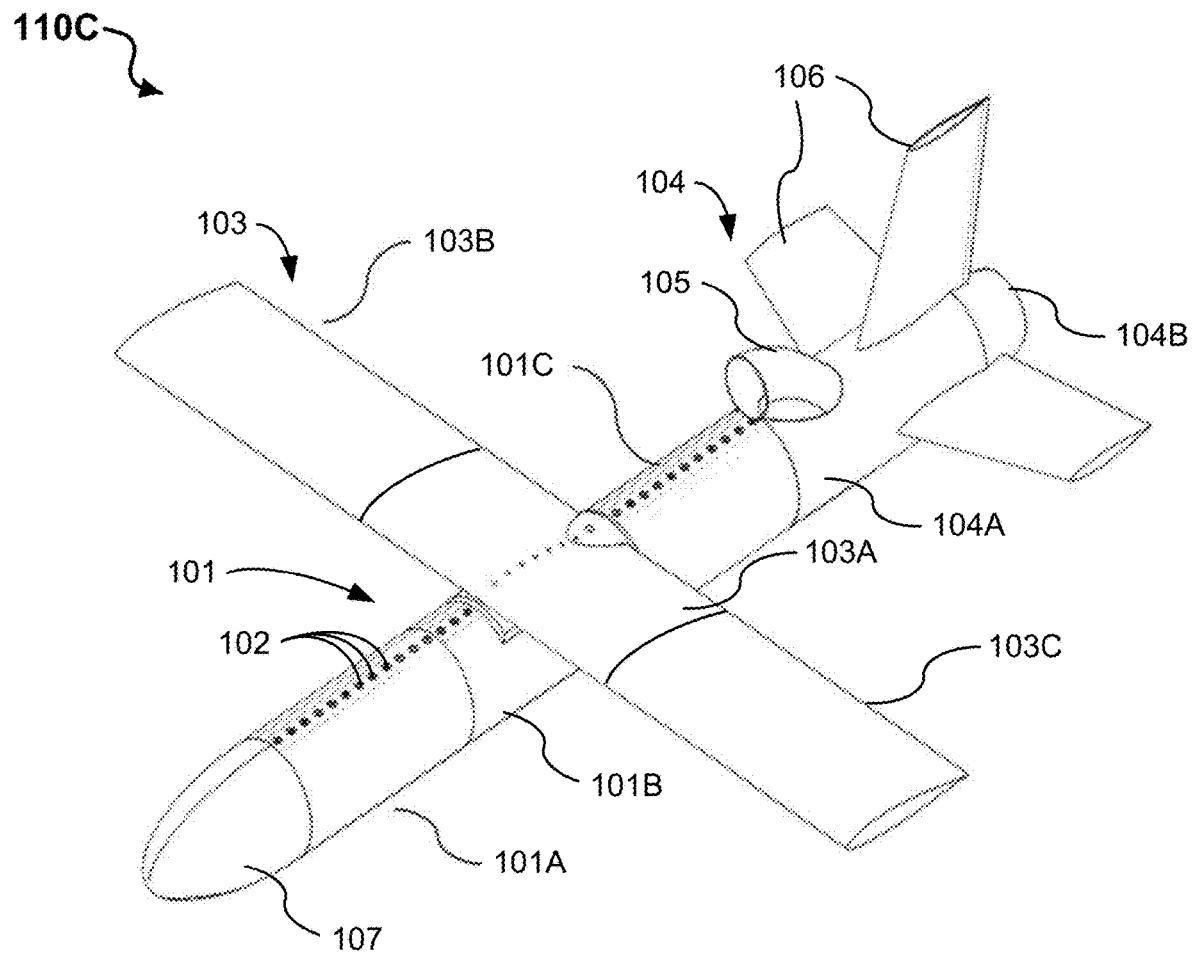
FIG. 1C shows a diagram of an example embodiment of a mission-adaptable aerial vehicle, in accordance with the present technology.

FIG. 1C shows an isometric view schematic of an example embodiment of the mission-adaptable aerial vehicle 110, labeled 110C. The overall system hardware architecture of the mission-adaptable aerial vehicle 110C allows for end-user modifications to enable a wider array of mission capabilities. To facilitate this, the hardware is designed in a manner which makes modifications simple. To this end, the aerial vehicle 110C's airframe is broken up into sections based around function, ability to manufacture most easily, and size. These sections can then be assembled to form the aerial vehicle 110C, which can include in-field assembly of components transportable between different locations for assembly of the aerial vehicle 110C for launch. Assembling and connecting these sections to one another must be done in a manner that achieves structural integrity in all areas of the flight envelope, e.g., during maximum thrust, maximum speed, tightest turning radius maneuvers, and others.

The mission-adaptable aerial vehicle 110C includes a fuselage assembly 101 comprising at least one fuselage section, at least one wing assembly 103, a nose cone assembly 107, and a tail assembly 104. The nose cone assembly 107 can be configured in a variety of geometries and include various modules, such as an imaging module (comprising one or more cameras that are in communication with the electronics unit 113), a sensor module (comprising one or more sensors including but not limited to a motion sensor, a pressure sensor, a temperature sensor, or other sensor, which are in communication with the electronics unit 113), and/or other modules or payloads to be carried by the aerial vehicle 110C. The at least one fuselage section of the fuselage assembly 101 can be configured in a variety of geometries and include an at least partially hollowed interior usable for various purposes, such as to contain payload(s) and energy sources of the aerial vehicle 110C, as well as to store components of the electronics unit 113 and/or power/propulsion unit 112, supplies, or other articles. The wing assembly 103 can be designed into multiple extension modules to adjust aspect ratio, wing loading, loitering times, and ranges for flight of the aerial vehicle 110C and/or to carry various ranges of weight and/or volume for various mission parameters.

As shown in the diagram of FIG. 1C, the fuselage assembly 101 includes three fuselage sections: a front fuselage section 101A, a central fuselage section 101B coupled to the front fuselage section 101A, and a rear fuselage section 101C coupled to the central fuselage section 101B. The nose cone assembly 107 is coupled to the front fuselage section 101A, and the tail assembly 104 is coupled to the rear fuselage section 101C. The wing assembly 103 is coupled to the central fuselage section 101B.

The tail assembly 104 includes a tail segment housing 104A and a tail end component 104B coupled to the tail segment housing 104A, which is coupled to the rear fuselage section 101C. The tail assembly 104 includes an inlet assembly 105 that is configured as a tube (or tubes) attachable at an opening on an outer wall of the tail segment housing 104A to direct air intake into the tail segment housing 104A. For example, in some embodiments, the mission-adaptable aerial vehicle 110C is configured to have a powerplant (e.g., engine) disposed in the tail segment housing 104A; and the tail end component 104B includes an outlet (or a plurality of outlets) to allow exhaust to flow outward and provide thrust for flight of the mission-adaptable aerial vehicle 110C. In some embodiments, for example, the tail assembly 104 includes one or more tail wings 106 coupled to the tail segment housing 104A. In some embodiments, for example, the tail assembly 104 can be entirely interchangeable and configurable to allow for different types of propulsion systems to be (at least partially) housed within and/or used with substantially the same overall aerial vehicle architecture (e.g., fuselage assembly 101 and/or wing assembly 103). As an example, the tail assembly 104 can be configured to facilitate a turbojet propulsion system in the tail assembly, which can be swapped with a pusher propeller-configured internal combustion engine type propulsion system in the tail assembly, where the tail assembly 104 is attachable to the fuselage assembly 101 in either configuration of the propulsion system.

As shown in the diagram of FIG. 1C, the wing assembly 103 includes three wing sections: a right-side wing section 103B, a central wing section 103A coupled to the right-side wing section 103B, and a left-side wing section 103C coupled to the central wing section 103A. The central wing section 103A is coupled to the central fuselage section 101B.

In some embodiments of the aerial vehicle 110C, the aerial vehicle design can use one or more protruded male members from an airframe section configured to slide into corresponding one or more inverse female slots or cavities in order to provide all-axes structural stability between the bodies. In some embodiments, for example, the airframe sections can be fastened together using bolts and nuts, screws and nuts/press inserts, cam-locking systems, clamps, spring locking systems, electro-mechanical locking systems, or other fastening systems. In the fuselage section(s) 101, there may be an array of through-holes 102 along the top and/or bottom of the fuselage section(s) 101, for high-wing and/or low-wing configurations for the wing assembly 103, or along the top, bottom, and starboard and port sides for mid-wing configurations.

Figure 2A:
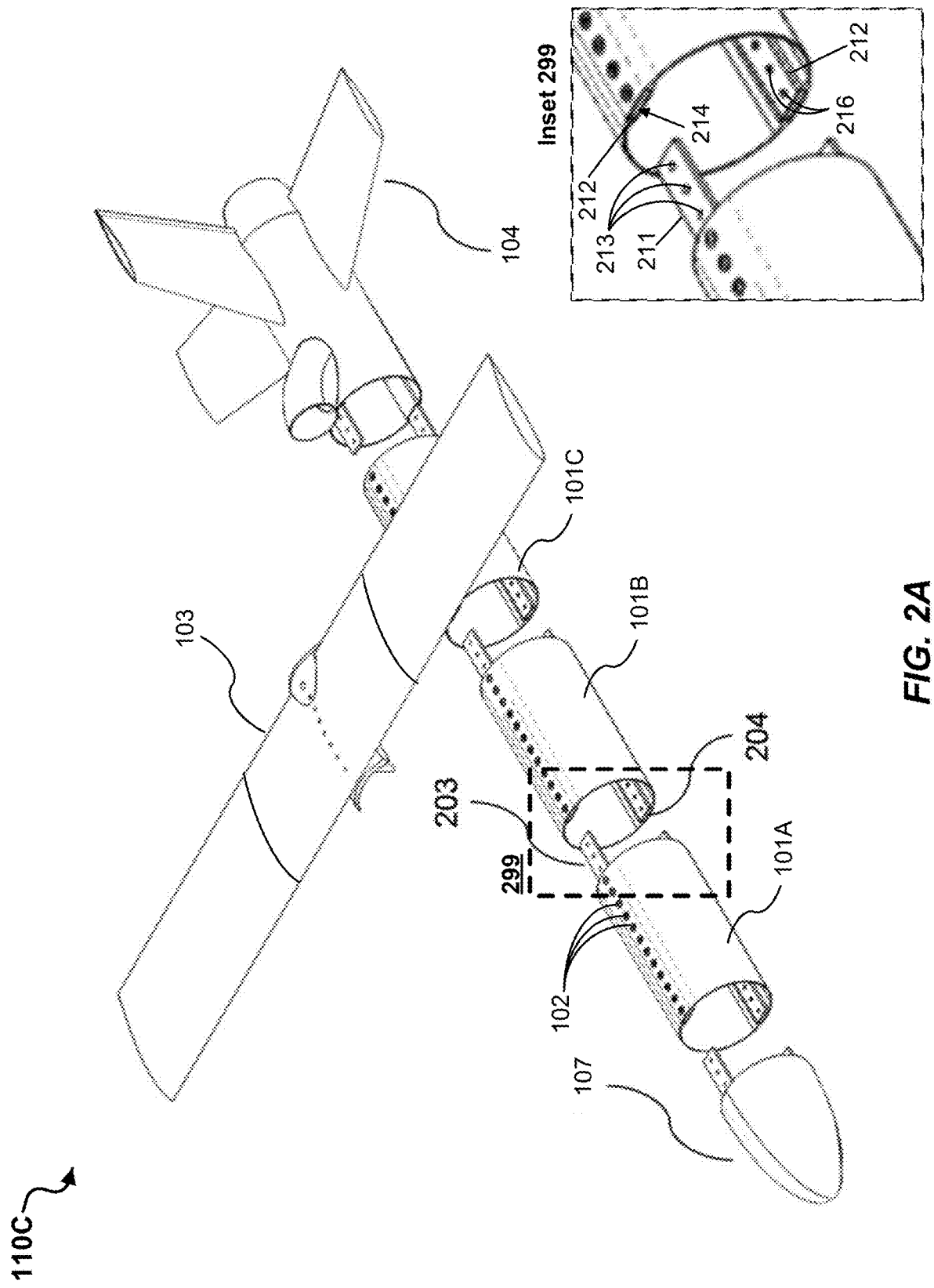
FIG. 2A shows an exploded isometric view of the mission-adaptable aerial vehicle of FIG. 1C.

FIG. 2A shows a diagram depicting an exploded isometric view of the mission-adaptable aerial vehicle 110C shown in FIG. 1C, depicting an example embodiment of an aerial vehicle section and component fastening system, also referred to herein as an integral fastening system. As shown in the diagram of FIG. 2A, the nose cone assembly 107, the fuselage sections 101, the sections of the wing assembly 103, and the tail segment housing 104A of the tail assembly 104 include at least one protrusion 203 that is insertable and securable into a slot or cavity structure 204 on an adjacent segment of the aerial vehicle 110C. In some embodiments, the protrusion(s) 203 are configured to be reversibly insertable and securable in the slot(s) or cavity(ies) 204 to allow the end-user to disassemble the aerial vehicle 110C upon demand.

As shown in inset 299 of FIG. 2A, in some embodiments, for example, the protrusion 203 includes a rod, a bar, a screw, a hook, or other protruding structure, labeled 211, of a geometry that spans outward from the airframe segment to which it is permanently affixed. For example, the protrusion 203 can be permanently attached to an inside surface of the airframe segment (like that shown in FIG. 2A) or on an outside surface, and can be located at a top region, at a bottom region, at a side region, and/or at any combination of the top, bottom, side, or other region of the airframe segment. In some embodiments, for example, the slot or cavity 204 includes a wall structure 212 that wraps at least partially around and forms an opening 214 that leads into the slot or cavity 204. In some embodiments, for example, the protrusion 203 includes one or more holes and/or one or more projections 213 to align with corresponding one or more holes and/or one or more projections 216 within the corresponding slot or cavity structure 204 to which the protrusion 203 is inserted and secured. Inset 299 shows that the protrusion 203 includes a plurality of holes (labeled 213) that can align with a plurality of holes of the slot or cavity 204.

Figure 2B:
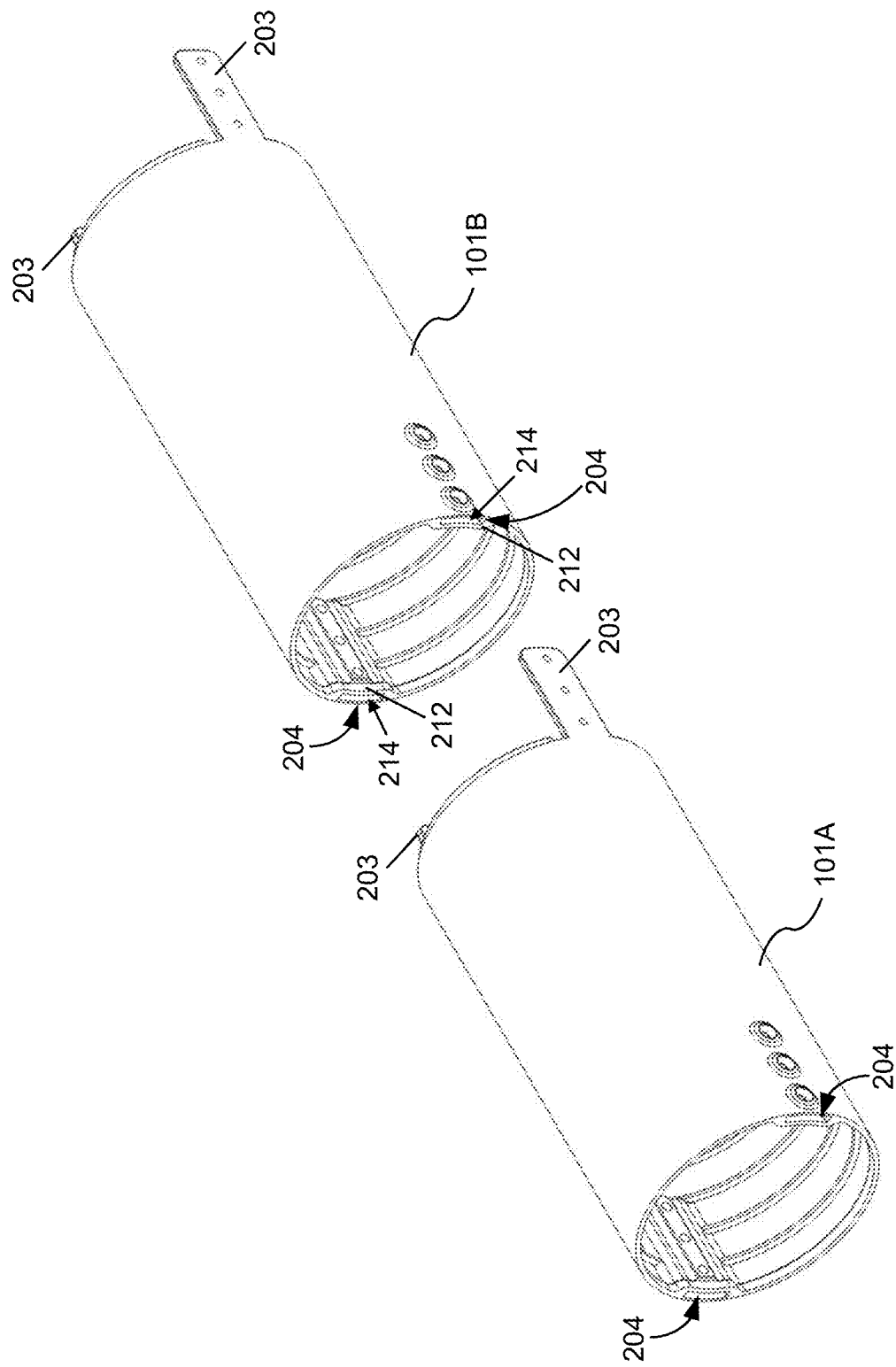
FIGS. 2B and 2C show example embodiments of an integral fastening system between fuselage sections formed as a part of the fuselage sections, in accordance with the present technology.

FIG. 2B shows an example embodiment of an integral fastening system between the front fuselage section 101A and the central fuselage section 101B, where the protrusion(s) 203 and the slot(s) or cavity(ies) 204 are formed as a part of their respective fuselage sections, e.g., which can be through additive manufacturing, in accordance with the present technology. For instance, the wall structure 212 that wraps at least partially around and forms the opening 214 that leads into the slot or cavity 204 can be produced in the same structure as the walls, stiffeners, and other features of the fuselage sections as a single piece/structure; and the protrusion 203 can be produced in the same structure as the walls, stiffeners, and other features of the fuselage sections as a single piece/structure. The example embodiment of the integral fastening system that includes integrally formed fastening components (e.g., additively manufactured in one structure) with the airframe section can be configured on any of the disclosed sections or segments, including the fuselage assembly 101, the wing assembly 103, the nose cone assembly 107, and the tail assembly 104, and/or other airframe structures for various embodiments of the mission-adaptable aerial vehicle 110 in accordance with the present technology.

In various implementations, for example, fastener structures of the integral fastening system can be formed of the same structure as the airframe component, including various shapes and types of protruding fastener structures (e.g., protrusions or projections, such as bolt structures, screw structures, bayonet nubs, etc.) and various shapes and types of receiving fastener structures (e.g., slots or cavities, such as nut structures, threaded holes, bayonet passages, etc.). In some implementations, the fastener structures of the integral fastening system can be produced as part of the same structure as the airframe component through additive manufacturing, injection molding, or other manufacturing techniques.

Figure 2C:
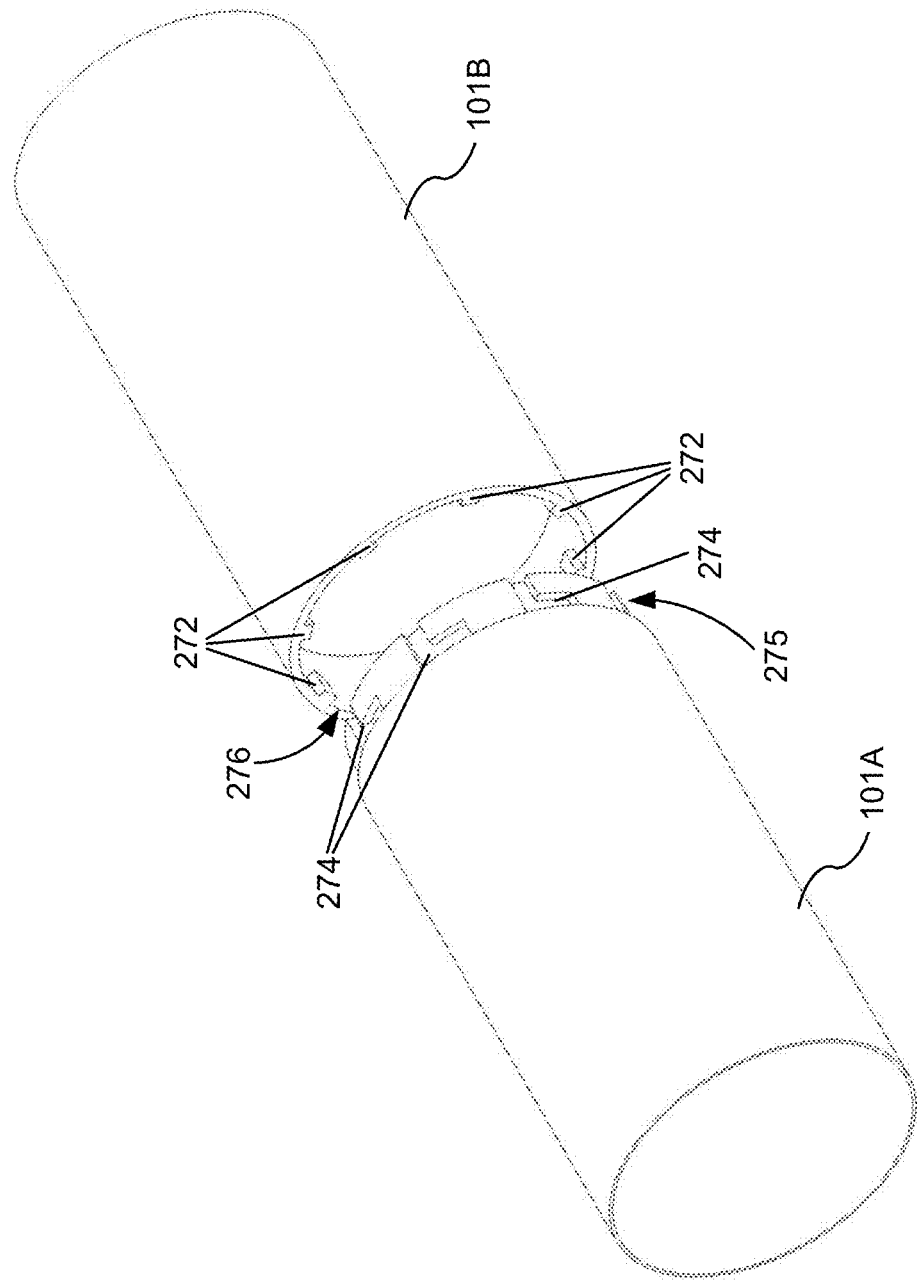

FIG. 2C shows an example embodiment of an integral fastening system between the front fuselage section 101A and the central fuselage section 101B, where the integral fastening system is configured as a bayonet mount system that is formed as a part of the fuselage sections, in accordance with the present technology. The example bayonet mount system includes one or more bayonet passageways 274 that are produced on an indented ledge region 275 at, at least, one end of a fuselage section, e.g., the front fuselage section 101A as shown in FIG. 2C. The example bayonet mount system includes one or more (corresponding) bayonet nubs 272 that are produced on an interior-facing side of an end region 276 of an adjacent fuselage section, e.g., the central fuselage section 101B as shown in FIG. 2C. When the fuselage sections are to be assembled, the bayonet nubs 272 align with the outer, entry region of the bayonet passageways 274 and can be translated and rotated within the passageways 274 to securely connect the fuselage sections together. The example embodiment of the integral fastening system that includes integrally formed bayonet mount system with the airframe section can be configured on any of the disclosed sections or segments, including the fuselage assembly 101, the wing assembly 103, the nose cone assembly 107, and the tail assembly 104, and/or other airframe structures for various embodiments of the mission-adaptable aerial vehicle 110 in accordance with the present technology.

Figure 3:
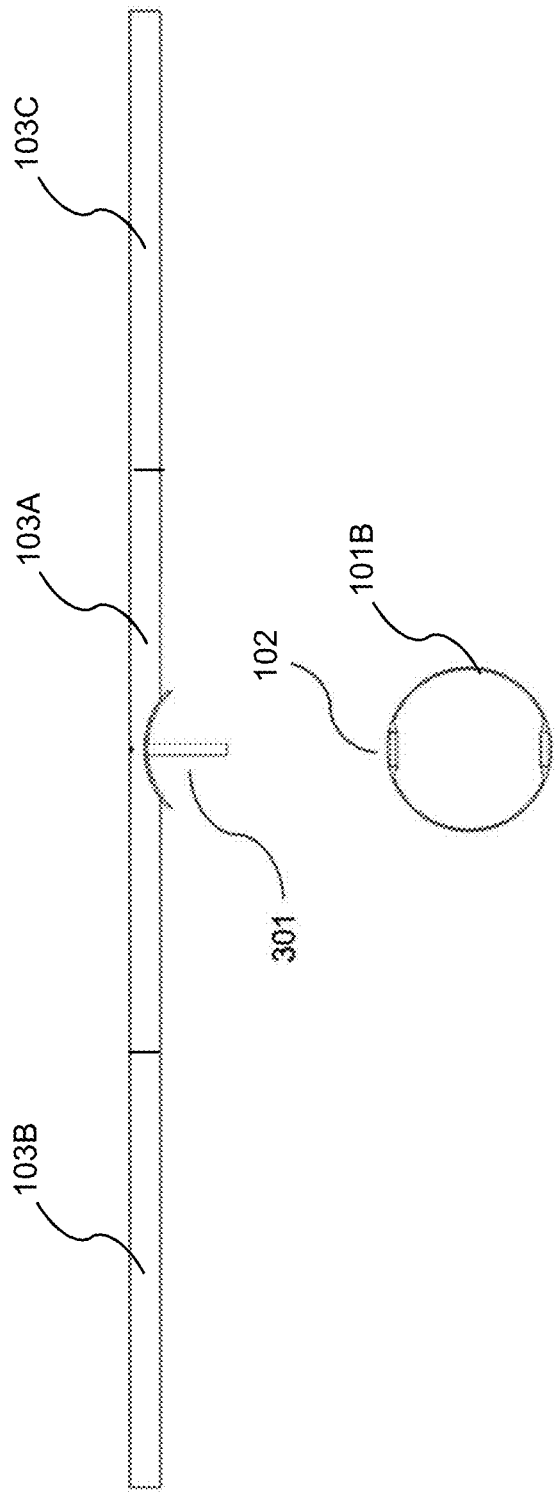
FIG. 3 shows a partial exploded front view of an example embodiment of a fuselage section and wing assembly connection and fastening system of the mission-adaptable aerial vehicle of FIG. 1C.

FIG. 3 shows a diagram depicting a partial exploded front view of an example embodiment of the fuselage section(s) 101 and wing assembly 103 illustrating an example embodiment of the section and component fastening system for attaching the wing, in accordance with the present technology. The example section and component fastening system includes at least one protrusion 301 spanning off a lower surface of the central wing section 103A to insert and be secured within at least one through-hole(s) 102 of the central fuselage section 101B. In some embodiments, the at least one through-hole(s) 102 can include structural features of example embodiments of the slot or cavity 204, e.g., including the wall structure 212.

Figure 4:
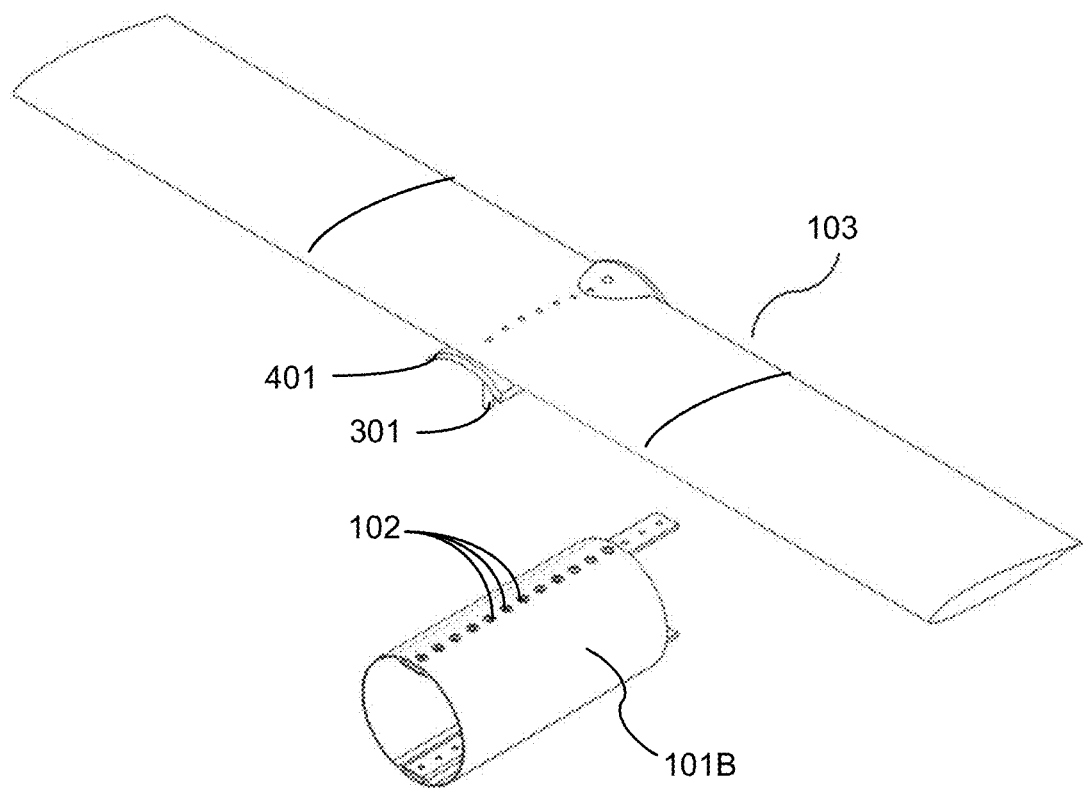
FIG. 4 shows an exploded isometric view of the example embodiment of the fuselage section and wing assembly connection and fastening system shown in FIG. 3.

FIG. 4 shows a diagram depicting a partial exploded isometric view of an example embodiment of the fuselage section(s) 101 and wing assembly 103 illustrating the example embodiment of the section and component fastening system for attaching the wing, shown in FIG. 3. In this example, the central wing section 103A includes a securement base 401 having a curvature matched to the outer surface curvature of the central fuselage section 101B to contact and interface with the central fuselage section 101B (e.g., to support securement of the central wing section 103A with the central fuselage section 101B). For example, the securement base 401 can allow for a plurality of protrusions 301 to project from the central wing section 103A to be insertable into corresponding through-holes 102, in which the protrusions 301 and/or the through-holes 102 can be configured at a variety of angles along the curved surface of the securement base 401 and corresponding surface of the central wing section 103A, respectively. While the diagram of FIG. 4 shows the protrusion 301 coupled to the central wing section 103A and the through-holes 102 on the central fuselage section 101B, it is understood that these features can be disposed on the opposite corresponding structures.

Example through-holes 102 can serve as areas by which to secure sections together, while also providing mounting holes for sections such as the wing section or assembly. In some embodiments with high- or low-wing configurations, the wing section, also called an assembly when comprised of multiple wing sections, has protrusions 301 extending out of it that slide through the fuselage section(s) through holes 302 and allow for fixturing between the bodies. This fixturing can be accommodated through bolts and nuts, screws and nuts/press inserts, cam-locking systems, clamps, spring locking systems, electro-mechanical locking systems, or other fastening systems. This type of section-to-section fixturing can also be used for other sections, e.g., nose cone assembly section(s) 107, tail assembly section(s) 104, stabilizers, empennage, drop/auxiliary fuel tanks, powerplant nacelles, etc.

II. Airframe Section and Component Fastening System

The aerial vehicle section and component fastening system ensures overall structural integrity of the system. In some embodiments, the section and component fastening system can be accomplished using one or more protrusions 203 insertable and securable in slots or cavities 204, like that shown in FIG. 2A, e.g., which may include the use of a fastening device and system in some implementations.

Various embodiments of the aerial vehicle section and component fastening system may be implemented depending on the exact geometries being joined. For example, in some embodiments where circular cross-sectioned sections are used, protrusions and inversely designed slots may be incorporated at the top and bottom of the sections or at the starboard and port sides or at the top, bottom, starboard, and port sides. These sections may also use lap-style flanges that overlap each other running around the circumference of the end of the sections, with one section having a flange that forms the bottom half of the flange and the opposite section having a flange that forms the top half of the flange. In some embodiments, rubber, polymer, composite, and/or other materials can be used as seals, which can also be implemented between the airframe sections and/or components to improve the seal and protect internal components from the outside environment. This configuration provides an improved seal between the airframe sections and/or components versus an abutment-style joining of the opposite ends of the sections.

The disclosed methods of locking the protrusion(s) and slot(s)/cavity(ies) of the fastening system together can also vary depending on the airframe section and/or component geometry. In some embodiments, for example, through-holes in alignment can be used. Here, the protrusion 203 slides into the slot or cavity 204, and in some implementations, fasteners are then placed through the through-holes, locking them in place. In some embodiments of the aerial vehicle section and component fastening system, the fasteners can include (in many shapes and sizes): bolts and nuts, screws and nuts, press inserts, cam-locking systems, bayonet mount systems, clamps, spring locking systems such as spring-loaded detent pins, electro-mechanical locking systems, or other fastening systems. Importantly, the aerial vehicle section and component fastening system ensures that the airframe is structurally sound for flight about all axes of motion and that the sections align well without producing features that unnecessarily increase drag forces on the aerial vehicle. Moreover, the aerial vehicle section and component fastening system can be configured to ensure that the joints between sections offer the right amount of sealing to the outside elements and conditions.

III. Telescoping Wing Assembly

In some embodiments, the aerial vehicle wing section or assembly can have a telescoping wing assembly. The telescoping wing assembly is operable to increase wing area and aspect ratio and decrease wing loading. For example, the telescoping wing assembly can include progressively smaller sections of wing that are housed within a main, largest section of wing and enabled to telescope outward, e.g., in the direction from the root chord to the tip chord on both the starboard and port sides of the aerial vehicle. The telescoping wing arrangement allows the aircraft to change its characteristics, e.g., wing loading, wingspan, wing area, aspect ratio, and others, on-the-fly, which impacts the overall flight performance of the aircraft. The telescoping motion may be accomplished using linear drives, rack and pinions (or a motor-driven circular gear with a fixed linear gear), pulley systems, actuators, gas actuators, pneumatic systems, and other methods. Example embodiments of a variable-sweep, telescoping wing assembly for a mission-adaptable aerial vehicle of the disclosed technology, including a mission-adaptable tube-launchable unmanned aerial vehicle system, are described later in this disclosure.

IV. Fabrication Method for Molding Polymer Fuel Tanks

In some aspects, the disclosed technology includes a fabrication method for molding polymer fuel tanks into cavities within airframe sections in order to maximize fuel capacity per given volume. In some embodiments, the fabrication method can include blow or rotational molding of a polymer (e.g., such as high-density polyethylene (HDPE), polypropylene (PP), regrind plastic (recycled polyethylene), a plastic adhesive, ethyl vinyl alcohol (EVOH), or other chemically-resistant polymers) into portions of an airframe component, for instance, a section of the fuselage or the wing. This process can allow for the maximum fuel tank capacity inside a given space or volume. Similar to blowing up a balloon inside a three-dimensional shape with increasing pressure, blow molding in example implementations of the present technology can take a heated polymer and expand it through a blowing process to the outermost portions of the inside surfaces of the cavity. Rotational molding takes heated polymer and effectively rotates a mold within the heated chamber to coat the mold (or in this case the airframe section) with a thin film of plastic.

In aircraft design, fuel tanks are incorporated in many locations around the airframe where fuel can be safely stored. Blow and/or rotational molding offers a process where fuel tanks can be inexpensively and efficiently produced to maximize fuel capacity in standard or oddly shaped cavities, where other fuel tank production methods would be unable to make use of a given portion of internal space or volume.

V. Flight Computer

In some embodiments of the mission-adaptable aerial vehicle 110, for example, the aerial vehicle can include an onboard flight computer, e.g., which can include one or more features of the data processing device 120. In some implementations of the mission-adaptable aerial vehicle 110, for example, the onboard flight computer is the brain of the aerial vehicle. The flight computer ensures that, whether flying in a piloted mode (either remotely or with pilot onboard) or flying in an autonomous mode (either fully-autonomous or semi-autonomous), (i) control inputs are delivered to the control surfaces to correctly accomplish maneuvers, (ii) subsystems are functioning correctly, (iii) flight data is being recorded correctly, and (iv) many other operations and routines are being carried out successfully. In various embodiments, the mission-adaptable aerial vehicle architecture can include a robust and flexible flight computer. For example, based on large quantities of rigorously and arduously obtained simulation and test data, the flight computer is programmed to adjust settings depending on the configuration of the aerial vehicle airframe and subsystems. As the developer, end-user, or customer makes modifications, these changes are analyzed and accounted for by the flight computer. The flight computer then calculates or is provided new settings by a ground system to enable controlled flight under the new configuration. In some cases, these settings may be determined by onboard calculations by the flight computer, while in other cases the flight computer may be reprogrammed or sent instructions from separate computers, also called ground systems.

VI. Aerial Vehicle Section Library

In various implementations of the present technology, a user of the mission-adaptable aerial vehicle system 100 (e.g., a developer) can build and/or maintain a library of aerial vehicle sections and/or components and their associated data, which can be input into backend databases, the user application(s), and other tools in order to allow an end-user or customer to select and incorporate them into their aerial vehicle system, both digitally and physically. The aerial vehicle section library can also record and store user-input data on entirely custom sections for use in any current and future operations.

VII. Design, Simulation, and Manufacturing Advantages

A key advantage of the disclosed mission-adaptable designs and architectures is that their sections can be rapidly developed in order to keep pace with ever-changing end-user, customer, and mission needs. For example, the disclosed technology allows for a user (e.g., aerial vehicle designer, developer) to use the latest in design, simulation, and manufacturing techniques while harnessing the flexibility of the mission-adaptable, modular benefits of the disclosed aerial vehicle and manufacturing platform. Design and simulation tools and methods, such as computer-aided design (CAD), visual programming environments, parametric design, generative design, finite element analysis (FEA), and computational fluid dynamics (CFD), can be employed to help ensure that new or customized airframe sections can be quickly brought into the aerial vehicle section library and evaluated for their impacts on flight mechanics and dynamics. Physical testing—mechanical, wind tunnel, flight, and others—may also need to occur to obtain the most realistic data. Additive manufacturing, including 3D printing and other manufacturing technologies, such as fused filament fabrication (FFF), continuous fiber (e.g., 6-degree of freedom (DOF) freeform robotic composite application), fused deposition modeling (FDM), binder jetting, multi-jet fusion (MJF), powder bed fusion, digital light processing (DLP), material jetting, selective laser sintering (SLS), selective laser melting (SLM), direct metal laser sintering (DMLS), and others, can be used to directly create production parts or can be used in the development of molds, tooling, jigs, fixtures, and other tools, which can drastically speed up the overall manufacturing process, e.g., moving from 1-month to 1-week or 1-week to 1-day manufacturing timespans. Additive manufacturing allows for parts to be produced with extreme levels of complexity at little added cost, sometimes referred to as complexity for free. Additive manufacturing allows the developer to create aerial vehicles at costs much lower than those which competitors have traditionally been able to achieve. The digital first design-to-end-product workflows disclosed here constitute a competitive advantage against slower-moving and more traditional development techniques. These digital manufacturing techniques, which can be combined with advanced computer numerical control (CNC) and other more traditional manufacturing techniques, also help facilitate the sharing of digital design and manufacturing files which can be easily shared with distributed manufacturing facilities to enable production around the world. This furthers the ability of the developer and its partners and customers to rapidly manufacture components closer to where they are actually needed, cutting shipping times, reducing costs, improving confidence intervals in supply chains, and allowing for quicker responses to on-the-ground activities.

While additive manufacturing techniques, such as 3D printing, are highly advantageous for producing mission-adaptable aerial vehicle structures for certain types of applications, e.g., such as when on-demand modification(s) of airframe components may be needed. Yet, the disclosed airframe components and structures of the disclosed mission-adaptable aerial vehicles may also be designed to be injection molded or subtractively manufactured or hybrid-additively manufactured (e.g., a combination of additive and subtractive manufacturing techniques) using high-performance, engineering-grade filled and non-filled polymers. For example, 3D printing currently has a cost-effective ceiling depending on part size. Injection molding, while relatively expensive compared to 3D printing for the beginning stage(s) of production (such as lead time costs and tooling costs associated with specialized tooling and mold design/redesign to make changes to parts—unlike 3D printing which has no retooling costs), can enable mission-adaptable aerostructure components to be manufactured for a fraction of the cost of 3D printing over a longer period of time and for large volumes of production. While the disclosed additive manufacturing techniques to produce the disclosed mission-adaptable aerial vehicle structures offer superior, high volume, and low-cost manufacturing methods, at least some of the disclosed airframe structures can be produced by injection molding for applications requiring their production at higher volumes and rates (e.g., production of components in the thousands or millions). Examples of the disclosed mission-adaptable aerial vehicle structures that can be produced by injection molding include, for example, the right-side wing section 103B, the central wing section 103A, and the left-side wing section 103C of the example wing assembly 103 shown in FIG. 1C; the front fuselage section 101A, the central fuselage section 101B, and the rear fuselage section 101C of the fuselage assembly 101 shown in FIG. 1C.

VIII. Distributed Manufacturing of Sections

The disclosed methods for design and manufacturing the modularized, mission-adaptable sections of an aerial vehicle 110 are able to provide on-demand, low-cost, and transportable capabilities for fabricating the aerial vehicle in virtually any single location, which can be moved from location to location as needed. Yet, furthermore, the disclosed methods of design and manufacturing allow the developer to manufacture aerial vehicle sections and/or entire aerial vehicles in a distributed fashion, e.g., where sections may be manufactured at disparate locations around the world. By implementing a distributed manufacturing strategy, for example, the disclosed methods can insure against supply chain disruptions, bring manufacturing closer to the end-user, allow for quicker time-to-part, and help teams develop new products more quickly. Through a network of manufacturing centers, specialized parts can be quickly manufactured and shipped around the world. Other common parts and adapters that are known to be often replaced and/or useful for an aerial vehicle can be packaged together with the main airframe elements as part of a kit or assembly.

In some embodiments, the distributed manufacturing process includes a remote manufacturing system integrated into a transportable container, such as a shipping container box (a large metal cargo container, sometimes referred to as a connex). For example, the remote manufacturing system is an embodiment of the additive manufacturing system 130. In some embodiments, the remote manufacturing system includes one or more 3D printer devices, one or more storage units for raw materials, processing materials, and components, and one or more computing devices for controlling the 3D printer device(s). In various implementations, for example, the remote manufacturing system can provide for distributed and obfuscated automated manufacturing of the mission-adaptable aerial vehicles 110. For instance, in some implementations, a remote manufacturing system can include a single 40 ft.-long manufacturing cell (e.g., which can be divided into two 20 ft.-long cells) to produce dozens of small or moderate-sized aerial vehicles (e.g., 25 lbs. of mass) on a weekly or multi-weekly basis, where the equipment of the remote manufacturing system is powered by generators that can be disposed in austere locations. In this manner, the remote manufacturing system can allow for aerial vehicle production with limited human intervention and still be strategically staged for quick responsiveness to demand needs.

Figure 5:
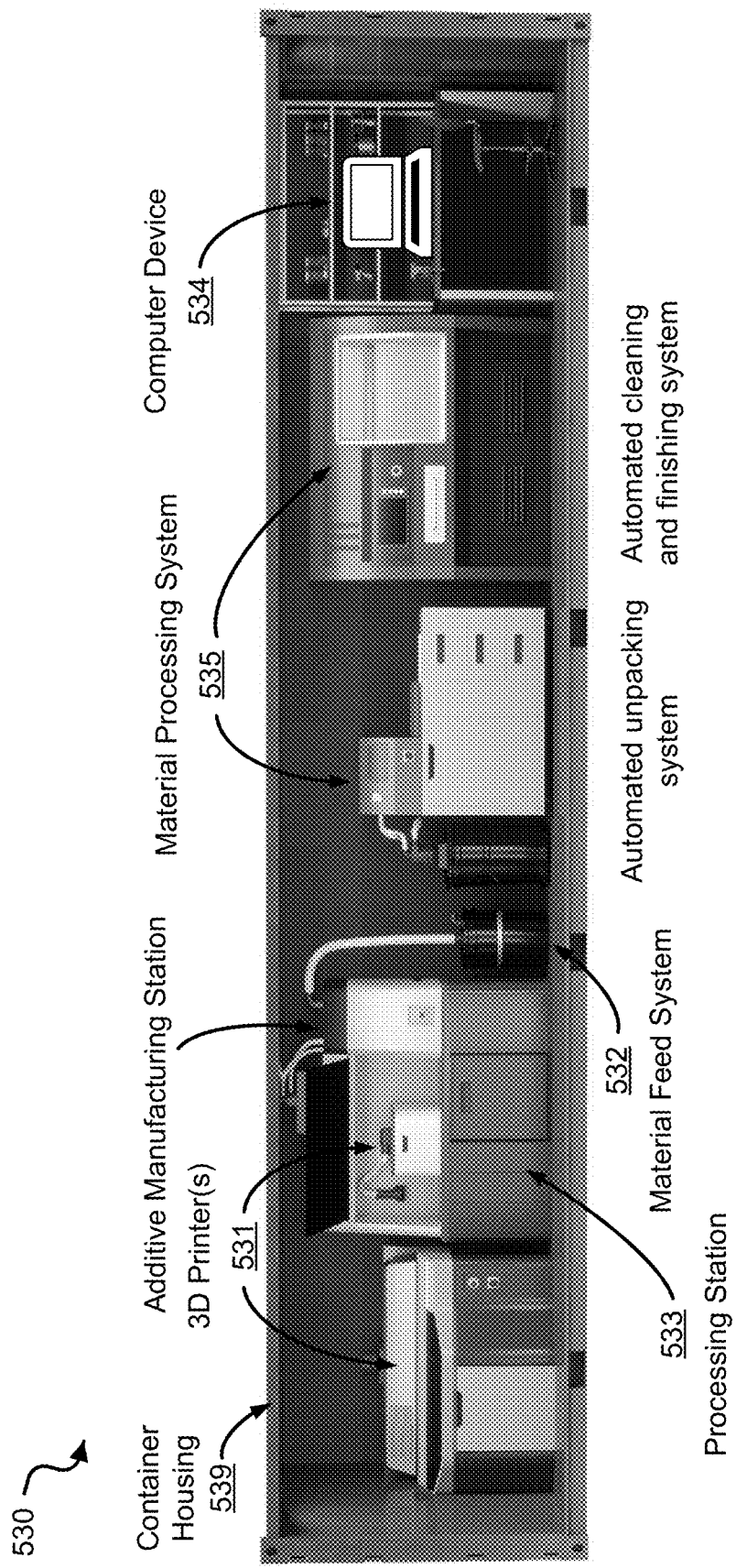
FIG. 5 shows a diagram of an example embodiment of a remote and transportable mission-adaptable aerial vehicle manufacturing system in accordance with the present technology.

FIG. 5 shows a diagram of an example embodiment of a remote and transportable mission-adaptable aerial vehicle manufacturing system 530 in accordance with the present technology. The system 530 includes a container housing 539, such as a standard 40-foot or 20-foot shipping container, which can enclose the equipment, materials, and products of the system 530. The system 530 includes one or more additive manufacturing station(s) that comprises one or more 3D printer(s) 531 to produce airframe components and/or sections of a mission-adaptable aerial vehicle 110; a material(s) feed system 532 that provides the input materials and/or chemicals to the one or more 3D printer(s) 531; and a processing station 533 to hold, secure, and/or interface the 3D printer(s) 531 and the material(s) feed system 532. The system 530 includes a control computer device 534 (e.g., which can be embodied as a personal computer such as a desktop computer or laptop computer and/or a mobile communication device such as a smartphone, a smart wearable, etc.) operable to execute a software application ("app") to control functionalities of the additive manufacturing station including the 3D printer 531 and/or the material(s) feed system 532, as well as data processing, storage, and input/output functionalities for the design of airframe components to be produced by the additive manufacturing system. For example, an end-user can operate the control computer device 534 using the app to communicate with the data processing system 150 to access one or more libraries to obtain and/or modify specifications and data associated with airframe sections and subsystems to be produced for the mission-adaptable aerial vehicle(s) 110 to be manufactured in the remote and transportable mission-adaptable aerial vehicle manufacturing system 530.

In some embodiments, for example, the remote and transportable mission-adaptable aerial vehicle manufacturing system 530 can include a materials processing system 535, which comprises one or more of a chemical hood, a chemical storage unit, and chemical processing equipment including but not limited to a vacuum pump, a compressor, a heat exchanger, a centrifuge, a blender, a mixture, an agitator, etc. In some implementations of the materials processing system 535, the chemical storage unit can include a desiccant chamber, a refrigeration unit (e.g., refrigerator and/or freezer), a cryofreeze station, etc. In some embodiments, for example, the materials processing system 535 can be configured to include an automated unpacking system and/or an automated cleaning and finishing system.

IX. End-User Customized Sections

In some embodiments, the data processing system 150 can be configured to allow the end-user or customer to pay the developer for access to directly modify library airframe sections or to develop entirely custom sections of their own. For example, base digital design and manufacturing files, along with design guidelines and procedures, can be shared to the end-user or customer, where the end-user or customer can then be able to customize aerial vehicle sections. For example, after the end-user or customer has completed the design work, the digital files and data including the airframe section weights, balances, and measurements can be shared with the developer in order to simulate the changes to the aerial vehicle's flight performance or work through a guide on using this set of applications themselves. Once the simulations have been performed, the flight computer is delivered new instructions on how to control the aerial vehicle based on the data produced from calculations using user input data and the outputs of the various simulations. If, for whatever reason, the simulations are not able to produce modifications to the flight controls with a high confidence interval of successful flight, the user and/or the developer can be notified and can then take further steps to produce safe updates to the flight computer of the aerial vehicle.

Figure 6:
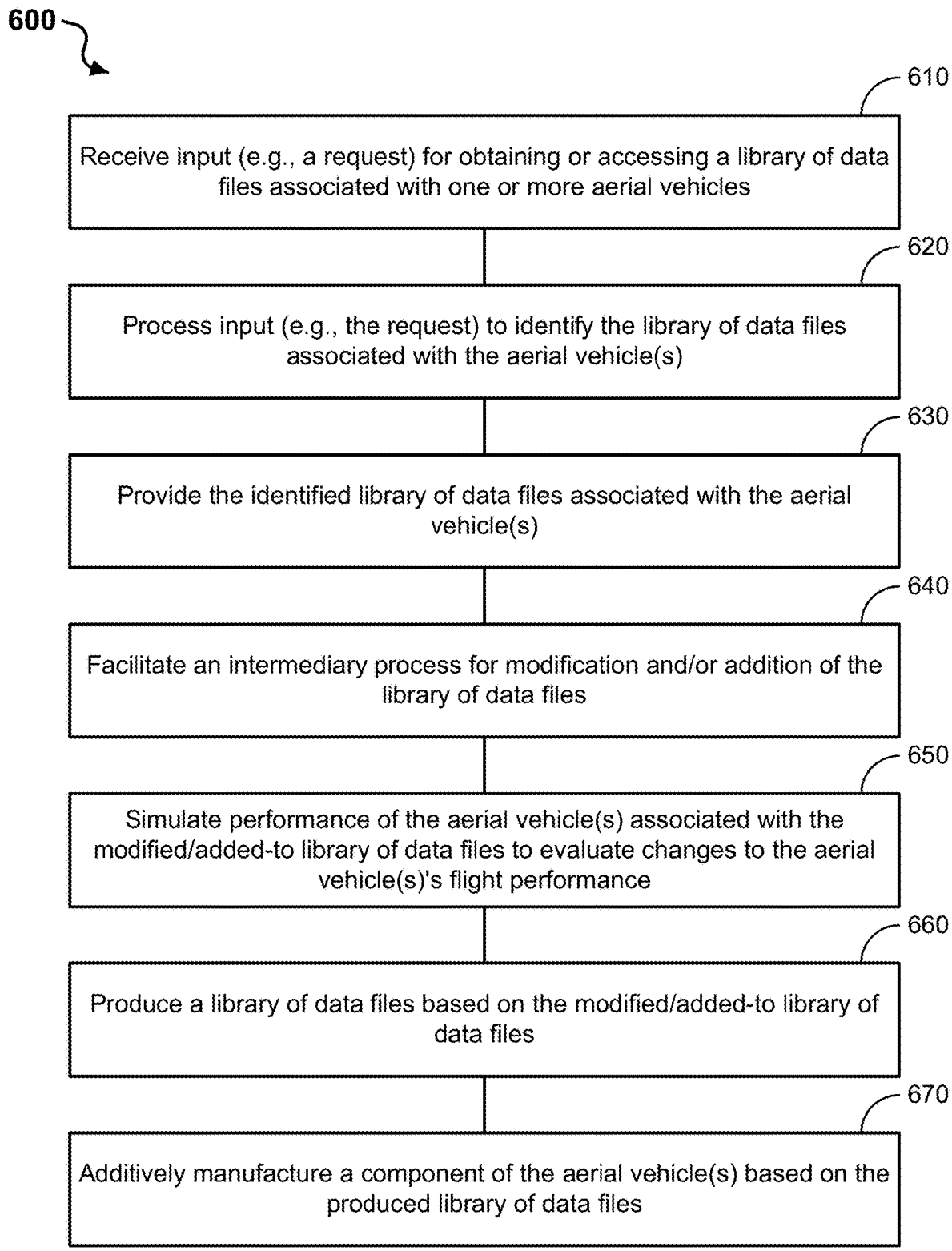
FIG. 6 shows a diagram of an example embodiment of an aerial vehicle customization method in accordance with the present technology.

FIG. 6 shows a diagram of an example embodiment of an aerial vehicle customization method 600 in accordance with the present technology. The method 600 can include a process 610 to receive, at the data processing system 150, an input (e.g., a request) for obtaining or accessing a library of data files associated with one or more aerial vehicles. In some implementations of the process 610, a request is sent by the client computer device 130B of the additive manufacturing system 130; whereas in some implementations of the process 610, the request is sent by another computer device of the mission-adaptable aerial vehicle system 100 or a computer device external to the system 100.

The method 600 can include a process 620 to process, at the data processing system 150, the request and identify the library of data files associated with the one or more aerial vehicles. In some implementations, the process 620 includes searching a database of a plurality of libraries and/or data files to identify the requested library of data files. In some implementations of the process 620, for example, the database searched includes the one or more databases 154. For example, the data processing system 150 can conduct the search and determination of the requested library of data files based on key words, index or reference values, and/or parameters associated with aerial vehicles, airframe segments or components, and/or aerial vehicle mission constraints.

The method 600 can include a process 630 to provide, by the data processing system 150, the identified library of data files associated with one or more aerial vehicles, e.g., to the requesting computer. In some implementations of the process 630, the data processing system 150 can evaluate the data files to determine whether at least some of the data files of the identified library are accessible to the entity providing the input (e.g., request) to obtain or access them, which can be based on authorization (security verification) of the entity and/or compatibility of the data files. When such accessibility (e.g., authorization and/or compatibility) requirements are met, the data processing system 150 can send the accessible data files of the library to the entity that provided the input to obtain or access them.

The method 600 can include a process 640 to facilitate, at the data processing system 150, a modification and/or addition of the library of data files by the entity that provided the input, i.e., an intermediary process for modifying and/or adding to the library, where the modification and/or addition of one or more data files of the library made by the entity creates a tentative or pending library that is to be verified by the data processing system 150 for technical feasibility. For example, the modification and/or addition of data or data files of the library of data files can be implemented by the computer device of the entity (e.g., client computer device 130B or other system or non-system computer device), where the data processing system 150 receives the modified/added-to data and creates the tentative or pending library accordingly. In various implementations, for example, the changes can include modification data associated with weight, balance, performance, and/or dimensional measurement(s), material(s), material property(ies), and/or other parameter(s) of an airframe component.

The method 600 can include a process 650 to simulate, at the data processing system 150, performance of the aerial vehicle(s) associated with the tentative or pending library to evaluate the changes to the flight performance of the aerial vehicle(s). In some implementations of the process 650, for example, the process 650 can include receiving performance constraints for the simulation. In some implementations of the method 600, the processes 640 and 650 can be repeated based on the results of the simulated performance of the aerial vehicle(s).

The method 600 can include a process 660 to produce, at the data processing system 150, a library of data files based on the modification and/or addition of one or more data files of the library. In some embodiments, for example, the produced library of data files includes a manufacturing protocol to account for the design changes in the airframe component(s) of the one or more aerial vehicle(s) associated with the library. In some implementations, for example, the process 660 includes sending the produced library of data files to the entity, such as the client computer device 130B of the additive manufacturing system 130, which the additive manufacturing system 130 can be used to manufacture the aerial vehicle(s) associated with the produced library.

In some embodiments of the method 600, for example, the method 600 can include a process 670 to additively manufacture (e.g., 3D print) a component of the aerial vehicle(s), e.g., one or more airframe(s) and/or section and component fastening system(s), based on the produced library of data files, e.g., part files obtained from the library and/or modified/added-to from the process 660. For example, the process 670 to additively manufacture (e.g., 3D print) a component of the aerial vehicle(s) can be implemented to produce one or more airframe sections with features of the integral fastening system as part of the airframe structure that are additively manufactured as a single structure.

For example, in some implementations of the disclosed technology, the method 600 can be used to produce example embodiments of the mission-adaptable aerial vehicle 110 that include the following specifications, described in Table 1.

TABLE 1

|  | AV-1 | AV-2 | AV-3 | AV-4 | AV-5 | AV-6 |
|---|---|---|---|---|---|---|
| Weight Class (lbs.) | 10 | 25-50 | 100 | 250 | 750 | 1000 |
| Carriable Payload Weight (lbs.) | 2 | 5-10 | 10-20 | 50 | 150 | 200 |
| Cruise Velocity (mph) | 75 | 150 | 210 | 270 | 310 | 310 |
| Range (mi) | >20 | >200 | >350 | >500 | >700 | >700 |

X. Ease of Assembly/Disassembly/Reassembly

Mission-adaptable aerial vehicle assembly, disassembly, and reassembly protocols for different mission sets are able to be intuitive based on the structural design of the airframe segments and the section and/or component fastening system, such that instructions can be configured for non-technical users to be straightforward and delivered to the end-user by a user software application (e.g., the in-field app on the computer device 140), thereby allowing for a multitude of potential end-users. When adding fuselage sections with additional fuel tanks, for instance, the end-user can be instructed to connect or "plumb" the fuel tanks together, thus forming the larger overall fuel capacity for the aircraft. When changing where different weights of the system are located, for example, the end-user can be instructed to change the position of the wing, e.g., a software application can instruct the user to move the wing forward by two positions for optimal performance.

In some implementations, for example, the mission-adaptable aerial vehicle system 100 can enable the in-field software application on the computer device 140 to allow the end-user to update, modify, and/or add to and/or run a simulation using a library of data files associated with one or more aerial vehicle(s) 110, e.g., such as by implementing an example embodiment of the method 600. For example, as the end-user realizes or is instructed to modify a mission of the mission-adaptable aerial vehicle 110 that the end-user has the components for, the end-user may wish to make a modification to the aerial vehicle 110 (prior to assembly) and utilize the in-field software application to perform a simulation using new parameters associated with the mission, by which the in-field application outputs a new assembly protocol involving the use of different airframe components and/or aerial vehicle accessories to construct the aerial vehicle re-designed to achieve the objectives of the modified mission. For example, during use of the in-field software application, the end-user may move one or more sections from the airframe section library with respect to the aerial vehicle design and/or add a different section or sections into the design (where associated data such as centers of gravity (CG) (also called balances), weights, and measurements are used and updated with respect to the inputted constraints of the new mission). Moreover, the position of the modified and/or added section(s) is imported to the flight computer (e.g., electronics unit 113 of the aerial vehicle 110 to be/being assembled), e.g., to update any flight programming.

In some embodiments of the mission-adaptable aerial vehicle 110, for example, the segments and/or components, and/or the connector components (e.g., protrusions and/or slots/cavity walls) of the section and/or component fastening system, can include one or more sensors to determine a spatial position or a relative position of the component to which it is attached (e.g., proximity sensing), which can assist in connection of components during the assembly and/or verify securement of the components during or post assembly. During assembly, for example, the end-user can enter these positions of the components manually into the software application or make use of sensor(s) (e.g., which can be configured in arrays) that can detect the position of sections. For instance, in some embodiments, the one or more sensors can include optical sensors that read encoded messages, radio frequency identification (RFID) chips and readers, or other position-sensing sensor devices (e.g., accelerometers, gyroscopes, magnetometers, inertial measurement unit (IMU), or other). As the end-user moves certain sections, for example, the software application and/or flight computer may deem it necessary to move the position of other sections, e.g., the wing section or assembly, to correct the position of the center of pressure (CP), or to swap entire sections, such as the powerplant, stabilizers/control surfaces, empennage, or others. The software application may output instructions to the end-user (e.g., on the computer device 140) to direct the physical modification of the assembly of components of the aerial vehicle 110.

XI. Application and User Interface

In various implementations of the mission-adaptable aerial vehicle system 100, a software application and associated user interface on a user computer device (e.g., computer device 140 and/or client computer device 130B) can allow end-users to easily access digital representations of their aerial vehicle(s), e.g., aiding in the assembly and configuration. The software application on the end-user computer and the backend database(s) and processing services of the data processing system 150 can assist the user in modifying the configuration of the aerial vehicle(s) 110 given new sections, payloads, weights, balances, geometries and their associated drag implications, and other variables. The user interface can be operable from computers, tablets, and smartphones and can have graphical elements that make its use very simple, even for users with a lack of technical abilities. The simple and intuitive user interface of the software application of the present technology can enable an operator in the field to easily move, replace, and/or modify sections of a mission-adaptable airframe while being provided on-screen instructions on how those modifications can change flight dynamics and control or stability derivatives. In some implementations, the user interface of the software application is configured to provide the end-user with informative visual instructions for assembly, e.g., where the approach detailed here informs the user in a step-by-step, sequential in-application workflow.

In some implementations of the user interface, for example, the user opens the software application and clicks on or taps the portion of the application that details their aircraft type and collection or library of available sections and components. The user may use a touchscreen interface, for instance, to tap, drag, and drop components or sections out of or into the assembly. As the user does so, they are guided on how their modification has changed the flight dynamics and stability or control of the overall system. The user is then instructed on how they need to modify elements, such as wing placement, control surface sizing, powerplant output or thrust, as well as other variables, to accommodate the change in weight, a center of gravity, an aerodynamic center, fuselage length, added or reduced drag, powerplant type, or other aspects.

XII. Ability to Integrate Easily with Legacy and Other Technology

Legacy systems can often be found in abundance in the United States or around the world. These legacy systems often are scuttled or sent to other countries as wealthier countries advance their technologies, while poorer countries may not necessarily have the privilege to do so. However, the legacy components or systems are oftentimes still very effective at accomplishing the mission that their replacements perhaps complete in an improved way. The ability to easily integrate, incorporate, or attach these alternate payloads into an advanced, mission-adaptable aerial vehicle airframe enables the customer to create relatively inexpensive solutions that otherwise would not be possible or may be too expensive.

The ability to rapidly modify sections allows a developer to perform integrations with legacy systems, for instance in the defense, military, and intelligence spaces, or among the commercial aviation spaces (e.g., for cargo shipping or passenger travel), among many others. The open and mission-adaptable architecture extends to the ability to connect to and integrate with a large array of peripheral or auxiliary devices or systems. A customer may wish to use a legacy inventory device that other developers are not willing to integrate with due to entrenchment and high development costs, whereas the mission-adaptable aerial vehicle architecture envisioned here flexibly adjusts to accommodate technologies. For example, a customer may have a legacy surveillance or camera system that they would like to not go to waste, or perhaps their other, newer systems became damaged or unusable. With the ability to quickly produce and integrate components, the camera system could be integrated and ready to fly within hours. The developer can work with the customer to rapidly figure out the best method with which to integrate and connect the camera system through the flight computer's printed circuit board assemblies (PCBAs) and broad selection of digital communication ports or buses, such as peripheral component interconnect express (PCIe) buses, universal serial buses (USB), high-definition multimedia interface (HDMI), and many others.

XIII. Launch Methods

The mission-adaptable aerial vehicle may take off or be launched by way of many different means. The disclosed technology enables multiple methods for the aerial vehicle(s) 110 to be launched or take off under their own power or with a form of assistance by an external source or device. In some implementations, for example, where sizes and weights permit, the aerial vehicle may be hand-thrown into the air by the end-user. In other cases, the aerial vehicle can be launched using a pneumatically wound cable and motor, spring force, or electromagnetically powered catapults, among other types. In further cases, the aerial vehicle may be launched using a detonated charge, rocket booster, or rocket booster and sled arrangement, or may be spun and released on a tether. The aerial vehicle may also take off under its own power, using solely its main propulsion powerplant or multiple "stages," such as an initial rocket booster stage(s), which jettisons away or stays attached to the aerial vehicle airframe. The aerial vehicle may be air dropped or launched from other fixed wing, rotary, or lighter-than-air aircraft. It may be launched from the air, sea, or land, allowing the user the most flexibility in deployment.

XIV. Landing and/or Recovery Methods

In cases where the aerial vehicle is being deployed for a roundtrip mission, it will need to be recovered. The disclosed technology enables multiple methods for the aerial vehicle(s) 110 to be recovered or direct the landing. In some embodiments, for example, the aerial vehicle 110 includes landing gear to enable a controlled landing. For example, the landing gear can be configured on the aerial vehicle 110 to be either fixed or deployable. For example, landing and/or recovery can be through means such as: hook and cord or cable recovery, where a hook located on the aircraft catches a cord or cable deployed by the user; net recovery, where the aircraft flies into a large net; water landing, where an aerial vehicle produced with buoyancy features lands in a body of water for recovery; belly landing, where the aerial vehicle lands without landing gear on a surface capable of withstanding the landing forces and abrasions; chute recovery, where the aerial vehicle deploys one or multiple chutes from one or several of its sections; as well as other recovery methods. This flexibility of landing and/or recovery of the mission-adaptable aerial vehicle(s) 110 also provides the end-user with previously unobtainable abilities to quickly react to changing theater conditions.

XV. Methods in which the Aerial Vehicle May be Transported or Carried

In some embodiments, the mission-adaptable aerial vehicle may be small enough to be human-carried, for instance in its disassembled form in a backpack or similar. In other cases, the aerial vehicle can be too large and/or heavy to allow for human-carrying and must be transported via other mechanized means. Below weights safe for a single or several humans to lift, the aerial vehicle is easily transported, allowing the user to move into advantageous positions before assembling and deploying or launching.

XVI. Multi-Inlet Air Intake Configuration

In some aspects, example embodiments of the mission-adaptable aerial vehicle 110 can include a multiple inlet duct for directing airflow into a variety of air-breathing powerplants, such as an engine, disposed within the aerial vehicle. In some embodiments, the mission-adaptable aerial vehicle 110 includes at least three inlet ducts serving a single air-breathing engine for improved airflow and aerodynamics. In some embodiments, the mission-adaptable aerial vehicle 110 includes four inlet ducts equidistantly spaced along the airframe segment to direct the air into the engine. These designs are empowered by and efficiently achievable through the implementation of additive manufacturing or 3D printing techniques, like those described herein. In addition to directing airflow, the multiple inlet duct structure can also be used to cool electronics or otherwise transfer fluids for useful purposes.

For instance, a key requirement for an aircraft propulsion system is for the inlet duct to channel the airflow needed to generate sufficient thrust for flight. Aircraft platforms operating within the Earth's atmosphere employ some form of ducting airflow to the propulsor to achieve the desired flight performance. For aircraft with the propulsion system embedded within the fuselage, a single duct or a bifurcated duct configuration is typically a preferred design for efficient engine/airframe integration; and most of these designs require the intake portion of the duct to face perpendicular or nearly perpendicular to the incoming airflow, e.g., typically in order to obtain enough airflow.

Yet, challenges in drag/drag reduction and/or inlet designs that can accommodate (e.g., be placed around/outside of) the various aircraft subsystems emerge for smaller-sized unmanned aircraft systems, such as some among the example mission-adaptable aerial vehicles disclosed herein, which led to a new and alternative aircraft intake design as described below. The new air intake configuration in accordance with the disclosed technology is able to accommodate aerial vehicles with compact form factors and reduce the ram drag typically associated with airflow being ingested into the inlet duct. The multiple inlet duct configuration has only recently been manufacturable at sizes and scales that make it viable for aerospace products because of additive manufacturing processes (like those disclosed herein) to produce them, such as binder jetting, digital light processing, laser powder bed fusion, selective laser sintering, selective laser melting, fused deposition modeling, jetting, etc. In some implementations, for example, the multiple inlet duct structural designs could also be cast/investment cast, multi-axis machined, or molded, but potentially with much more difficulty.

In some embodiments, the mission-adaptable aerial vehicle 110 includes a turbine-powered aircraft with an example embodiment of the multiple inlet duct having multiple inlets/intakes defined on a fuselage or tail assembly segment in four equally-spaced quadrants, also referred to as the "quad inlet duct." In some embodiments of the quad inlet duct or other configurations of the multiple inlet duct, for example, all of the openings of the inlets/intakes are flush on the airframe segment's surface (e.g., fuselage surface), though lips or scoops could also (optionally) be used to drive airflow into the multiple inlets/intakes of the duct, where different drag penalties would be imparted depending on the size and scope of the lip/scoop. The multiple inlets connecting to the multiple intakes of the multiple inlet duct converge into one larger duct prior to reaching the engine (e.g., turbine engine compressor face) placed downstream of the entire duct system.

The quad inlet duct was determined through difficult design and simulation processes to achieve consistent pressures across the compressor face, thus improving engine performance. Many design and intended flight envelope/performance characteristics or variables can be evaluated and custom length, size, cross-section shape, loft or pathway curves, etc. can be created to attempt to achieve consistent pressures in order to obtain optimal performance. For instance, the design must account for the aerial vehicle's flying at various angles of attack where lower inlets would be ingesting airflow differently than upper inlets or if dealing with intake duct design constraints around other aircraft subsystems where ducts may need to be different lengths, shapes, or sizes with different skin friction drag and/or pressure recovery properties. The inlets of the multiple inlet duct must uniformly deliver air to the compressor inlet with as little turbulence and pressure variation as possible.

Another example constraint of the quad-intake design is that during forward flight, the intakes do not ingest ram drag that directly affects thrust output from the propulsion system. Ram drag is the loss of thrust in a turbofan or turbojet engine that is caused by increasing the velocity of the air entering the engine. Ram drag is the difference between gross thrust and net thrust. Ram drag is produced when free stream air is brought inside the aircraft. Jet engines bring air on board, mix the air with fuel, burn the fuel, and then exhaust the combustion products to produce thrust. Considering a basic thrust equation, there is a mass flow times entrance velocity term that is subtracted from the gross thrust; this "negative thrust" term is the ram drag. Cooling inlets on the aircraft are also sources of ram drag.

The disclosed multiple inlet/intake duct configurations are achievable (and producible) by advanced manufacturing methods and can further provide more optionality for aerial vehicle designers. For example, there is lower ram drag associated with the flush intake arrangement, which is one of the main features of the quad-intake design, in accordance with the present technology. Notably, the flushed intake arrangement offers the required form factor for tube-launched vehicles, without the need for articulating stabilizers.

Figure 7:
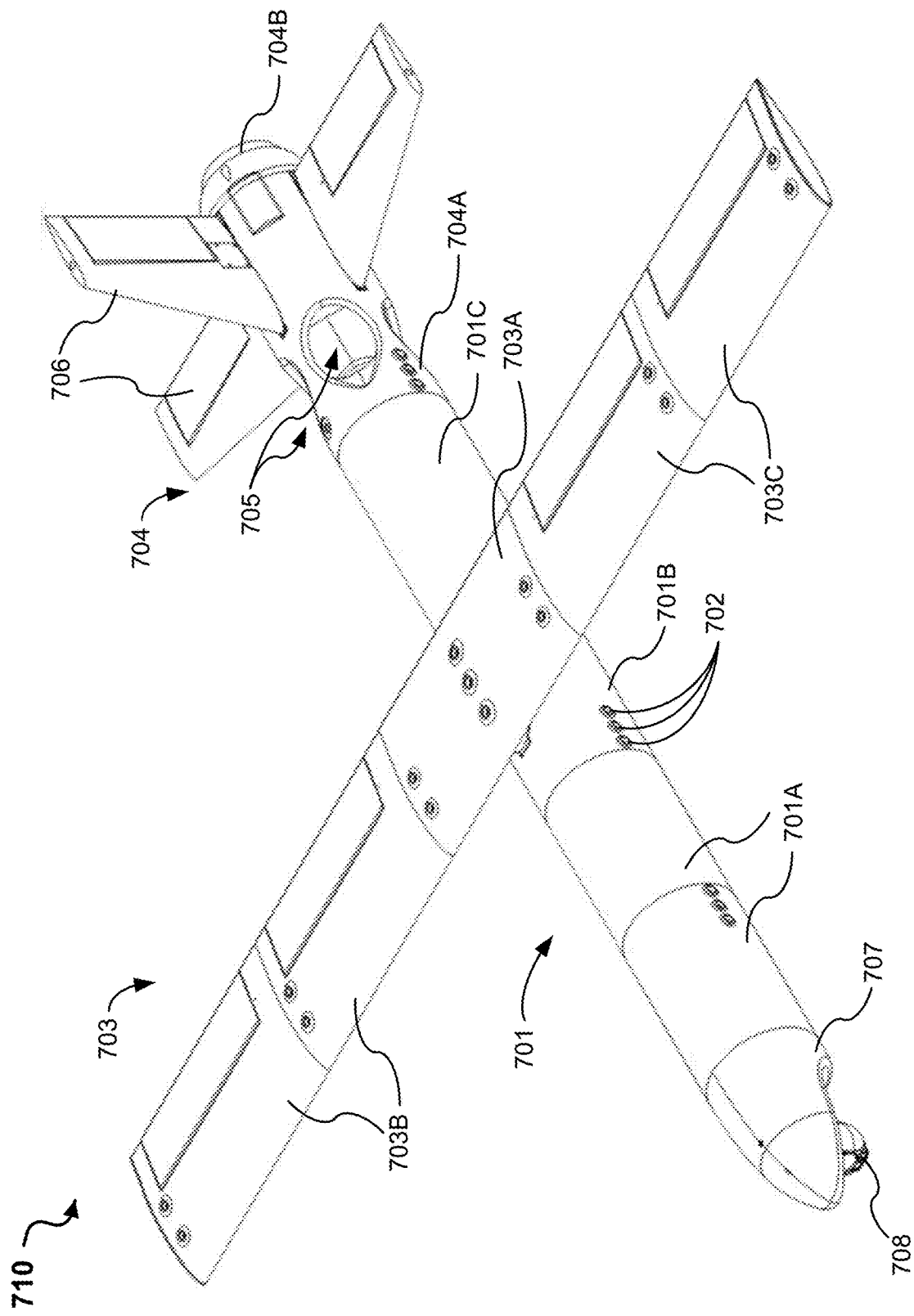
FIG. 7 shows a diagram illustrating an isometric view of an example embodiment of a mission-adaptable aerial vehicle, depicting an example embodiment of the multiple inlet duct, in accordance with the present technology.

FIG. 7 shows a diagram illustrating an isometric view of an example embodiment of the mission-adaptable aerial vehicle 110, labeled 710, depicting an example embodiment of the multiple inlet duct. The mission-adaptable aerial vehicle 710 includes a fuselage assembly 701 comprising at least one fuselage section, a wing assembly 703 comprising at least one wing section, a nose cone section 707, and a tail assembly 704. The nose cone section 707 can be configured in a variety of geometries and include various modules, such as an imaging module (comprising one or more cameras that are in communication with the electronics unit 113), a sensor module (comprising one or more sensors including but not limited to a motion sensor, a pressure sensor, a temperature sensor, or other sensor, which are in communication with the electronics unit 113), and/or other modules or payloads to be carried by the aerial vehicle 710. As shown in the example of FIG. 7, the nose cone section 707 includes a camera mount structure 708 (e.g., a gimble) to mount one or more cameras and/or one or more sensors to the lower region of the nose cone section 707 and allow for full 360° or at least 300° rotation in each of the three cartesian planes. Fuselage section(s) of the fuselage assembly 701 can be configured in a variety of geometries and include an at least partially hollowed interior usable for various purposes, such as to stabilize the aerial vehicle 710 for flight, as well as to store components of the electronics unit 113 and/or power/propulsion unit 112, payload(s), supplies, or other articles. The wing assembly 703 can be designed into multiple extension modules to adjust aspect ratio, loitering times, and ranges for flight of the aerial vehicle 710 and/or to carry various ranges of weight and/or volume for various mission parameters.

As shown in the diagram of FIG. 7, the fuselage assembly 701 includes three fuselage sections: a front fuselage section 701A, a central fuselage section 701B coupled to the front fuselage section 701A, and a rear fuselage section 701C coupled to the central fuselage section 701B. The nose cone section 707 is coupled to the front fuselage section 701A, and the tail assembly 704 is coupled to the rear fuselage section 701C. The wing assembly 703 is coupled to the central fuselage section 701B. The front fuselage section 701A and/or the rear fuselage section 701C can include additional sub-segments (like that shown in FIG. 7 for the front fuselage section 701A), e.g., to extend or reduce the length of the fuselage of the mission-adaptable aerial vehicle 710 based on parameters of the mission. The tail assembly 704 includes a tail segment housing 704A and a tail end component 704B coupled to the tail segment housing 704A, which is coupled to the rear fuselage section 701C. The tail assembly 704 includes a multi-inlet duct 705 configured in the tail segment housing 704A to direct air intake into the tail segment housing 704A. For example, in some embodiments, the mission-adaptable aerial vehicle 710 is configured to have a powerplant (e.g., engine) disposed in the tail segment housing 704A; and the tail end component 704B includes one or more outlets to allow exhaust to flow outward and provide thrust for flight of the mission-adaptable aerial vehicle 710. In some embodiments, for example, the tail assembly 704 includes one or more tail wings 706 coupled to the tail segment housing 704A. For example, as depicted in the diagram of FIG. 7, the tail assembly 704 includes a vertical stabilizer for the example vertical tail wing of the one or more tail wings 706, which can control yaw (side-to-side movement); in some embodiments, the vertical tail wing can include a rudder to affect yaw and/or one or more trim tabs. Also, for example, as depicted in the diagram of FIG. 7, the tail assembly 704 includes two horizontal stabilizers for the two example horizontal tail wings of the one or more tail wings 706, which can include an elevator to affect pitch (up-down movement) and/or one or more trim tabs. As shown in the diagram of FIG. 7, the wing assembly 703 includes three wing sections: a right-side wing section 703B, a central wing section 703A coupled to the right-side wing section 703B, and a left-side wing section 703C coupled to the central wing section 703A. The central wing section 703A is coupled to the central fuselage section 701B. The left-side wing section 703C and the right-side wing section 703B each can include additional sub-segments for the wing assembly (like that shown in the example FIG. 7), e.g., to extend or reduce the wingspan of the mission-adaptable aerial vehicle 710 based on parameters of the mission. For example, as depicted in the diagram of FIG. 7, the wing assembly 703 can include one or more flaps (e.g., to affect lift and drag during flight), one or more ailerons (e.g., to affect roll), one or more spoilers (e.g., to affect lift and drag), and/or one or more slats (e.g., to affect lift).

FIGS. 8A and 8B show diagrams illustrating a front view and a rear view, respectively, of the example embodiment of the mission-adaptable aerial vehicle 710 shown in FIG. 7. As shown in FIG. 8A, the mission-adaptable aerial vehicle 710 can include one or more cameras 708C attached to the example camera mount structure 708 (e.g., a gimble) to provide the aerial vehicle 710 (and the end-user, via data communications with the computer device 140) visual sight during flight for the mission. As shown in FIG. 8B, the mission-adaptable aerial vehicle 710 can include an exhaust outlet 704E, which can force air out of the engine contained within the tail segment housing 704A having been stably taken in through the multi-inlet duct 705.

Figure 9:
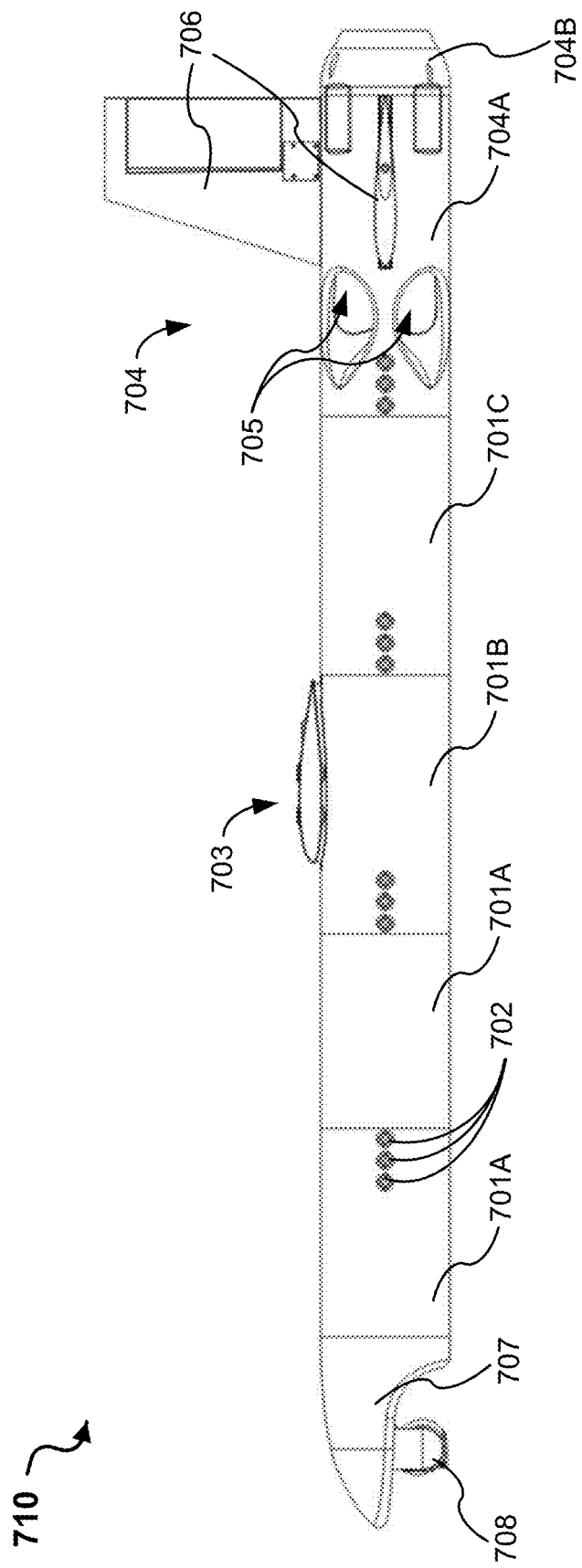
FIG. 9 shows a diagram illustrating a side view of the example embodiment of the mission-adaptable aerial vehicle shown in FIG. 7.

FIG. 9 shows a diagram illustrating a side view of the example embodiment of the mission-adaptable aerial vehicle 710 shown in FIG. 7.

Figure 10:
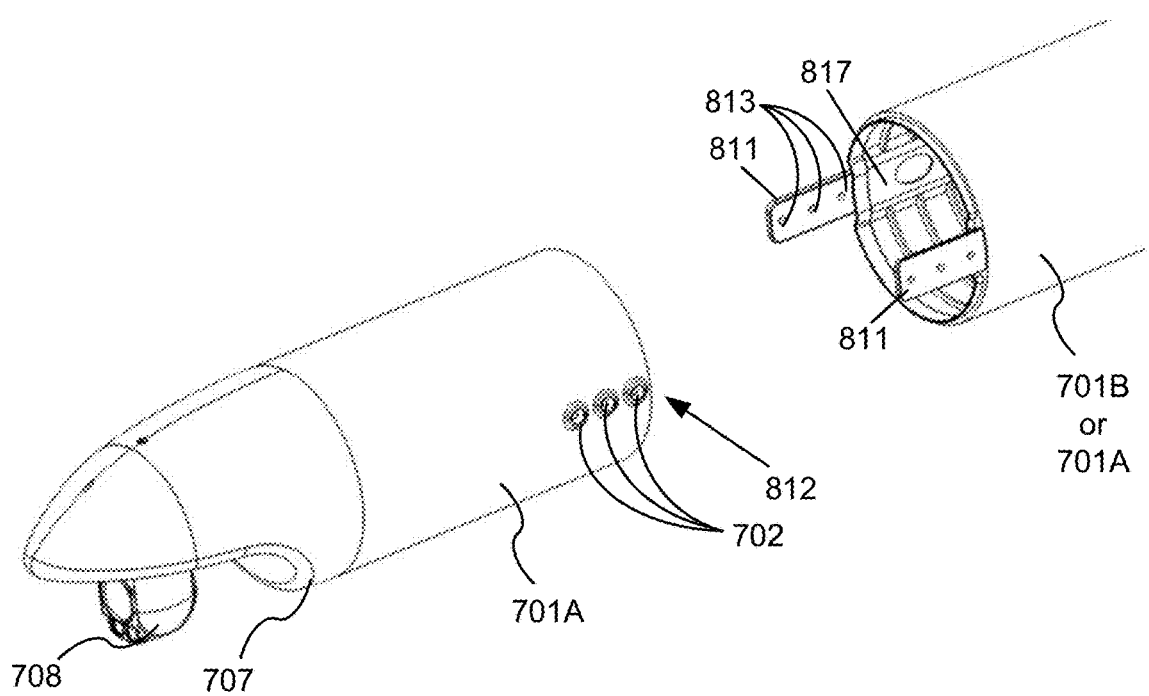
FIGS. 10 and 11 show diagrams depicting exploded isometric views of portions of the mission-adaptable aerial vehicle of FIG. 7, depicting an example embodiment of an airframe section and/or component fastening system for the fuselage section and the wing assembly, respectively.
Figure 11:
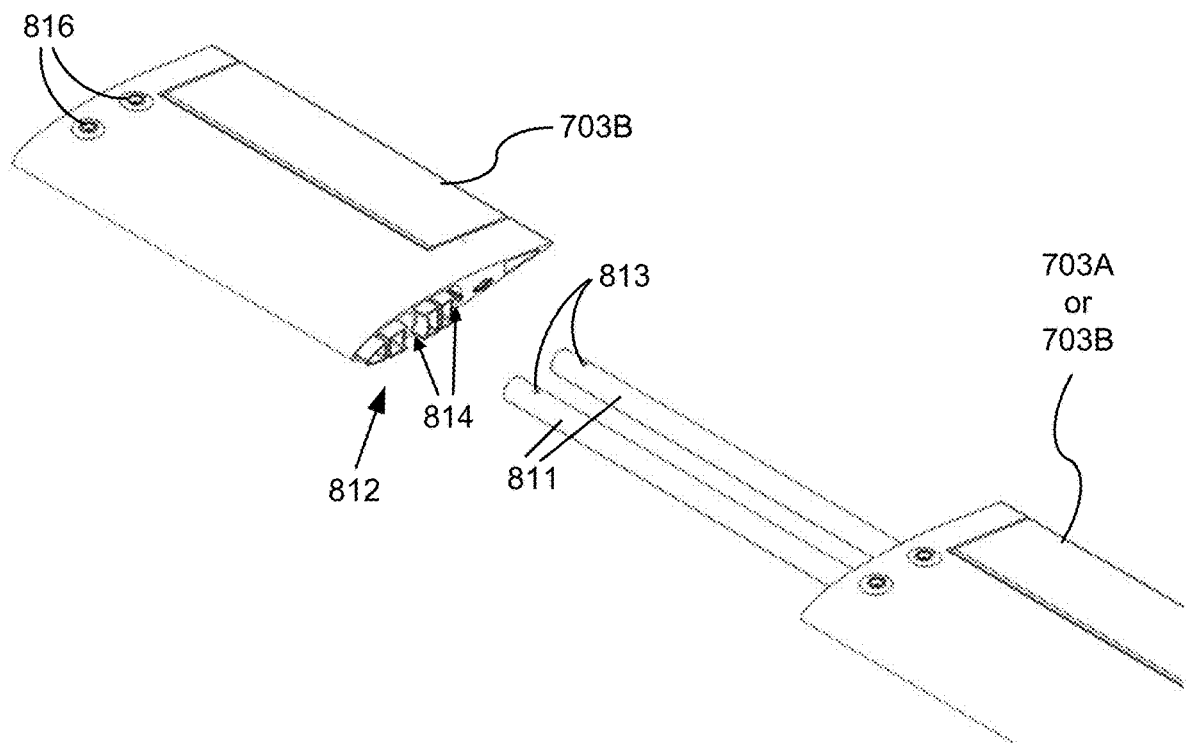

FIGS. 10 and 11 show diagrams depicting exploded isometric views of portions of the mission-adaptable aerial vehicle 710, depicting an example embodiment of an airframe section and/or component fastening system for the fuselage section 701 (FIG. 10) and the wing assembly 703 (FIG. 11), respectively. Various sections of the example mission-adaptable aerial vehicle 710, including the nose cone section 707, the fuselage sections 701, the sections of the wing assembly 703, and the sections of the tail assembly 704, can include the example embodiments of the airframe section and/or component fastening system shown in FIGS. 10 and 11.

In the example shown in FIG. 10, the airframe section and/or component fastening system includes at least one protrusion 811 that is insertable and securable into a slot or cavity structure 812 on an adjacent segment of the aerial vehicle 710. In some embodiments, the protrusion(s) 811 are configured to be reversibly insertable and securable in the slot(s) or cavity(ies) 812 to allow the end-user to disassemble and/or reassemble the aerial vehicle 710 upon demand. For example, the airframe section and/or component fastening system shown in FIG. 10 can be configured with a screw, quarter-turn screw (e.g., also called turnlock screw), or quick access screw fastening mechanism, or other fastening mechanisms or components, including but not limited to: bolts and nuts, screws and nuts/press inserts, cam-locking systems, clamps, spring locking systems, electro-mechanical locking systems, etc.

In some embodiments, for example, the protrusion(s) 811 can include a rod, a bar, a screw, a hook, or other protruding structure. As illustrated in FIG. 10, the example protrusions 811 are configured to span outward from the front fuselage section 701A and/or central fuselage section 701B. In some example embodiments, the protrusions 811 are affixed to the interior surface of the airframe structure via a holder 817 attached to the fuselage sections on the inside surface of each fuselage section's frame. In some examples, the protrusions 811 can be attached to the outside surface of the fuselage section's frame, and the protrusions 811 can be located at a top region, at a bottom region, at a side region, and/or at any combination of the top, bottom, side, or other region of the airframe segment. In some embodiments, for example, the slot or cavity 812 includes a wall structure (not shown in FIG. 10) that wraps at least partially around and forms an opening 814 that leads into the slot or cavity 812. In some embodiments, for example, the protrusions 811 are formed (e.g., additively manufactured) as part the same structure as the front fuselage section 701A and/or central fuselage section 701B; and the portion having the corresponding slots or cavity structures 812 on the adjacent segment of the aerial vehicle 710 (e.g., shown as a front fuselage section 701A in FIG. 10) are formed of the same structure as that adjacent fuselage segment. In some embodiments, for example, the protrusion 811 includes one or more holes and/or one or more projections 813 to align with corresponding one or more holes and/or one or more projections within the corresponding slot or cavity structure 812 to which the protrusion 811 is inserted and secured. In some examples, like that shown in FIG. 10, the one or more holes of the slot or cavity structure 812 can include through-holes 702 that can align with a plurality of holes and/or a plurality of projections 813 of the protrusion 811 when the two airframe segments are joined to be assembled.

In the example shown in FIG. 11, the airframe section and/or component fastening system includes at least one protrusion 811 spanning from a wing section of the wing assembly 703, e.g., central wing section 703A or right-side wing section 703B, which is insertable and securable into a slot or cavity structure 812 on an adjacent wing section of the aerial vehicle 710, e.g., distal segment of right-side wing section 703B. In some embodiments, the protrusion(s) 811 are configured to be reversibly insertable and securable in the slot(s) or cavity(ies) 812 to allow the end-user to disassemble and/or reassemble the wing assembly 703 of the aerial vehicle 710 upon demand. In some embodiments, for example, the at least one protrusion 811 is formed (e.g., additively manufactured) as part the same structure as the wing section of the wing assembly 703, and the portion of the adjacent wing section having the corresponding slot(s) or cavity structure(s) 812 is formed of the same structure as the overall adjacent wing section.

For example, the airframe section and/or component fastening system shown in FIG. 11 can be configured with spars (e.g., which can be any cross-section, including but not limited to circular, rectangular, trapezoidal, triangular, etc.), which create a rail system for various amounts of reconfigurable wing sections to be slid into place and then affixed with an example securement-fastening system, e.g., including but not limited to bolts and nuts, screws and nuts/press inserts, cam-locking systems, clamps, spring locking systems, electro-mechanical locking systems, etc.

As illustrated in FIG. 11, the example two protrusions 811 spanning from the right-side wing section 703B or central wing section 703A are configured with a rod geometry that spans a majority of the length of the adjacent wing section to which it is to be inserted. Also, for example, the example two protrusions 811 include at least one hole 813 that is configured to align with at least one hole 816 of the slot or cavity structure 812 of the adjacent wing section, e.g., distal segment of right-side wing section 703B. The diagram of FIG. 11 also depicts openings 814 within which the protrusions 811 of the right-side wing section 703B or central wing section 703A are insertable.

Figure 12A:
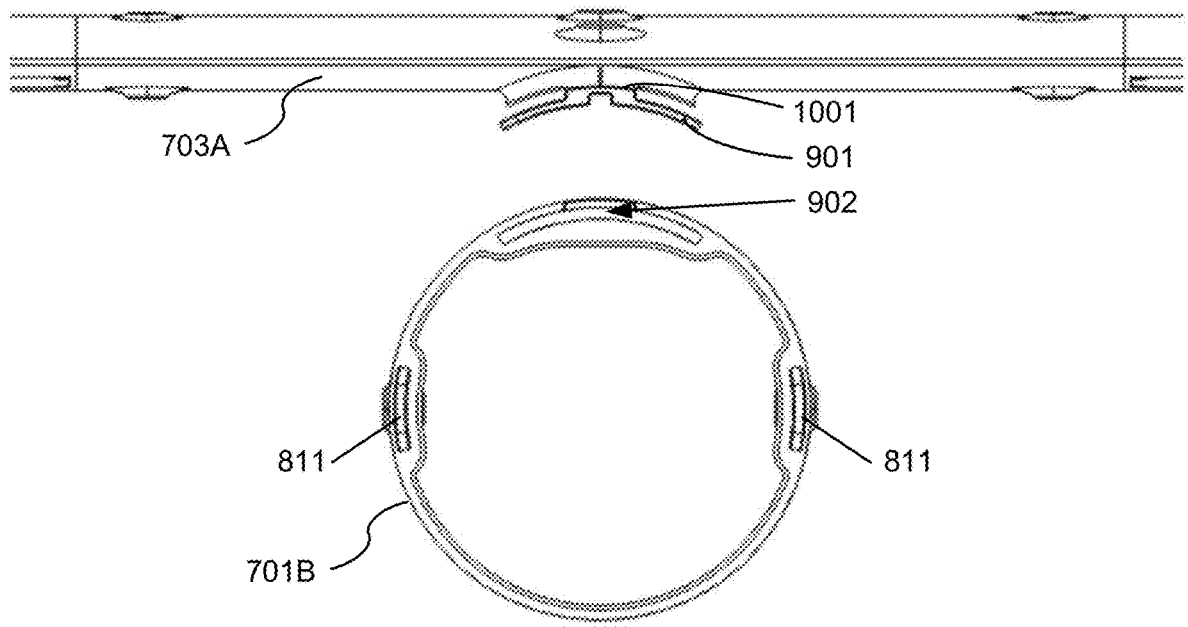
FIGS. 12A and 12B show diagrams illustrating a partial exploded front view and partial exploded isometric view, respectively, depicting an example embodiment of the section and/or component fastening system for attaching the wing to the fuselage, in accordance with the present technology.
Figure 12B:
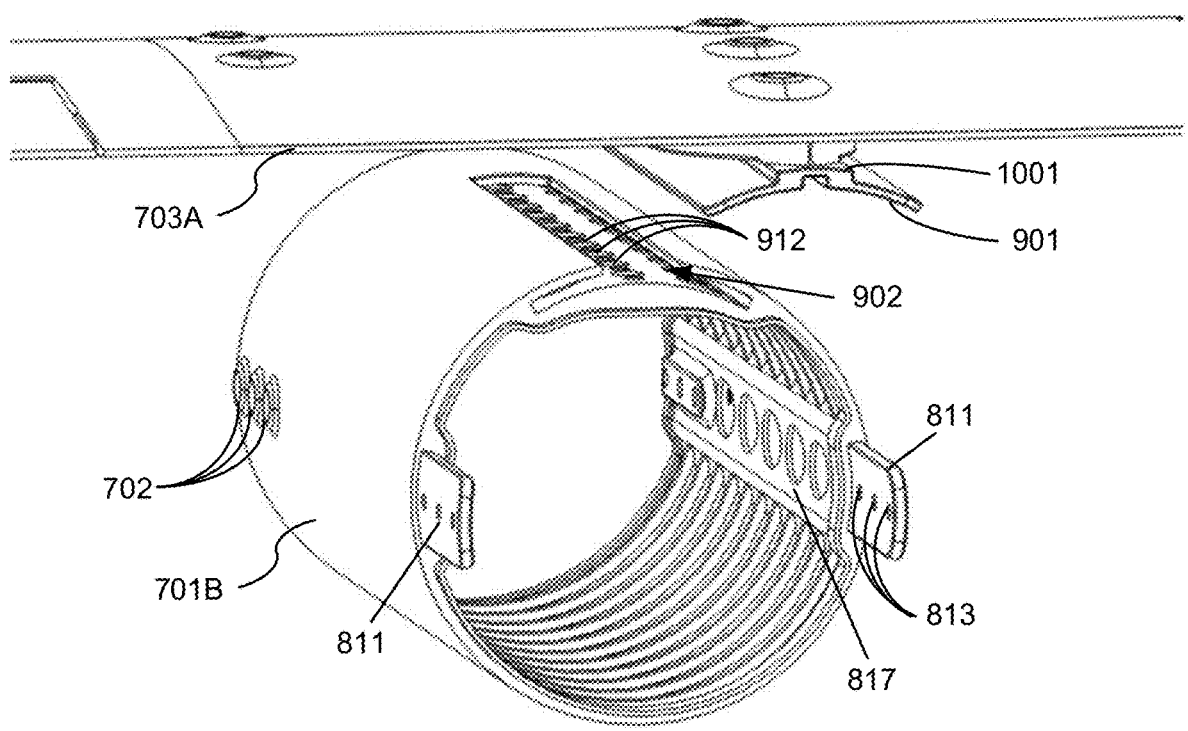

FIGS. 12A and 12B show diagrams illustrating a partial exploded front view and partial exploded isometric view, respectively, depicting an example embodiment of the central fuselage section 701B and central wing section 703A illustrating an example embodiment of the section and/or component fastening system for attaching the wing to the fuselage, in accordance with the present technology. The example section and component fastening system includes at least one protrusion 901 spanning off a lower surface of the central wing section 703A to insert and be secured within a slot or cavity 902, e.g., integrated into the wall structure of the central fuselage section 701B. In some embodiments, for example, the central wing section 703A includes a securement base 1001 having a curvature matched to the outer surface curvature of the central fuselage section 701B, which can make contact and interface with the central fuselage section 701B (e.g., to further support securement of the central wing section 703A with the central fuselage section 701B). The securement base 1001 can allow for at least one or a plurality of protrusions 901 to project from the central wing section 703A to be insertable into corresponding slot or cavity 902. In some embodiments, for example, the at least one or plurality of protrusions 901 is formed (e.g., additively manufactured) as part the same structure as the securement base 1001 of the central wing section 703A or other part of a wing section of the wing assembly 703, and the portion of the central fuselage section 701B having the corresponding slot or cavity 902 is formed of the same structure as the central fuselage section 701B or other fuselage section of the fuselage assembly 701. In some embodiments, for example, the slot or cavity 902 includes a plurality of holes and/or projections 912 which can interface with corresponding holes and/or projections of the protrusion 901. While the diagrams of FIGS. 12A and 12B show the protrusion 901 coupled to the central wing section 703A and the slot or cavity 902 on the central fuselage section 701B, it is understood these features can be disposed on the opposite corresponding structures. For example, in some implementations, the section and/or component fastening system for attaching the wing to the fuselage can be assembled by quickly attaching a wing section with a male mating feature (e.g., protrusion 901) into a fuselage section with a female mating slot or groove (e.g., slot/cavity 902) by sliding and then affixing in place, e.g., affixing with an example securement-fastening system, e.g., including but not limited to bolts and nuts, screws and nuts/press inserts, cam-locking systems, clamps, spring locking systems, electro-mechanical locking systems, etc.

Figure 13A:
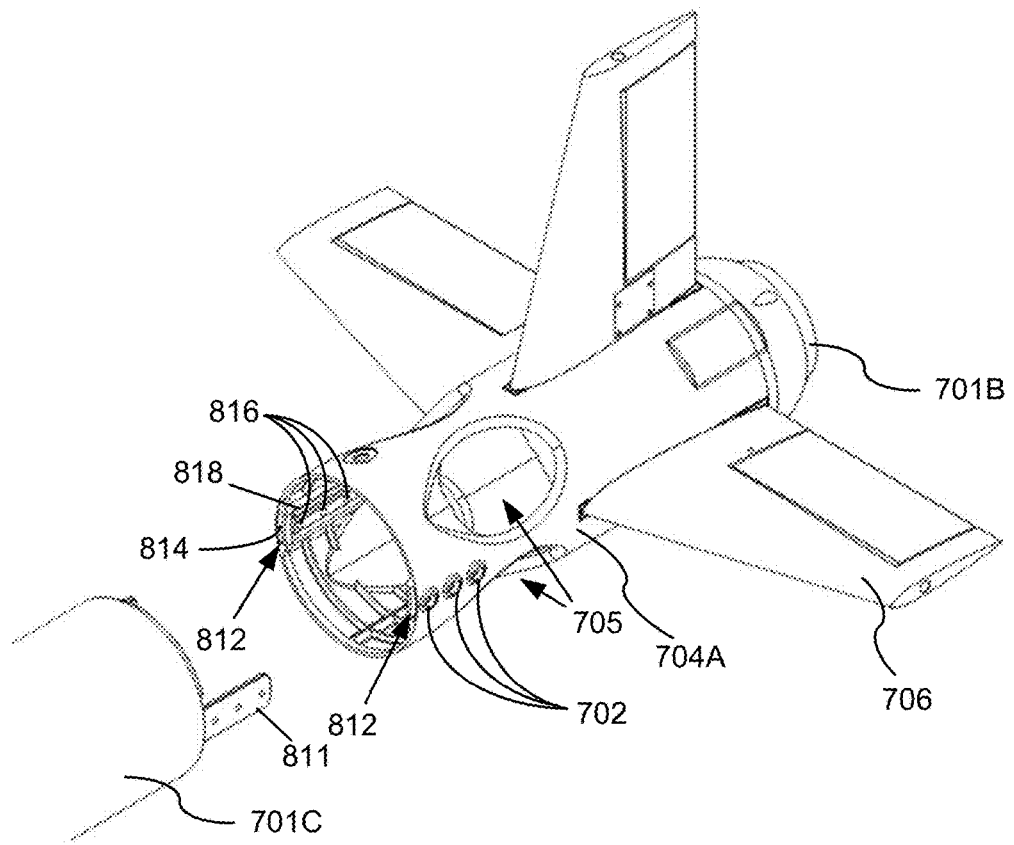
FIGS. 13A and 13B show diagrams illustrating partial exploded isometric views depicting an example embodiment of the section and/or component fastening system for attaching the tail to the fuselage, in accordance with the present technology.
Figure 13B:
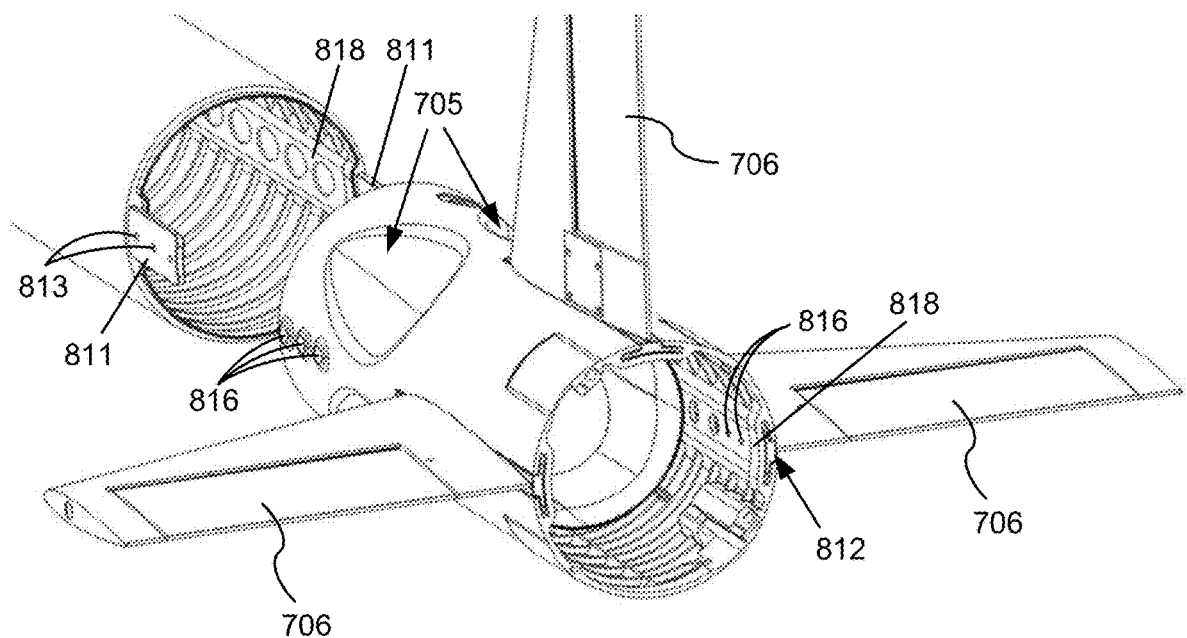

FIGS. 13A and 13B show diagrams illustrating partial exploded isometric views depicting an example embodiment of the rear fuselage section 701C and tail segment housing 704A illustrating an example embodiment of the section and/or component fastening system for attaching the tail to the fuselage, in accordance with the present technology. The example section and component fastening system includes at least one protrusion 811 spanning off the rear fuselage section 701C to insert and be secured within a corresponding at least one slot or cavity 812 disposed on the tail segment housing 704A. For example, in some embodiments, the at least one slot or cavity 812 can be integrated into the wall structure of the respective airframe section, e.g., such as the tail segment housing 704A as shown in FIG. 13A. For example, the at least one protrusion 811 is formed (e.g., additively manufactured) as part the same structure as the rear fuselage section 701C of the fuselage assembly 701, and the portion of the tail segment housing 704A having the corresponding slot or cavity 812 is formed of the same structure as the cent tail segment housing 704A of the tail assembly 704. Also, for example, the at least one protrusion 811 (e.g., shown as two protrusions 811 in FIGS. 13A-13B) are configured to span outward from the rear fuselage section 701C to be inserted and secured within corresponding slot(s) or cavity(ies) 812 of the tail segment housing 704A. In the example embodiment shown in FIG. 13A, the at least one slot or cavity 812 includes a wall structure 818 that wraps at least partially around and forms an opening 814 that leads into the slot or cavity 812. In some embodiments (as shown in FIG. 13B), for example, the protrusion 811 includes one or more holes and/or one or more projections 813 to align with corresponding one or more holes and/or one or more projections 816 within the corresponding slot or cavity structure 812 to which the protrusion 811 is inserted and secured. In some examples, like that shown in FIG. 13B, the one or more holes and/or one or more projections 816 of the slot or cavity structure 812 can include through-holes 702 (shown in FIG. 7 and labeled as such in FIG. 13A). FIG. 13B also depicts the example embodiment of the section and/or component fastening system comprising the protrusion 811/slot-cavity 812 configuration for attaching the tail end component 704B to the tail segment housing 704A.

In some embodiments of the multi-inlet duct 705, for example, there are at least three air intake inlet passage structures that lead into the interior of the tail segment housing 704A to direct the airflow into an engine (or other powerplant) contained in the interior of the tail segment housing 704A. For example, in some embodiments, the multi-inlet duct 705 includes four equally-structured, spaced, and aligned air intake inlet passage structures, referred to as the quad inlet duct (discussed above, and shown in the diagrams of FIGS. 14A-14D).

Figure 14A:
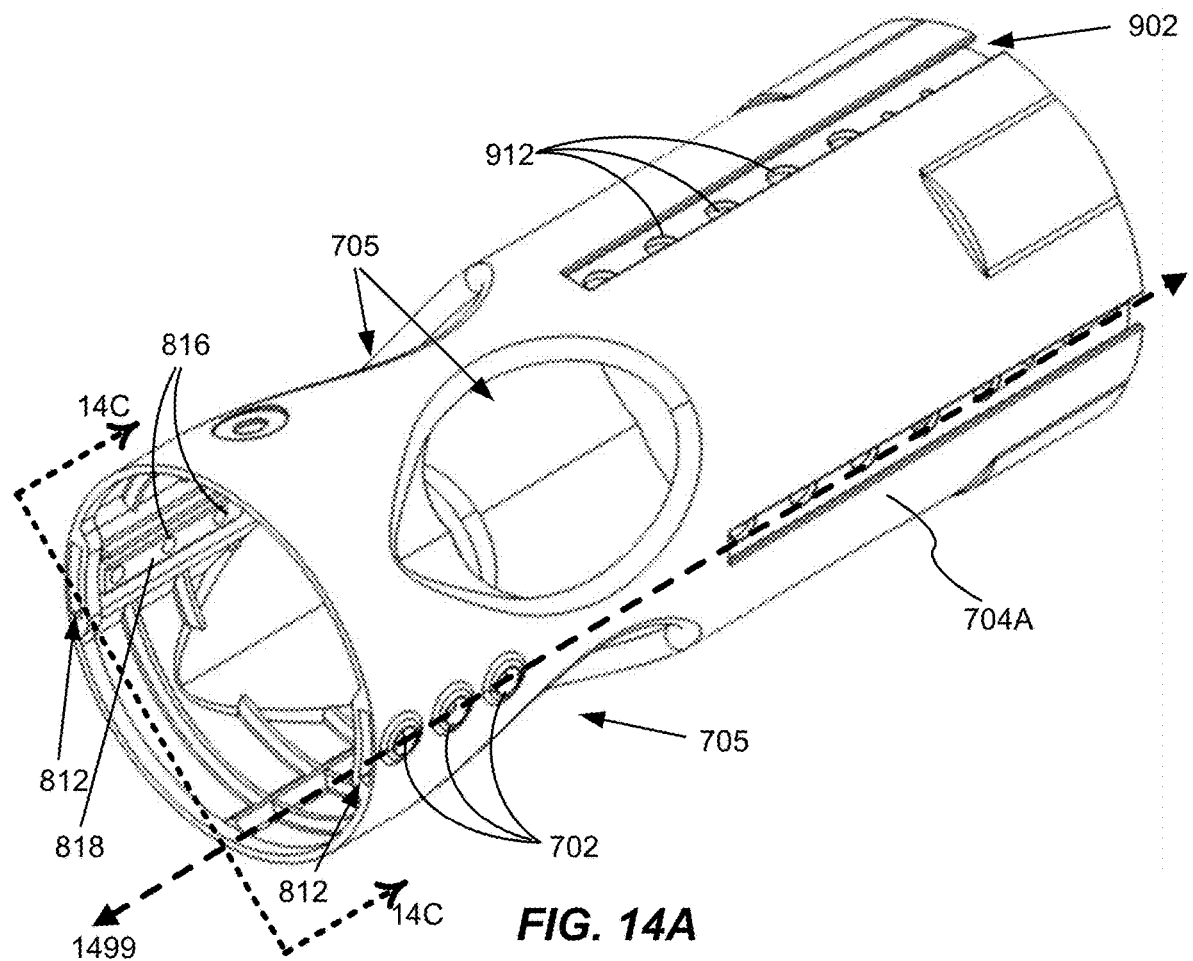
FIGS. 14A-14D show diagrams of an example embodiment of the multi-inlet duct, in accordance with the present technology.
Figure 14B:
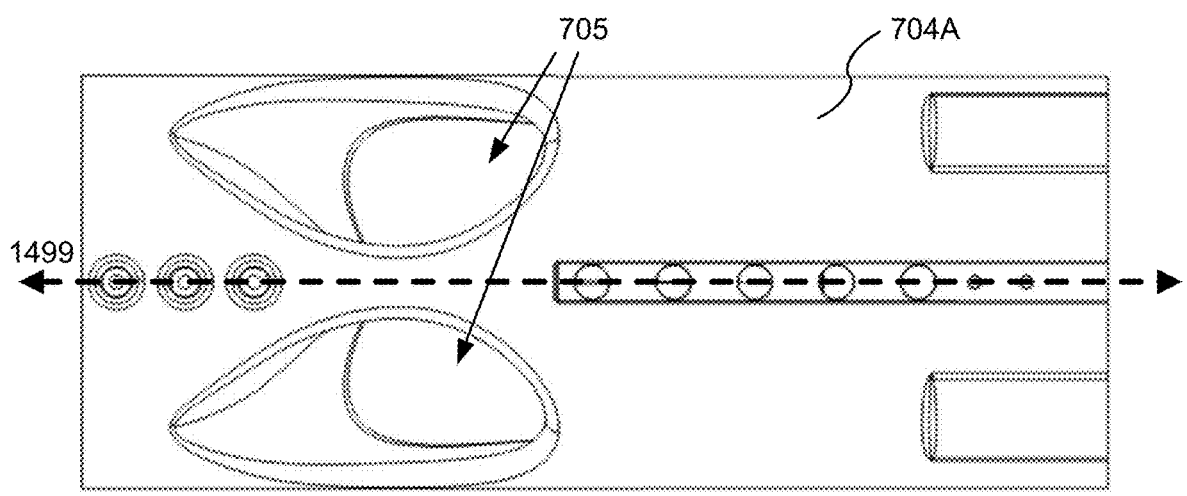
Figure 14C:
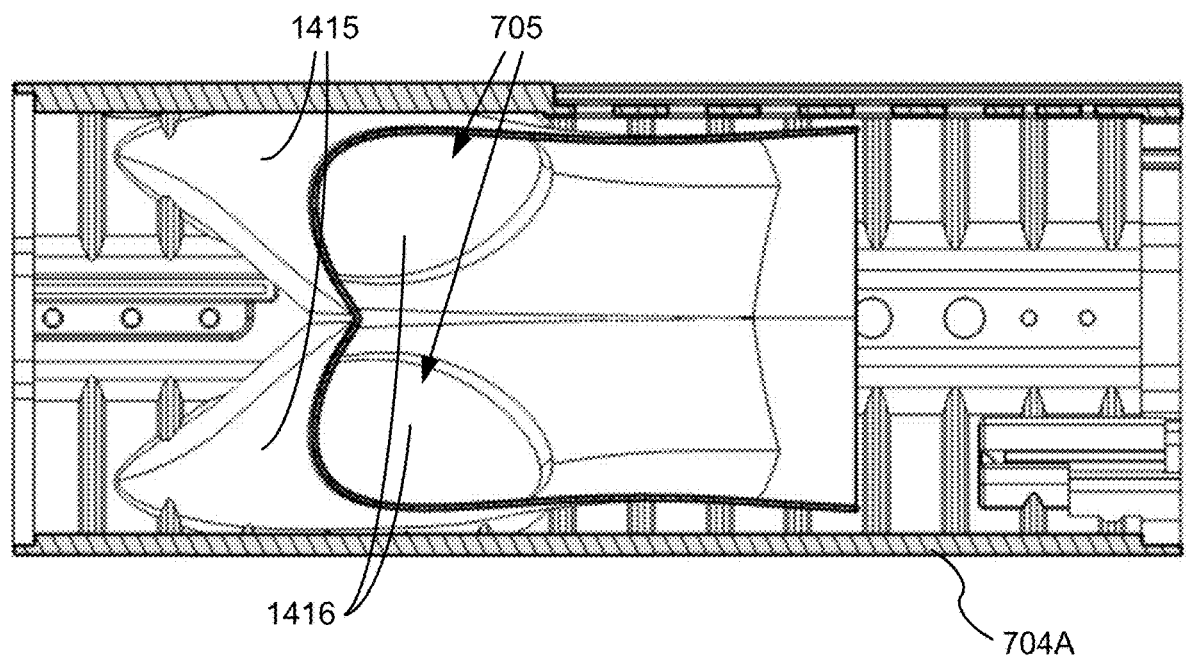
Figure 14D:
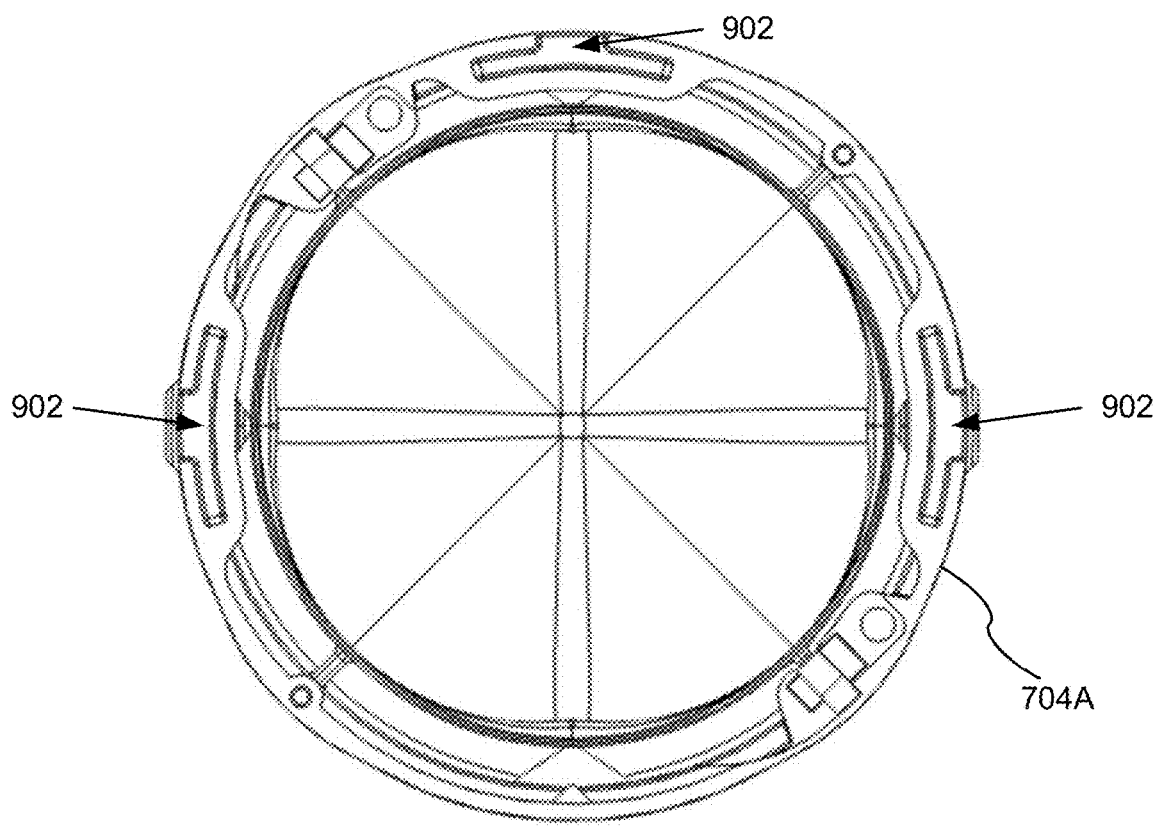

FIGS. 14A-14D show diagrams of an example embodiment of the multi-inlet duct 705 configured as the quad inlet duct, in accordance with the present technology. FIG. 14A shows an isometric view of the example embodiment of the multi-inlet duct 705; FIG. 14B shows a top view of the example embodiment of the multi-inlet duct 705 with respect to the line 1499; FIG. 14C shows a cross-sectional view of the example embodiment of the multi-inlet duct 705 along the cross-section 14C (identified in FIG. 14A); and FIG. 14D shows a rear view of the example embodiment of the multi-inlet duct 705.

As shown in FIG. 14C, the quad inlet duct 705 include four air intake passage structures 1415, where each includes the same structural design and dimensions and is equally spaced along the frame of the tail segment housing 704A. Each air inlet of the quad inlet duct 705 includes one or both of a curved and/or angled surface of the air intake passage structure 1415 that interfaces with a corresponding opening 1416 sized with respect to the dimensions of the tail segment housing 704A to drive air toward the location within the interior of the tail segment housing 704A where an engine is disposed. The quad inlet duct 705 is operable to reduce if not substantially eliminate air intakes that cause ram drag.

XVII. Variable-Sweep, Telescoping Wing Assembly

In some embodiments of the mission-adaptable aerial vehicle 110, for example, the mission-adaptable aerial vehicle 110 can include a variable-sweep, telescoping wing assembly, where in some embodiments the mission-adaptable aerial vehicle 110 is configured to be tube-launchable based on the variable-sweep, telescoping wing assembly airframe configuration.

Designers of conventional tube-launched aerial vehicles typically have to make compromises on the available volume in the tube apparatus and the size of the wing. Rotating, folding, and spring-loaded wings have been implemented, but they do not optimize the wing size and leave a lot to be desired in terms of performance.

The disclosed variable-sweep, telescoping wing assembly allows for vastly improved glide or powered flight ranges and/or loitering times while not overly compromising the space or volume available in the tube system.

In some embodiments, the variable-sweep, telescoping wing assembly for a mission-adaptable, tube-launchable UAV includes (i) a wing box, and (ii) at least two wing contingents, each having a first member capable of swinging outward with respect to the wing box, and a second member capable of telescoping outward from the first member. In some implementations, the first members (containing at least a portion of the second members within) of the at least two wing contingents swing outward and symmetrically from the centerline of the UAV's fuselage (e.g., under spring, electro-mechanical, or other form of power), such that once the first members clear the fuselage, the second members telescope out (e.g., under spring, electro-mechanical, or other form of power) from the first members (e.g., largest cross-section to smallest cross-section), thereby producing a wingspan that is a multiple of the possible wingspan without such a variable-sweep and telescoping mechanism. In some embodiments, for example, one or both of the first members and the second members of the wing contingents are configured as concentric airfoil-shaped members.

In some embodiments, for example, the mission-adaptable aerial vehicle 110 can include a main center body to extend along a longitudinal direction for the aerial vehicle; a variable-sweep, telescoping wing assembly comprising a wing box and at least two wing contingents each having a first (swinging) member and a second (telescoping) member (e.g., which can have a lateral cross-sectional airfoil shape), which are housed in the wing box in a retracted position and swings out therefrom into any one or multiple of a plurality of configurations to the main center body of the aerial vehicle in an extended position; and stabilizers and control surface structures with corresponding cross-sectional airfoil shapes or grid fins that swing out or deploy from any one or multiple of a plurality of configurations to the main center body of the aerial vehicle. The customizable or modularized components or assemblies of the mission-adaptable aerial vehicle are also referred to sections or segments.

Figure 15A:
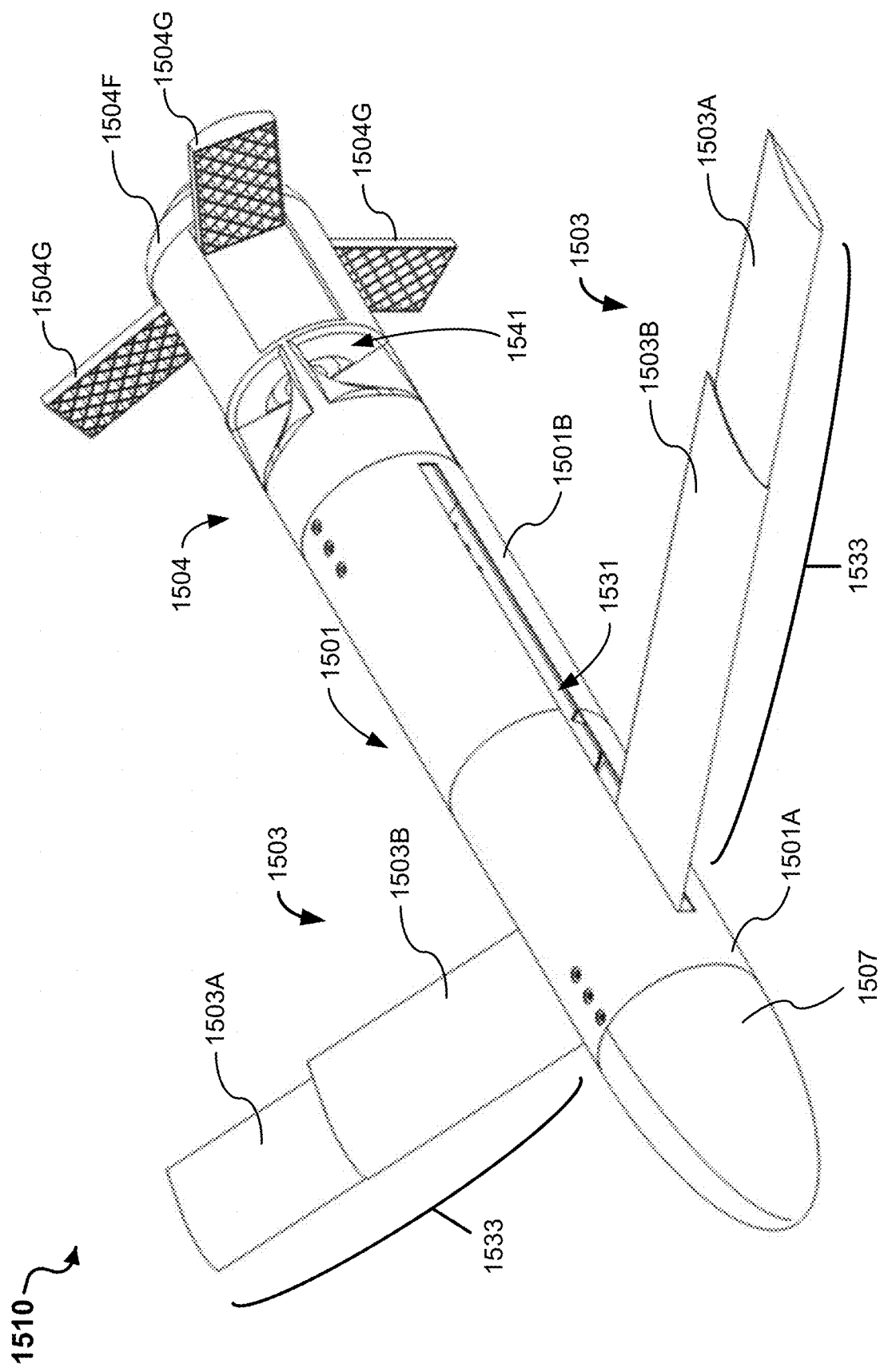
FIGS. 15A-15D show diagrams depicting an example embodiment of a mission-adaptable aerial vehicle with a variable-sweep, telescoping wing assembly, in accordance with the present technology.

FIG. 15A shows a diagram depicting an isometric view schematic of an example embodiment of the mission-adaptable aerial vehicle 110, labeled mission-adaptable aerial vehicle 1510, which includes a variable-sweep, telescoping wing assembly 1503 in accordance with the present technology. The mission-adaptable aerial vehicle 1510 includes (i) a nose cone section 1507; (ii) a fuselage assembly 1501 that includes one or more fuselage sections (e.g., a first fuselage section 1501A and a second fuselage section 1501B), in which may be one or more slits 1531 that align when the one or more fuselage sections are assembled; (iii) a variable-sweep, telescoping wing assembly 1503 that is integrable within an interior of at least one of the one or more fuselage section(s), via the one or more slits 1531, when the variable-sweep, telescoping wing assembly 1503 is in a retracted position, where the one or more slits 1531 to allow the wings of the variable-sweep, telescoping wing assembly 1503 to extend out of the interior when in an extended (or flight) position; and (iv) a tail assembly 1504 that includes at least one tail segment (e.g., tail section 1504F, which includes one or more intake ducts 1541 and may optionally include one or more grid fins 1504G). While not shown in FIG. 15A, in some embodiments, the one or more fuselage section(s) of the fuselage assembly 1501 can include one or more indented regions (e.g., on a top portion and/or a bottom portion of the fuselage section(s)) to contain the variable-sweep, telescoping wing assembly 1503 when the variable-sweep, telescoping wing assembly 1503 is in a retracted position. The individual airframe components (e.g., at least sections of the fuselage assembly 1501, nose cone section 1507, and tail assembly 1504) can be connected as discussed previously for other example embodiments of the mission-adaptable aerial vehicle 110, such as various embodiments of an integral fastening system including one or more protrusions and one or more slots.

Figure 15B:
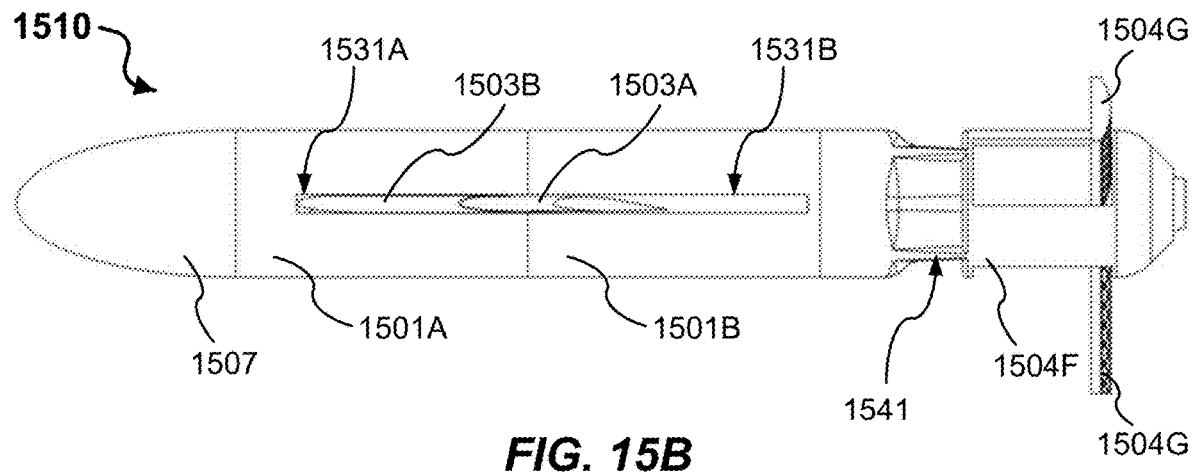
Figure 15C:
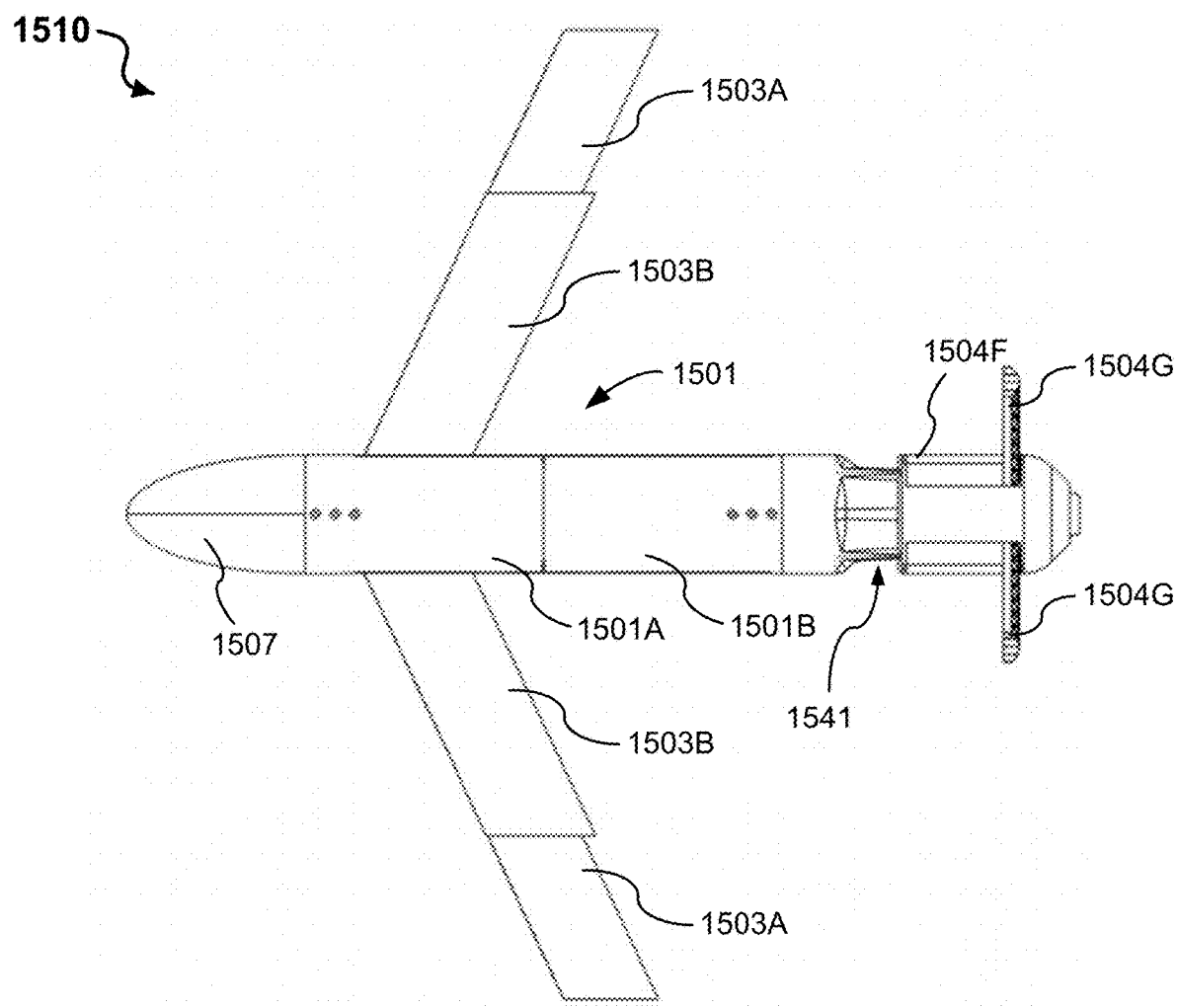

FIGS. 15B and 15C show diagrams depicting a side view schematic and a top view schematic, respectively, of the example embodiment of a mission-adaptable, tube-launched aerial vehicle 1510 with the variable-sweep, telescoping wing 1503 shown in FIG. 15A.

Figure 15D:
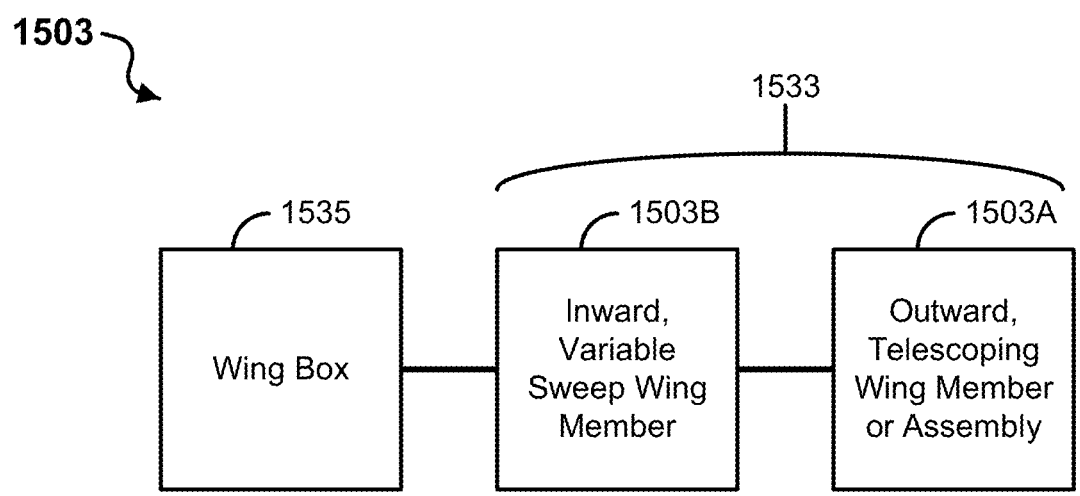

FIG. 15D shows a block diagram depicting an example embodiment of the variable-sweep, telescoping wing assembly 1503, in accordance with the present technology. The variable-sweep, telescoping wing assembly 1503 includes (i) a wing box 1535 and (ii) a wing contingent assembly 1533, which includes at least two wing contingents 1503B and 1503A. The wing contingent assembly 1533 of the variable-sweep, telescoping wing assembly 1503 include two sets of the at least two wing contingents 1503B/1503A (as shown in FIG. 15A). As shown in FIGS. 15A and 15D, each of the two sets of wing contingents includes an inward, variable-sweep wing member 1503B that is capable of swinging outward with respect to the wing box 1535, and an outward, telescoping wing member or assembly 1503A capable of telescoping outward from the inward, variable-sweep wing member 1503B. In some embodiments of the variable-sweep, telescoping wing assembly 1503, at least one of the outward, telescoping wing member or assembly 1503A includes one or more leading and/or trailing edge devices, e.g., which can include aileron(s), flap(s), flaperon(s), and/or spoiler(s). In some embodiments, for example, the variable-sweep, telescoping wing assembly 1503 can include one or more wing tip devices, such as a wing tip attached to the outward-most member of the outward, telescoping wing member or assembly 1503A; where in such embodiments, the one or more slits 1531 is shaped to the geometry of the one or more wing tip devices to be contained within the fuselage when the variable-sweep, telescoping wing assembly 1503 is in the retracted position.

In some embodiments of the variable-sweep, telescoping wing assembly 1503, as depicted in FIG. 15A, for example, the wing contingent assembly 1533 includes a single outward, telescoping wing member 1503A for each of the two sets of wing contingents, but it is understood that the second outward, telescoping wing member or assembly 1503A can include two or more telescoping wing members, such as two or three or more telescoping wing components that telescope outward when the variable-sweep, telescoping wing assembly 1503 is in the extended or flight position. In such embodiments, for example, the outward, telescoping wing member or assembly 1503A may include two or more telescoping wing components where outer wing component(s) is/are configured to nest inside of an adjacent inner wing component(s) when the variable-sweep, telescoping wing assembly 1503 is in the retracted position.

In some embodiments, for each of the two sets of the wing contingents of the wing contingent assembly 1533, the inward, variable-sweep wing member 1503B contains at least a portion of the outward, telescoping wing member(s) 1503A within it when the outward, telescoping wing member(s) is/are retracted. When the variable-sweep, telescoping wing assembly 1503 is to be deployed to the extended (flight) position, each of the two inward, variable-sweep wing members 1503B swing outward and symmetrically from the centerline of the fuselage section within which their housed (e.g., under spring, electro-mechanical, or other form of power) through the one or more slits 1531 (e.g., slits 1531A of fuselage section 1501A and slits 1531B of fuselage section 1501B). During such deployment, once the inward, variable-sweep wing members 1503B of the two sets clear the fuselage section(s), the outward, telescoping wing members 1503A telescope out from the inward, variable-sweep wing members 1503B (e.g., under spring, electro-mechanical, or other form of power), e.g., largest cross-section to smallest cross-section telescoping movement. Such implementations of the variable-sweep, telescoping wing assembly 1503 produces a wingspan for the mission-adaptable aerial vehicle 1510 that is a multiple of various possible wingspans. In some embodiments, for example, one or both of the inward, variable-sweep wing members 1503B and the outward, telescoping wing members 1503A of the wing contingents are configured as concentric airfoil-shaped members.

Example embodiments of the variable-sweep, telescoping wing assembly 1503 can include the following. In some embodiments, for example, the variable-sweep, telescoping wing assembly 1503 for a mission-adaptable, tube-launchable aerial vehicle (having at least one or more fuselage sections) can include a plurality of wing contingents; and a wing box from which swing members of the wing contingents swing outward symmetrically from a centerline of the fuselage, and once the wing assembly clears the fuselage, telescoping members of the wing contingents telescope out, thereby producing a wingspan for the aerial vehicle that is a multiple of possible wingspans. The swing members can be configured to swing outward under at least one of a spring, electro-mechanical, or other force. The telescoping members can be configured to telescope out under at least one of a spring, electro-mechanical, or other force. For example, the telescoping members can telescope out by a largest cross-sectional member to a smallest cross-sectional member. In some example embodiments, progressively smaller sections of the wing contingents are housed within a largest section of the respective wing contingents and are enabled to telescope outward in the direction from a root chord to a tip chord on both a starboard side and a port side of the aerial vehicle. In some example implementations, telescoping motion of the telescoping members is accomplished using one or more of linear drives, rack and pinions or a motor-driven circular gear with a fixed linear gear, pulley systems, actuators, gas actuators, or pneumatic systems, or other methods.

In some embodiments, for example, the variable-sweep, telescoping wing assembly 1503 for a mission-adaptable, tube-launchable aerial vehicle can include a wing box; and at least two wing contingents, each having a first member capable of swinging outward with respect to the wing box, and a second member capable of telescoping outward from the first member. For instance, the mission-adaptable, tube-launchable aerial vehicle includes at least one or more fuselage sections, where at least one or some of the one or more fuselage sections include slit(s) or indented region(s) to allow the wings of the variable-sweep, telescoping wing assembly to extend out of the interior through the slit(s) or outward from the indented region(s) of the fuselage section(s). The wing assembly can be integrable within an interior of at least one fuselage section of the mission-adaptable, tube-launchable aerial vehicle when in the wing assembly is in a retracted position. In implementations, for example, the first members contain at least a portion of the second members within when the wing contingents are retracted and swing outward and symmetrically from the centerline of a fuselage section of the aerial vehicle, such that once the first members clear the fuselage section, the second members telescope out from the first members. In various implementations, for example, the wing assembly is operable to produce a wingspan for the aerial vehicle that is a multiple of various possible wingspans. In some embodiments, for example, one or both of the first members and the second members of the wing contingents are configured as concentric airfoil-shaped members.

In some embodiments, for example, the variable-sweep, telescoping wing assembly 1503 for a mission-adaptable, tube-launchable aerial vehicle can include a wing box, and two telescoping wing assemblies, wherein each set of the telescoping wing assemblies includes: (i) a first wing contingent rotatably coupled to the wing box and capable of swinging outward with respect to the wing box through a slit or indented region in a fuselage section within which the variable-sweep, telescoping wing assembly is contained when in a retracted position, and (ii) a second wing contingent capable of telescoping outward from the first wing contingent when the variable-sweep, telescoping wing assembly is in an extended position, wherein the second wing contingent includes two or more wing segments where a first wing segment is configured to be nested within the first wing contingent and a second wing segment is configured to be nested within the first wing segment when the variable-sweep, telescoping wing assembly is in the retracted position

EXAMPLES

The following examples describe example embodiments in accordance with the present technology. Features of the following examples can be included in example embodiments of the present technology described above.

In some example embodiments of the present technology (example A1), a mission-adaptable aerial vehicle in the tube-and-wing configuration comprised of various swappable, manipulatable, and interchangeable sections and components connected together by means of structurally sound connection and fastening systems that are able to be modified by the end-user in the field, includes: a main center body extending along a longitudinal direction; a wing with a lateral cross-sectional airfoil shape; and stabilizer and control surface structures with corresponding cross-sectional airfoil shapes.

Example A2 includes the aerial vehicle of example A1 or any of examples A1-A19, wherein the main center body, wing, and control surfaces are manufactured as an interconnected assembly, and/or wherein the main center body, wing, and control surfaces are 3D printable.

Example A3 includes the aerial vehicle of example A1 or any of examples A1-A19, wherein the main center body comprises one section, or wherein the main center body consists of one section.

Example A4 includes the aerial vehicle of example A1 or any of examples A1-A19, wherein the main center body is comprised of multiple airframe elements fastened together.

Example A5 includes the aerial vehicle of example A1 or any of examples A1-A19, wherein the wing is comprised of one main section with aileron sections port and starboard of the centerline.

Example A6 includes the aerial vehicle of example A1 or any of examples A1-A19, wherein the wing is comprised of one main section with aileron and flap sections port and starboard of the centerline.

Example A7 includes the aerial vehicle of example A1 or any of examples A1-A19, wherein the wing is comprised of multiple sections fastened together including ailerons.

Example A8 includes the aerial vehicle of example A1 or any of examples A1-A19, wherein the wing is comprised of multiple sections fastened together including ailerons and flaps.

Example A9 includes the aerial vehicle of example A1 or any of examples A1-A19, wherein the wing is attached to the main center body, positioned on top of the main center body.

Example A10 includes the aerial vehicle of example A1 or any of examples A1-A19, wherein the wing is split into halves fastened on either side of the main center body between the top and bottom of the main center body.

Example A11 includes the aerial vehicle of example A1 or any of examples A1-A19, wherein the wing is attached to the main center body, positioned under the bottom of the main center body.

Example A12 includes the aerial vehicle of example A1, or any of examples A5-A11, or any of examples A1-A19, wherein the wing telescopes outward in the direction of root chord to tip chord from each baseline port and starboard wing tip.

Example A13 includes the aerial vehicle of example A1 or any of examples A1-A19, wherein the horizontal and vertical stabilizers and their respective control surfaces are at the aft of the wing of the aerial vehicle.

Example A14 includes the aerial vehicle of example A1 or any of examples A1-A19, wherein the horizontal stabilizers and their respective control surfaces are split fore and aft of the wing of the aircraft with the vertical stabilizer and respective control surface aft of the wing of the aircraft.

Example A15 includes the aerial vehicle of example A1 or any of examples A1-A19, wherein the vertical stabilizers and their respective control surfaces are found at the tip chord of either extreme end of the wing.

Example A16 includes the aerial vehicle of example A1 or any of examples A1-A19, wherein a chemically resistant polymer fuel tank or multiple tanks are blow molded into cavities within sections of the airframe.

Example A17 includes the aerial vehicle of example A1 or any of examples A1-A19, wherein, when the sub-assembly sections are connected and fastened together, sensor arrays detect the position of sections and communicate this information to a computer.

Example A18 includes the aerial vehicle of example A1 or any of examples A1-A19, wherein a data package is shared with the customer allowing them to customize a set of base CAD to their requirements.

Example A19 includes the aerial vehicle of example A1 or any of examples A1-A18, wherein the swappable, manipulatable, and interchangeable sections and components include a signal transmitter, comprising an RFID, optical, or other wireless communication signal, to communicate alignment information for assembly connection of the swappable, manipulatable, and interchangeable sections and components in accordance with a desired mission plan.

In some example embodiments of the present technology (example A20), a mission-adaptable aerial vehicle includes: a main center body extending along a longitudinal direction; a wing with a lateral cross-sectional airfoil shape connectable to the main center body; and one or more stabilizers and/or one or more control surface structures with corresponding cross-sectional airfoil shapes connectable to the main center body.

Example 21 includes the aerial vehicle of example A20, or any of examples A20-A22, or any of examples A1-A18, wherein the swappable, manipulatable, and interchangeable sections and components include a signal transmitter, comprising an RFID, optical, or other wireless communication signal, to communicate alignment information for assembly connection of the swappable, manipulatable, and interchangeable sections and components in accordance with a desired mission plan.

Example 22 includes the aerial vehicle of example A20, or any of examples A20-A21, or any of examples A1-A18, comprising one or more features recited in any of examples A2-A18.

In some example embodiments of the present technology (example A23), a method for facilitating in-field assembly of a mission-adaptable aerial vehicle includes: providing a user interface via a software application on a mobile device, wherein the user interface includes a display screen presenting details of an aircraft type and a list of available sections and/or components associated with the aircraft type of the mission-adaptable aerial vehicle; receiving an input from the user interface associated with a selection of at least some of the available sections and/or components to include in an assembly of the mission-adaptable aerial vehicle; producing one or more assembly protocols including instructions to assemble the mission-adaptable aerial vehicle for an in-field assembly procedure; and generating, in real-time of the in-field assembly procedure, a modification scheme to cause a change in the instructions based on a determined change in one or more of flight dynamics, flight stability, or flight control of the mission-adaptable aerial vehicle.

Example A24 includes the method of example A23 or any of examples A23-A27, wherein the user interface includes a touchscreen interface to allow the input to include a tap, a drag, and/or a dropdown.

Example A25 includes the method of example A23 or any of examples A23-A27, wherein the determined change includes one or more of an environmental factor including a temperature, pressure, or weather forecast or measurement; a mission factor including a target location, a launch location, a trajectory parameter, or an altitude parameter; or a temporal factor including a time window of assembly or a time window of a mission.

Example A26 includes the method of example A23 or any of examples A23-A27, wherein the instructions include information on how a user can modify elements, including at least one of wing placement, control surface sizing, powerplant output or thrust, or other variables to accommodate the change in weight, fuselage length, added or reduced drag, and/or powerplant type.

Example A27 includes the method of example A23 or any of examples A23-A26, wherein the mission-adaptable aerial vehicle includes the mission-adaptable aerial vehicle of any of examples A1-A22.

In some example embodiments of the present technology (example B1), a mission-adaptable aerial vehicle includes: a fuselage assembly comprising one or more fuselage sections; a wing assembly reversibly attachable to the fuselage assembly, the wing assembly including at least one wing section; a nose cone assembly reversibly attachable to the fuselage assembly; a tail assembly reversibly attachable to the fuselage assembly; a propulsion unit at least partially contained in at least one of the tail assembly or the fuselage assembly and configured to drive flight of the aerial vehicle; and an electronics unit comprising a wireless transceiver device.

Example B2 includes the aerial vehicle of example B1 or any of examples B1-B33, wherein the mission-adaptable aerial vehicle is operable for on-demand assembly, disassembly, and/or modification of components that include at least one of the fuselage assembly, the wing assembly, the nose cone assembly, the tail assembly, the propulsion unit, or the electronics unit.

Example B3 includes the aerial vehicle of example B2 or any of examples B1-B33, wherein the on-demand assembly, disassembly, and/or modification includes an in-the-field change to one or more of the components at a location where the mission-adaptable aerial vehicle is to take off.

Example B4 includes the aerial vehicle of example B1 or any of examples B1-B33, wherein the one or more fuselage sections of the fuselage assembly includes a front fuselage section, a central fuselage section reversibly attachable to the front fuselage section, and a rear fuselage section reversibly attachable to the central fuselage section, wherein the nose cone section is reversibly attachable to the front fuselage section, wherein the tail assembly is reversibly attachable to the rear fuselage section, and wherein the wing assembly is reversibly attachable to the central fuselage section.

Example B5 includes the aerial vehicle of example B4 or any of examples B1-B33, wherein the tail assembly includes a tail segment housing and a tail end component reversibly attachable to the tail segment housing, which is reversibly attachable to the rear fuselage section.

Example B6 includes the aerial vehicle of example B5 or any of examples B1-B33, wherein the tail assembly includes an inlet assembly to direct air intake into the tail segment housing where at least a portion of the propulsion unit is contained.

Example B7 includes the aerial vehicle of example B6 or any of examples B1-B33, wherein the inlet assembly is configured as a single inlet duct comprising a tube attachable at an opening on an outer wall of the tail segment housing.

Example B8 includes the aerial vehicle of example B6 or any of examples B1-B33, wherein the inlet assembly is configured as a multiple inlet duct comprising three or more air intake passage structures coupled to or integrated with the tail segment housing.

Example B9 includes the aerial vehicle of example B8 or any of examples B1-B33, wherein the multiple inlet duct includes a quad inlet duct comprising four air intake passage structures, where each air intake passage structure is equally spaced along a frame or wall of the tail segment housing with respect to another of the air intake passage structures.

Example B10 includes the aerial vehicle of example B9 or any of examples B1-B33, wherein each air intake passage structure of the quad inlet duct includes one or both of a curved and/or angled surface that interfaces with a corresponding opening sized with respect to at least one dimension of the tail segment housing to drive air within the interior of the tail segment housing.

Example B11 includes the aerial vehicle of example B9 or any of examples B1-B33, wherein the quad inlet duct is operable to reduce air intakes that cause ram drag when the mission-adaptable aerial vehicle is in flight.

Example B12 includes the aerial vehicle of example B5 or any of examples B1-B33, wherein the tail assembly includes one or more tail wings reversibly attachable to the tail segment housing.

Example B13 includes the aerial vehicle of example B4 or any of examples B1-B33, wherein the wing assembly includes at least one right-side wing section, a central wing section reversibly attachable to the at least one right-side wing section, and at least one left-side wing section reversibly attachable to the central wing section, and wherein the central wing section is reversibly attachable to the central fuselage section.

Example B14 includes the aerial vehicle of example B1 or any of examples B1-B33, wherein at least one of (i) the wing assembly, (ii) the tail assembly, or (iii) the nose cone assembly is reversibly attached to the fuselage assembly by an integral fastening system, comprising: one or more protrusion structures spanning off of the one or more fuselage sections, and one or more slot or cavity structures disposed on a portion of the at least one of (i) the wing assembly, (ii) the tail assembly, or (iii) the nose cone assembly that corresponds to the one or more protrusion structures, wherein the one or more protrusion structures is configured to insert and be secured within the corresponding one or more slot or cavity structures.

Example B15 includes the aerial vehicle of example B1 or any of examples B1-B33, wherein at least one of (i) the wing assembly, (ii) the tail assembly, or (iii) the nose cone assembly is reversibly attached to the fuselage assembly by an integral fastening system, comprising: one or more protrusion structures spanning off of the at least one of (i) the wing assembly, (ii) the tail assembly, or (iii) the nose cone assembly, and one or more slot or cavity structures disposed on a portion of the fuselage assembly that corresponds to the one or more protrusion structures, wherein the one or more protrusion structures is configured to insert and be secured within the corresponding one or more slot or cavity structures.

Example B16 includes the aerial vehicle of any of examples B14-B15 or any of examples B1-B33, wherein the protrusion structure includes at least one of a rod, a bar, a screw, a hook, or other geometrically protruding structure.

Example B17 includes the aerial vehicle of any of examples B14-B16 or any of examples B1-B33, wherein the integral fastening system further includes a locking mechanism to affix the one or more protrusion structures in the corresponding one or more slot or cavity structures, wherein the locking mechanism includes at least one of nuts and bolts, a press insert, a cam-locking system, a bayonet mount system, a clamp, a spring locking system, or an electromechanical locking system.

Example B18 includes the aerial vehicle of any of examples B14-B17 or any of examples B1-B33, wherein the integral fastening system is configured on the fuselage assembly and the at least one of (i) the wing assembly, (ii) the tail assembly, or (iii) the nose cone assembly to be located at a top region, at a bottom region, at a side region, and/or any combination of the fuselage assembly and the at least one of (i) the wing assembly, (ii) the tail assembly, or (iii) the nose cone assembly.

Example B19 includes the aerial vehicle of any of examples B14-B18 or any of examples B1-B33, wherein the one or more slot or cavity structures includes a wall structure that wraps at least partially around and forms an opening that leads into an interior of the one or more slot or cavity structures.

Example B20 includes the aerial vehicle of any of examples B14-B19 or any of examples B1-B33, wherein the one or both of (i) the one or more protrusion structures and (ii) the one or more slot or cavity structures includes one or more holes to align with corresponding one or more holes or one or more projections of the other of the of (i) the one or more protrusion structures or (ii) the one or more slot or cavity structures.

Example B21 includes the aerial vehicle of any of examples B14-B19 or any of examples B1-B33, wherein the one or both of (i) the one or more protrusion structures and (ii) the one or more slot or cavity structures includes one or more projections to align with corresponding one or more holes of the other of the of (i) the one or more protrusion structures or (ii) the one or more slot or cavity structures.

Example B22 includes the aerial vehicle of any of examples B14-B21 or any of examples B1-B33, wherein the integral fastening system includes one or more sensors to detect absolute or relative positions of at least one of the fuselage assembly, the wing assembly, the tail assembly, or the nose cone assembly during an assembly and/or a disassembly protocol.

Example B23 includes the aerial vehicle of example B1 or any of examples B1-B33, wherein the wherein the at least one of the fuselage assembly, the wing assembly, the nose cone assembly, or the tail assembly are 3D printable.

Example B24 includes the aerial vehicle of example B1 or any of examples B1-B33, wherein the at least one of the fuselage assembly, the wing assembly, the nose cone assembly, or the tail assembly is a 3D-printed structure comprising a material including one or more of PA-12 (polyamide-12), acrylonitrile butadiene styrene (ABS), polylactic acid (PLA), acrylonitrile styrene acrylate (ASA), polyethene terephthalate (PET), polyethylene terephthalate glycol (PETG), polycarbonate (PC), polypropylene (PP), polyether ether ketones (PEEK), polyether ether ketone ketones (PEKK), ULTEM™, a nylon material, thermoplastic polyurethane (TPU), or thermoplastic elastomer (TPE), a composite material, or a combination thereof.

Example B25 includes the aerial vehicle of example B1 or any of examples B1-B33, further comprising one or more of: an imaging module including one or more cameras that are in communication with the electronics unit; and/or a sensor module including one or more sensors that include at least one of a motion sensor, a pressure sensor, or a temperature sensor, an optical sensor.

Example B26 includes the aerial vehicle of example B1 or any of examples B1-B33, further comprising: one or more stabilizers and/or one or more control surface structures with corresponding cross-sectional airfoil shapes reversibly connectable to the fuselage.

Example B27 includes the aerial vehicle of example B1 or any of examples B1-B33, wherein the propulsion unit includes at least one of (i) one or more batteries, (ii) one or more fuel cells, or (iii) one or more powerplants comprising at least one of a rocket, an electrically-driven propeller, or a turbojet engine or a turbofan engine.

Example B28 includes the aerial vehicle of example B1 or any of examples B1-B33, wherein the electronics unit includes at least one of a location tracking unit or a data processing unit.

Example B29 includes the aerial vehicle of example B1 or any of examples B1-B33, wherein the wing assembly includes a lateral cross-sectional airfoil shape.

Example B30 includes the aerial vehicle of example B1 or any of examples B1-B33, wherein the at least one wing section of the wing assembly comprises a main section with aileron sections port and starboard of the centerline.

Example B31 includes the aerial vehicle of example B1 or any of examples B1-B33, wherein the wing assembly comprises a plurality of wing sections that are operable to telescope outward in the direction of root chord to tip chord from each baseline port and starboard wing tip.

Example B32 includes the aerial vehicle of example B1 or any of examples B1-B33, further comprising: one or more fuel tanks configured into an interior of an airframe of the mission-adaptable aerial vehicle including at least one of the fuselage assembly, the wing assembly, the tail assembly, or the nose cone assembly.

Example B33 includes the aerial vehicle of example B31 or any of examples B1-B32, wherein the one or more fuel tanks are blow or rotational molded into the interior of the airframe.

In some example embodiments of the present technology (example B34), a mission-adaptable aerial vehicle system includes: a mission-adaptable aerial vehicle as in any of examples B1-B33 or any examples A1-A22; and a data processing system, comprising one or more server computer devices, one or more databases, and/or one or more client computer devices, in data communication with each other, the data processing system configured to store and/or process data files associated with a library of specifications and data corresponding to one or more airframe sections and/or subsystems of the mission-adaptable aerial vehicle.

In some example embodiments of the present technology (example B35), an airframe device for a mission-adaptable aerial vehicle includes: a body of a fuselage section or a tail section; and a quad inlet duct comprising four air intake passage structures, where each air intake passage structure is equally spaced along a frame or wall of the body with respect to another of the air intake passage structures.

Example B36 includes the airframe device of example B35 or any of examples B35-B37, wherein each air intake passage structure of the quad inlet duct includes one or both of a curved and/or angled surface that interfaces with a corresponding opening sized with respect to at least one dimension of the body to drive air within the interior of the body of the fuselage section or the tail section.

Example B37 includes the airframe device of example B36 or any of examples B35-B36, wherein the quad inlet duct is operable to reduce air intakes that cause ram drag when the mission-adaptable aerial vehicle employing the airframe device is in flight.

In some example embodiments of the present technology (example B38), a method for facilitating in-field assembly of a mission-adaptable aerial vehicle includes: providing a user interface via a software application on a mobile device associated with a user, wherein the user interface includes a display screen presenting details of an aircraft type and a list of available sections and/or components associated with the aircraft type of the mission-adaptable aerial vehicle; receiving an input from the user interface associated with a selection of at least some of the available sections and/or components to include in an assembly of the mission-adaptable aerial vehicle; producing one or more assembly protocols including instructions to assemble the mission-adaptable aerial vehicle for an in-field assembly procedure; and generating, in real-time of the in-field assembly procedure, a modification scheme to cause a change in the instructions based on a determined change in one or more of flight dynamics, flight stability, or flight control of the mission-adaptable aerial vehicle.

Example B39 includes the method of example B38 or any of examples B38-B42, wherein the user interface includes a touchscreen interface to allow the input to include a tap, a drag, and/or a dropdown.

Example B40 includes the method of example B38 or any of examples B38-B42, wherein the determined change includes one or more of an environmental factor including a temperature, pressure, or weather forecast or measurement; a mission factor including a target location, a launch location, a trajectory parameter, or an altitude parameter; or a temporal factor including a time window of assembly or a time window of a mission.

Example B41 includes the method of example B38 or any of examples B38-B42, wherein the instructions include information on how a user can modify elements, including at least one of wing placement, a control surface sizing, a powerplant output or thrust, and/or other parameter or parameters to accommodate a change in a weight, a fuselage length, an added or reduced drag, and/or a powerplant type.

Example B42 includes the method of example B38 or any of examples B38-B41, wherein the mission-adaptable aerial vehicle includes the mission-adaptable aerial vehicle of any of examples B1-B33 or examples A1-A22.

In some example embodiments of the present technology (example B43), a method for customizing a mission-adaptable aerial vehicle includes: receiving, at data processing system, an input to obtain or access a library of data files associated with one or more mission-adaptable aerial vehicles; processing, at data processing system, the input to identify the library of data files associated with the one or more aerial vehicles; providing, by the data processing system, the identified library of data files associated with one or more aerial vehicles to the entity associated with the received input; facilitating, at the data processing system, a modification and/or addition of the library of data files based on data provided by the entity that provided the input, wherein the facilitating the modification and/or addition of one or more data files of the library includes verifying a technical feasibility of a proposed change to an airframe component of the mission-adaptable aerial vehicle; simulating, at the data processing system, a performance of the mission-adaptable aerial vehicle having the airframe component with the proposed change incorporated to evaluate the proposed change to the mission-adaptable aerial vehicle's flight performance; and producing, at the data processing system, a new or an updated library of data files based on the modification and/or addition of one or more data files of the library of data files associated with one or more aerial vehicles.

Example B44 includes the method of example B43 or any of examples B43-B51, wherein the request is sent by a client computer device associated with an additive manufacturing system, or wherein the request is sent by a computer device in data communication with an existing mission-adaptable aerial vehicle.

Example B45 includes the method of example B43 or any of examples B43-B51, wherein the processing the input includes searching a database of a plurality of libraries and/or data files to identify the requested library of data files.

Example B46 includes the method of example B45 or any of examples B43-B51, wherein a search is conducted based on one or more keywords, an index or a reference values, and/or one or more parameters associated with an aerial vehicle, one or more airframe segments or components, and/or one or more aerial vehicle mission constraints.

Example B47 includes the method of example B43 or any of examples B43-B51, wherein the facilitating includes creating a tentative or pending library.

Example B48 includes the method of example B43 or any of examples B43-B51, wherein the proposed change includes at least one of modification data associated with a weight, a balance, a performance, and/or a dimensional measurement, a material, a material property, and/or another parameter of the airframe component of the mission-adaptable aerial vehicle.

Example B49 includes the method of example B43 or any of examples B43-B51, comprising: repeating the facilitating and/or the simulating based at least on results of a simulated performance of the mission-adaptable aerial vehicle having the airframe component with the proposed change incorporated.

Example B50 includes the method of example B43 or any of examples B43-B51, wherein the produced library of data files includes a manufacturing protocol to account for design changes to the airframe component.

Example B51 includes the method of example B43 or any of examples B43-B50, further comprising: creating an additively manufacture protocol to physically render the airframe component the proposed change incorporated therein.

In some example embodiments of the present technology (example C1), a mission-adaptable aerial vehicle includes a fuselage assembly comprising one or more fuselage sections; a wing assembly reversibly attachable to the fuselage assembly, the wing assembly including one or more wing sections; a nose cone assembly reversibly attachable to the fuselage assembly, the nose cone assembly including at least one nose cone section; a tail assembly reversibly attachable to the fuselage assembly, the tail assembly including at least one tail section, wherein at least one wing section of the wing assembly and at least one fuselage section of the fuselage assembly are reversibly attachable to each other by an integral fastening system comprising (i) one or more protrusion structures integrally part of and spanning from a sidewall of one of the at least one wing section or the at least one fuselage section, and (ii) one or more slots disposed in a portion of the other one of the at least one wing section or the at least one fuselage section, wherein the one or more protrusion structures is formed of the same structure as the one of the at least one wing section or the at least one fuselage section, and wherein the portion having the one or more slots is formed of the same structure as the other one of the at least one wing section or the at least one fuselage section; a propulsion unit at least partially contained in at least one of the tail assembly or the fuselage assembly and configured to drive flight of the aerial vehicle; and an electronics unit comprising a wireless transceiver device.

Example C2 includes the mission-adaptable aerial vehicle of example C1 or any of examples C1-C17, wherein the mission-adaptable aerial vehicle is operable for on-demand assembly, on-demand disassembly, and on-demand modification of one or more airframe components among any of the fuselage assembly, the wing assembly, the nose cone assembly, and the tail assembly at a location where the mission-adaptable aerial vehicle is to take off.

Example C3 includes the mission-adaptable aerial vehicle of example C1 or any of examples C1-C17, wherein the one or more protrusion structures are structured as at least one of a rod, a bar, a screw, a hook, or a protruding component of a bayonet mount system.

Example C4 includes the mission-adaptable aerial vehicle of example C3 or any of examples C1-C17, wherein the integral fastening system further includes a locking mechanism to lock the one or more protrusion structures in the corresponding one or more slots, wherein the locking mechanism includes at least one of screws, nuts and bolts, a press insert, a cam-locking system, a clamp, a spring locking system, or an electro-mechanical locking system.

Example C5 includes the mission-adaptable aerial vehicle of example C1 or any of examples C1-C17, wherein the one or more slots includes a wall structure that wraps at least partially around and forms an opening that leads into an interior of a cavity to form a slot.

Example C6 includes the mission-adaptable aerial vehicle of example C1 or any of examples C1-C17, wherein one or both of (i) the one or more protrusion structures and (ii) the one or more slots includes one or more holes to align with corresponding one or more holes of the other of the of (i) the one or more protrusion structures or (ii) the one or more slots.

Example C7 includes the mission-adaptable aerial vehicle of example C1 or any of examples C1-C17, wherein one or both of (i) the one or more protrusion structures and (ii) the one or more slots includes one or more projections to align with corresponding one or more holes of the other of the of (i) the one or more protrusion structures or (ii) the one or more slots.

Example C8 includes the mission-adaptable aerial vehicle of example C1 or any of examples C1-C17, wherein the integral fastening system includes one or more sensors operable to detect absolute or relative positions of the at least one fuselage section of the fuselage assembly and the at least one wing section of the wing assembly during one or both of an assembly protocol and a disassembly protocol.

Example C9 includes the mission-adaptable aerial vehicle of example C1 or any of examples C1-C17, wherein at least one of the fuselage assembly, the wing assembly, the nose cone assembly, or the tail assembly is 3D printable or injection moldable.

Example C10 includes the mission-adaptable aerial vehicle of example C1 or any of examples C1-C17, further comprising one or more of: an imaging module including one or more cameras that are in communication with the electronics unit; or a sensor module including one or more sensors that include at least one of a motion sensor, a pressure sensor, or a temperature sensor, an optical sensor.

Example C11 includes the mission-adaptable aerial vehicle of example C1 or any of examples C1-C17, further comprising: one or more stabilizers and/or one or more control surface structures with corresponding cross-sectional airfoil shapes reversibly connectable to the fuselage.

Example C12 includes the mission-adaptable aerial vehicle of example C1 or any of examples C1-C17, wherein the propulsion unit includes at least one of (i) one or more batteries, (ii) one or more fuel cells, or (iii) one or more powerplants comprising at least one of a rocket, an electric motor-driven propeller, an internal combustion engine-driven propeller, a hydrogen fuel cell powered propulsion system, a turbojet engine, a turbofan engine, an unducted/propfan engine, or a hybrid propulsion system.

Example C13 includes the mission-adaptable aerial vehicle of example C12 or any of examples C1-C17, wherein the tail assembly includes a first tail assembly configuration and a second tail assembly configuration different than the first tail assembly configuration, wherein the first tail assembly configuration is structured to facilitate a first type of the propulsion unit, and the second tail assembly configuration is structured to facilitate a second type of the propulsion unit, and wherein the mission-adaptable aerial vehicle is able to include either of the first tail assembly configuration or the second tail assembly configuration with a same configuration of at least one of the wing assembly or the fuselage assembly for a flight operation.

Example C14 includes the mission-adaptable aerial vehicle of example C1 or any of examples C1-C17, wherein the electronics unit includes at least one of a location tracking unit or a data processing unit.

Example C15 includes the mission-adaptable aerial vehicle of example C1 or any of examples C1-C17, wherein the wing assembly includes two or more wing sections comprising a central section reversibly attachable to a fuselage section of the fuselage assembly and at least two outer sections having an aileron to be positioned port and starboard of a centerline of the mission-adaptable aerial vehicle.

Example C16 includes the mission-adaptable aerial vehicle of example C1 or any of examples C1-C17, wherein the wing assembly includes a variable-sweep, telescoping wing assembly comprising a wing box, and two telescoping wing assemblies, wherein each set of the telescoping wing assemblies includes: (i) a first wing contingent rotatably coupled to the wing box and capable of swinging outward with respect to the wing box through a slit or indented region in a fuselage section within which the variable-sweep, telescoping wing assembly is contained when in a retracted position, and (ii) a second wing contingent capable of telescoping outward from the first wing contingent when the variable-sweep, telescoping wing assembly is in an extended position, wherein the second wing contingent includes two or more wing segments where a first wing segment is configured to be nested within the first wing contingent and a second wing segment is configured to be nested within the first wing segment when the variable-sweep, telescoping wing assembly is in the retracted position.

Example C17 includes the mission-adaptable aerial vehicle of example C1 or any of examples C1-C16, further comprising: one or more fuel tanks integrally configured an interior structure of an airframe of the mission-adaptable aerial vehicle including at least one of the fuselage assembly, the wing assembly, the tail assembly, or the nose cone assembly, wherein the one or more fuel tanks are blow molded or rotational molded into the interior structure of the airframe.

In some example embodiments of the present technology (example C18), a method for facilitating in-field assembly of a mission-adaptable aerial vehicle includes providing a user interface via a software application on a mobile device associated with a user, wherein the user interface includes a display screen presenting details of an aircraft type and a list of available components associated with the aircraft type of the mission-adaptable aerial vehicle; receiving an input from the user interface associated with a selection of at least some of the available components to include in an assembly of the mission-adaptable aerial vehicle; producing one or more assembly protocols including instructions to assemble the mission-adaptable aerial vehicle for an in-field assembly procedure; and generating, in real-time of the in-field assembly procedure, a modification scheme to cause a change in the instructions based on a determined change in one or more of flight dynamics, flight stability, or flight control of the mission-adaptable aerial vehicle.

Example C19 includes the method of example C18 or any of examples C18-C22, wherein the user interface includes a touchscreen interface to allow the input to include a tap, a drag, and/or a dropdown.

Example C20 includes the method of example C18 or any of examples C18-C22, wherein the determined change includes one or more of (i) an environmental factor including a temperature, pressure, or weather forecast or measurement; (ii) a mission factor including a target location, a launch location, a trajectory parameter, or (iii) an altitude parameter; or a temporal factor including a time window of assembly or a time window of a mission.

Example C21 includes the method of example C18 or any of examples C18-C22, wherein the instructions include one or both of (i) information on how a user can modify elements, including at least one of wing placement, a control surface sizing, a powerplant output or thrust, and (ii) at least one parameter to accommodate a change in a weight, a center of gravity, an aerodynamic center, a fuselage length, an added or reduced drag, and/or a powerplant type.

Example C22 includes the method of example C18 or any of examples C18-C21, wherein the mission-adaptable aerial vehicle includes the mission-adaptable aerial vehicle of examples C1-C17 or examples B1-B33.

In some example embodiments of the present technology (example C23), a method for customizing a mission-adaptable aerial vehicle includes receiving, at data processing system, an input to obtain or access a library of data files associated with one or more mission-adaptable aerial vehicles; processing, at data processing system, the input to identify the library of data files associated with the one or more aerial vehicles; providing, by the data processing system, the identified library of data files associated with one or more aerial vehicles to the entity associated with the received input; facilitating, at the data processing system, a modification of the library of data files based on data provided by the entity that provided the input, wherein the facilitating the modification of one or more data files of the library includes verifying a technical feasibility of a proposed change to an airframe component of the mission-adaptable aerial vehicle, wherein the modification of the library of data files includes a change, an addition, or an omission to data in at least one data file of the library of data files; simulating, at the data processing system, a performance of the mission-adaptable aerial vehicle having the airframe component with the proposed change incorporated to evaluate the proposed change to the mission-adaptable aerial vehicle's flight performance; and producing, at the data processing system, a new or an updated library of data files based on the modification of one or more data files of the library of data files associated with one or more aerial vehicles.

Example C24 includes the method of example C23 or any of examples C23-C30, wherein the request is sent by a client computer device associated with an additive manufacturing system, or wherein the request is sent by a computer device in data communication with an existing mission-adaptable aerial vehicle.

Example C25 includes the method of example C23 or any of examples C23-C30, wherein the processing the input includes searching a database of one or both of a plurality of libraries and a plurality of data files to identify the requested library of data files.

Example C26 includes the method of example C25 or any of examples C23-C30, wherein a search is conducted based on at least one of (i) one or more keywords, (ii) an index or a reference values, or (iii) one or more parameters associated with at least one of an aerial vehicle, one or more airframe segments or components, or one or more aerial vehicle mission constraints.

Example C27 includes the method of example C23 or any of examples C23-C30, wherein the proposed change includes at least one of modification data associated with a weight, a balance, a performance, and/or a dimensional measurement, a material, a material property, and/or another parameter of the airframe component of the mission-adaptable aerial vehicle.

Example C28 includes the method of example C23 or any of examples C23-C30, comprising: repeating one or both of the facilitating step and the simulating step based at least on results of a simulated performance of the mission-adaptable aerial vehicle having the airframe component with the proposed change incorporated.

Example C29 includes the method of example C23 or any of examples C23-C30, wherein the produced library of data files includes a manufacturing protocol to account for design changes to the airframe component.

Example C30 includes the method of example C23 or any of examples C23-C29, further comprising: creating an additively manufacture protocol to physically render the airframe component the proposed change incorporated therein.

CONCLUSION

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A mission-adaptable aerial vehicle, comprising:
a fuselage assembly comprising one or more fuselage sections;
a wing assembly reversibly attachable to the fuselage assembly, the wing assembly including one or more wing sections;
a nose cone assembly reversibly attachable to the fuselage assembly, the nose cone assembly including at least one nose cone section;
a tail assembly reversibly attachable to the fuselage assembly, the tail assembly including at least one tail section,
wherein a first fuselage section of the fuselage assembly is reversibly attachable to a second fuselage section of the fuselage assembly by an integral fastening system comprising a bayonet mount system, wherein the bayonet mount system includes (i) a bayonet passageway on an indented ledge region of the first fuselage section, the bayonet passageway comprising a first channel perpendicular with a circumference of the indented ledge region and a second channel connected with the first channel and radially parallel with the circumference of the indented ledge region, and (ii) a nub that is produced on an interior-facing side of an end region of the second fuselage section, wherein the nub is structured to align with and be translated into the first channel and subsequently be rotated within the second channel to securely connect the first and second fuselage sections together;
a propulsion unit at least partially contained in at least one of the tail assembly or the fuselage assembly and configured to drive flight of the aerial vehicle; and
an electronics unit comprising a wireless transceiver device.

2. The mission-adaptable aerial vehicle of claim 1, wherein the mission-adaptable aerial vehicle is operable for on-demand assembly, on-demand disassembly, and on-demand modification of one or more airframe components among any of the fuselage assembly, the wing assembly, the nose cone assembly, and the tail assembly at a location where the mission-adaptable aerial vehicle is to take off.

3. The mission-adaptable aerial vehicle of claim 1, wherein the integral fastening system further comprises (i) one or more protrusion structures integrally part of and spanning from a sidewall of one of the one or more wing sections or the one or more fuselage sections, and (ii) one or more slots disposed in a portion of another one of the one or more wing sections or the one or more fuselage sections, wherein the one or more protrusion structures is formed of the same structure as the one of the one or more wing sections or the one or more fuselage sections, and wherein the portion having the one or more slots is formed of the same structure as the other one of the one or more wing sections or the one or more fuselage sections, and
wherein the one or more protrusion structures is structured as at least one of a rod, a bar, a screw, or a hook.

4. The mission-adaptable aerial vehicle of claim 3, wherein the integral fastening system further includes a locking mechanism to lock the one or more protrusion structures in the corresponding one or more slots, wherein the locking mechanism includes at least one of screws, nuts and bolts, a press insert, a cam-locking system, a clamp, a spring locking system, or an electro-mechanical locking system.

5. The mission-adaptable aerial vehicle of claim 3, wherein the one or more slots includes a wall structure that wraps at least partially around and forms an opening that leads into an interior of a cavity to form a slot.

6. The mission-adaptable aerial vehicle of claim 3, wherein one or both of (i) the one or more protrusion structures and (ii) the one or more slots includes one or more holes to align with corresponding one or more holes of the other of the of (i) the one or more protrusion structures or (ii) the one or more slots.

7. The mission-adaptable aerial vehicle of claim 3, wherein one or both of (i) the one or more protrusion structures and (ii) the one or more slots includes one or more projections to align with corresponding one or more holes of the other of the of (i) the one or more protrusion structures or (ii) the one or more slots.

8. The mission-adaptable aerial vehicle of claim 3, wherein the integral fastening system includes one or more sensors operable to detect absolute or relative positions of the at least one fuselage section of the fuselage assembly and the at least one wing section of the wing assembly during one or both of an assembly protocol and a disassembly protocol.

9. The mission-adaptable aerial vehicle of claim 1, wherein at least one of the fuselage assembly, the wing assembly, the nose cone assembly, or the tail assembly is 3D printable or injection moldable.

10. The mission-adaptable aerial vehicle of claim 1, further comprising one or more of:
   an imaging module including one or more cameras that is in communication with the electronics unit; or
   a sensor module including one or more sensors that include at least one of a motion sensor, a pressure sensor, or a temperature sensor, an optical sensor.

11. The mission-adaptable aerial vehicle of claim 1, further comprising:
   one or more stabilizers and/or one or more control surface structures with corresponding cross-sectional airfoil shapes reversibly connectable to the fuselage.

12. The mission-adaptable aerial vehicle of claim 1, wherein the propulsion unit includes at least one of (i) one or more batteries, (ii) one or more fuel cells, or (iii) one or more powerplants comprising at least one of a rocket, an electric motor-driven propeller, an internal combustion engine-driven propeller, a hydrogen fuel cell powered propulsion system, a turbojet engine, a turbofan engine, an unducted/propfan engine, or a hybrid propulsion system.

13. The mission-adaptable aerial vehicle of claim 12, wherein the tail assembly includes a first tail assembly configuration and a second tail assembly configuration different than the first tail assembly configuration, wherein the first tail assembly configuration is structured to facilitate a first type of the propulsion unit, and the second tail assembly configuration is structured to facilitate a second type of the propulsion unit, and wherein the mission-adaptable aerial vehicle is able to include either of the first tail assembly configuration or the second tail assembly configuration with a same configuration of at least one of the wing assembly or the fuselage assembly for a flight operation.

14. The mission-adaptable aerial vehicle of claim 1, wherein the electronics unit includes at least one of a location tracking unit or a data processing unit.

15. The mission-adaptable aerial vehicle of claim 1, wherein the wing assembly includes two or more wing sections comprising a central section reversibly attachable to a fuselage section of the fuselage assembly and at least two outer sections having an aileron that is positioned port and starboard of a centerline of the mission-adaptable aerial vehicle.

16. The mission-adaptable aerial vehicle of claim 1, wherein the wing assembly includes a variable-sweep, telescoping wing assembly comprising a wing box, and two telescoping wing assemblies, wherein each set of the telescoping wing assemblies includes: (i) a first wing contingent rotatably coupled to the wing box and capable of swinging outward with respect to the wing box through a slit or indented region in a fuselage section within which the variable-sweep, telescoping wing assembly is contained when in a retracted position, and (ii) a second wing contingent capable of telescoping outward from the first wing contingent when the variable-sweep, telescoping wing assembly is in an extended position, wherein the second wing contingent includes two or more wing segments where a first wing segment is nested within the first wing contingent and a second wing segment is nested within the first wing segment when the variable-sweep, telescoping wing assembly is in the retracted position.

17. The mission-adaptable aerial vehicle of claim 1, further comprising:
   one or more fuel tanks integrally configured an interior structure of an airframe of the mission-adaptable aerial vehicle including at least one of the fuselage assembly, the wing assembly, the tail assembly, or the nose cone assembly,
   wherein the one or more fuel tanks is blow molded or rotational molded into the interior structure of the airframe.

18. The mission-adaptable aerial vehicle of claim 1, wherein the tail assembly includes an inlet assembly comprising at least one tube or duct to direct air intake into an interior of the at least one tail section where at least a portion of the propulsion unit is contained.

* * * * *

UNITED STATES PATENT AND TRADEMARK OFFICE
CERTIFICATE OF CORRECTION

PATENT NO. : 11,981,460 B2
APPLICATION NO. : 18/510592
DATED : May 14, 2024
INVENTOR(S) : Ian Muceus et al.

It is certified that error appears in the above-identified patent and that said Letters Patent is hereby corrected as shown below:

On the Title Page

1. On Page 2, item (56), under "OTHER PUBLICATIONS", in Column 2, Line 2, delete "Linkedin" and insert -- LinkedIn --

2. On Page 2, item (56), under "OTHER PUBLICATIONS", in Column 2, Line 6, delete "Exlipson" and insert -- Eclipson --

3. On Page 2, item (56), under "OTHER PUBLICATIONS", in Column 2, Line 23, delete "Protoypring" and insert -- Prototyping --

4. On Page 2, item (56), under "OTHER PUBLICATIONS", in Column 2, Line 60, delete "Hathhaway" and insert -- Hathaway --

In the Specification

5. In Column 2, Line 4, delete "where in some cases the" and insert -- where, in some cases, the --

6. In Column 9, Line 21, delete "attriable," and insert -- attritable, --

7. In Column 10, Line 56, delete "polythene" and insert -- polyethylene --

8. In Column 32, Line 11, delete "part the" and insert -- part of the --

9. In Column 32, Line 41, delete "part the" and insert -- part of the --

10. In Column 33, Line 24, delete "part the" and insert -- part of the --

11. In Column 33, Line 64, delete "part the" and insert -- part of the --

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 11,981,460 B2

12. In Column 34, Line 61, delete "where in some embodiments the" and insert -- where, in some embodiments, the --

13. In Column 36, Line 42, delete "where in such" and insert -- where, in such --

14. In Column 38, Line 1, delete "when in the" and insert -- when the --

15. In Column 38, Line 33, delete "position" and insert -- position. --

16. In Column 43, Line 20, delete "wherein the wherein the" and insert -- wherein the --

17. In Column 43, Line 29, delete "polythene" and insert -- polyethylene --